United States Patent
Ichikawa et al.

(10) Patent No.: US 8,253,566 B2
(45) Date of Patent: Aug. 28, 2012

(54) SYSTEM AND APPARATUS FOR MANAGING INFORMATION AND COMMUNICATING WITH A RFID TAG

(75) Inventors: Yasuhisa Ichikawa, Nagoya (JP); Tsuyoshi Ohashi, Hashima (JP); Tomoyasu Fukui, Inuyama (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1442 days.

(21) Appl. No.: 11/778,279

(22) Filed: Jul. 16, 2007

(65) Prior Publication Data

US 2007/0273519 A1    Nov. 29, 2007

Related U.S. Application Data

(63) Continuation-in-part of application No. PCT/JP2006/300768, filed on Jan. 19, 2006.

(30) Foreign Application Priority Data

| Jan. 19, 2005 | (JP) | 2005-011598 |
| Jan. 25, 2005 | (JP) | 2005-017434 |
| Jan. 25, 2005 | (JP) | 2005-017435 |
| Jan. 25, 2005 | (JP) | 2005-017436 |

(51) Int. Cl.
*G08B 13/14* (2006.01)
*G06F 17/00* (2006.01)
(52) U.S. Cl. .................... 340/572.1; 235/375
(58) Field of Classification Search .......... None
See application file for complete search history.

(56) References Cited

U.S. PATENT DOCUMENTS

| 2002/0116267 A1 | 8/2002 | Weisz et al. |
| 2002/0140966 A1* | 10/2002 | Meade et al. ............ 358/1.15 |
| 2003/0035016 A1 | 2/2003 | Tanaka |
| 2003/0083964 A1* | 5/2003 | Horwitz et al. ............ 705/28 |
| 2005/0111015 A1 | 5/2005 | Tsujimoto |
| 2005/0218219 A1* | 10/2005 | Sano et al. ............ 235/383 |
| 2006/0226214 A1* | 10/2006 | Horn et al. ............ 235/375 |
| 2007/0188306 A1* | 8/2007 | Tethrake et al. ............ 340/10.51 |

(Continued)

FOREIGN PATENT DOCUMENTS

JP     H09-245138 A     9/1997

(Continued)

OTHER PUBLICATIONS

International Search Report for PCT/JP2006/300768, mailed Apr. 11, 2006.

(Continued)

*Primary Examiner* — Julie Lieu
(74) *Attorney, Agent, or Firm* — Baker Botts L.L.P.

(57) ABSTRACT

An apparatus for communicating with a RFID tag comprises an antenna for communicating with a RFID circuit element by wireless communication, a signal processing circuit and a radio frequency circuit for accessing an IC circuit part of the RFID circuit element through the antenna based on an access instruction to information in a RFID tag, a storage device for storing at least correlation information of identification information of an object which is to bear a RFID tag containing the RFID circuit element to identification of the RFID circuit element corresponding thereto in a database, a control circuit for accessing the database based on an access instruction to a storage device, a tape feeding roller drive shaft for feeding out a cover film associated with the RFID circuit element, and a print head for printing a print based on a printing instruction.

59 Claims, 54 Drawing Sheets

U.S. PATENT DOCUMENTS

| | | | | |
|---|---|---|---|---|
| 2008/0100445 | A1* | 5/2008 | Horwitz et al. | 340/572.1 |
| 2008/0175390 | A1* | 7/2008 | Alessio et al. | 380/278 |
| 2010/0181383 | A1* | 7/2010 | Ohashi et al. | 235/492 |
| 2010/0238039 | A1* | 9/2010 | Tethrake et al. | 340/653 |
| 2011/0153614 | A1* | 6/2011 | Solomon | 707/740 |

FOREIGN PATENT DOCUMENTS

| | | |
|---|---|---|
| JP | H11-195079 A | 7/1999 |
| JP | 2000-006550 A | 1/2000 |
| JP | 2000-109036 A | 4/2000 |
| JP | 2001-147770 A | 5/2001 |
| JP | 2001-175950 A | 6/2001 |
| JP | 2001-216308 A | 8/2001 |
| JP | 2002-352332 A | 12/2002 |
| JP | 2003-011467 A | 1/2003 |
| JP | 2003-039778 A | 2/2003 |
| JP | 2003-296515 A | 10/2003 |
| JP | 2003-312092 A | 11/2003 |
| JP | 2004-295406 A | 10/2004 |

OTHER PUBLICATIONS

Patent Cooperation Treaty, International Preliminary Report on Patentability for International Patent Appl'n No. PCT/JP2006/300768 (counterpart to above-captioned U.S. patent application), dated Aug. 21, 2008.

Japanese Patent Office, Notification of Reason for Rejection for Application No. JP2005-017435, dated Sep. 10, 2010. (counterpart to above-captioned U.S. patent application).

Japanese Patent Office, Notification of Reason for Rejection for Application No. JP2005-017436, dated Sep. 10, 2010. (counterpart to above-captioned U.S. patent application).

Japanese Patent Office, Notification of Reason for Rejection for Application No. JP2005-011598, dated Sep. 16, 2010. (counterpart to above-captioned U.S. patent application).

Japanese Patent Office, Notification of Reason for Rejection for Application No. JP2005-017434, dated Sep. 21, 2010. (counterpart to above-captioned U.S. patent application).

* cited by examiner

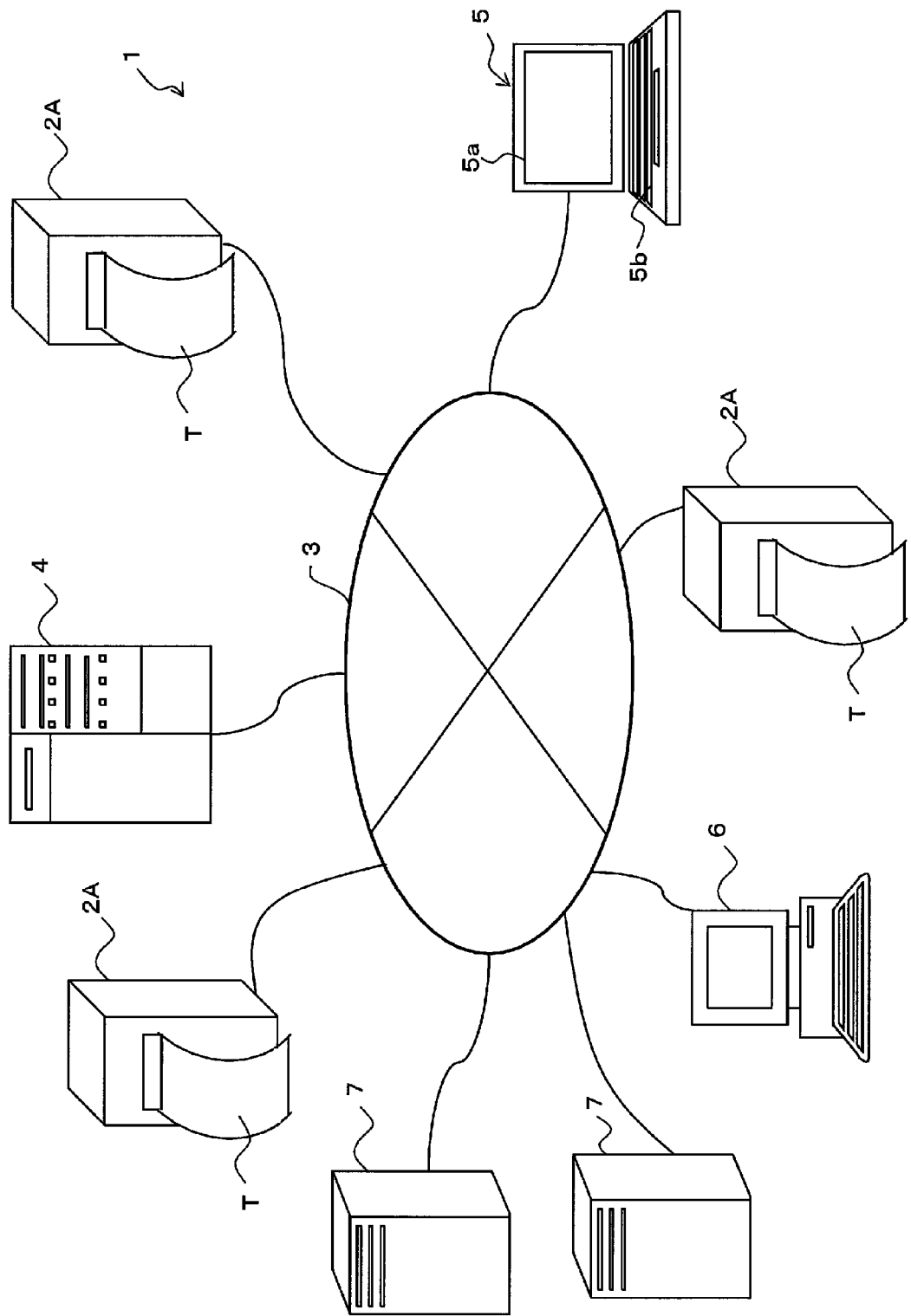
[FIG.1]

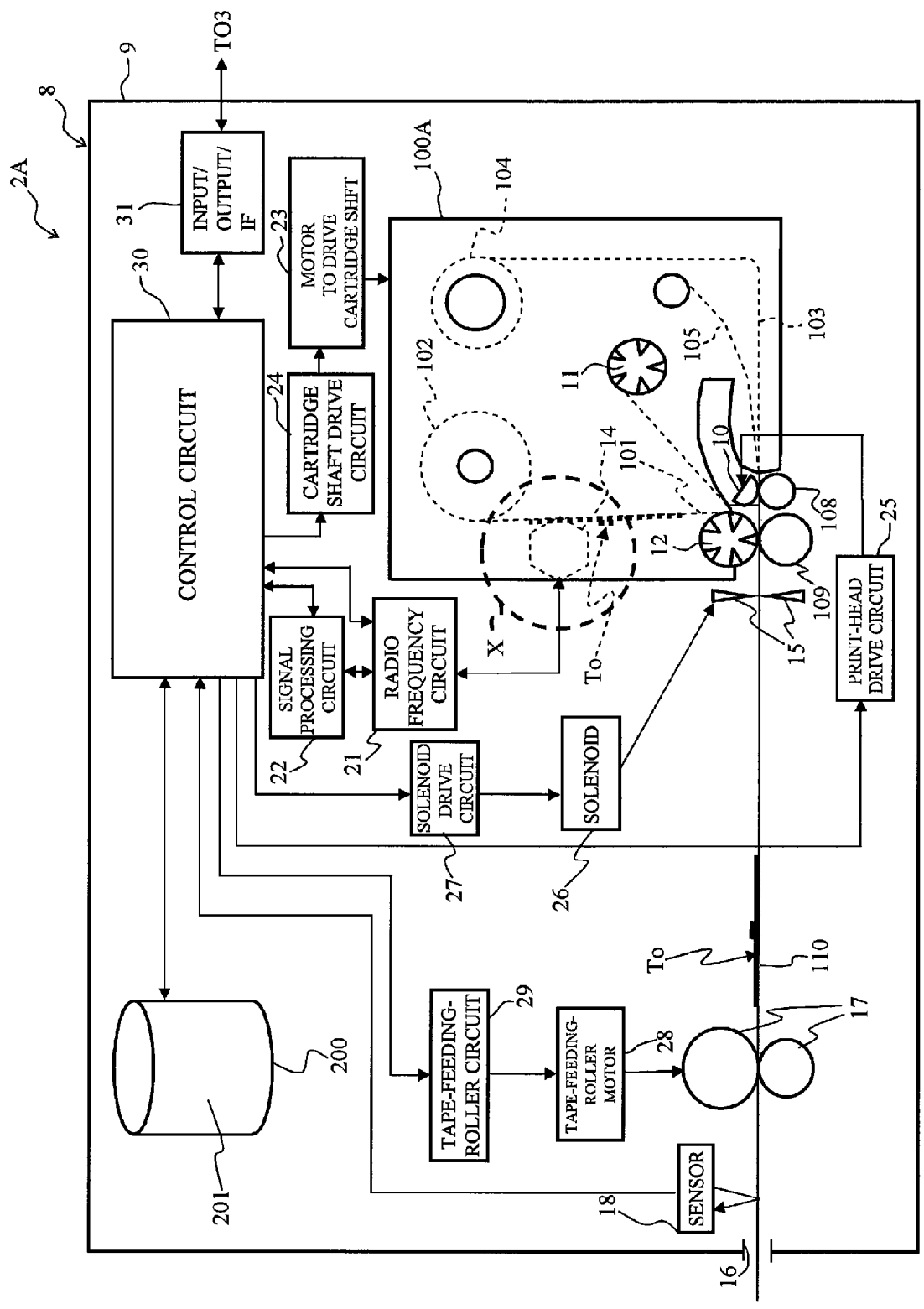
[FIG.2]

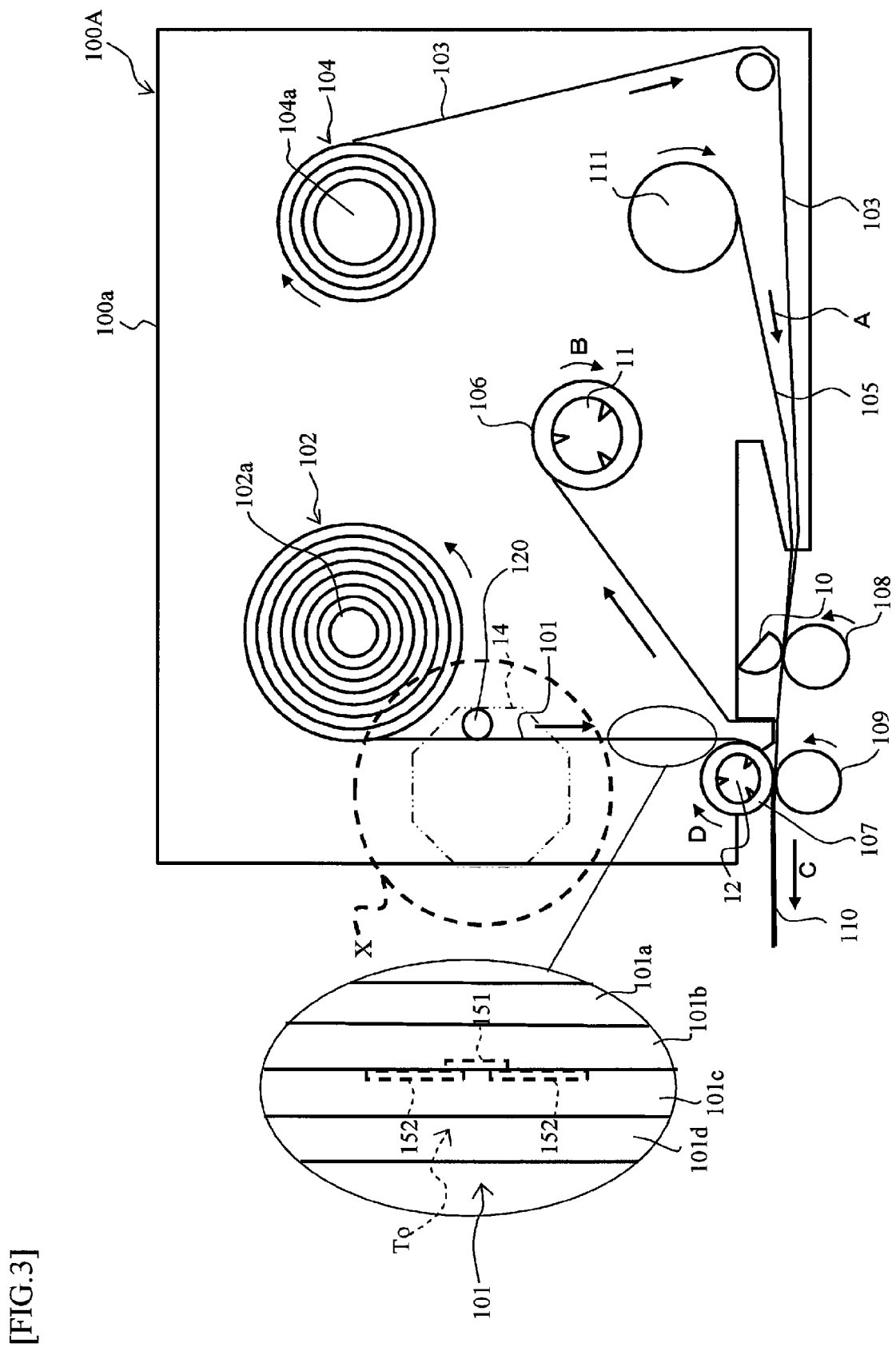
[FIG.3]

[FIG.4]
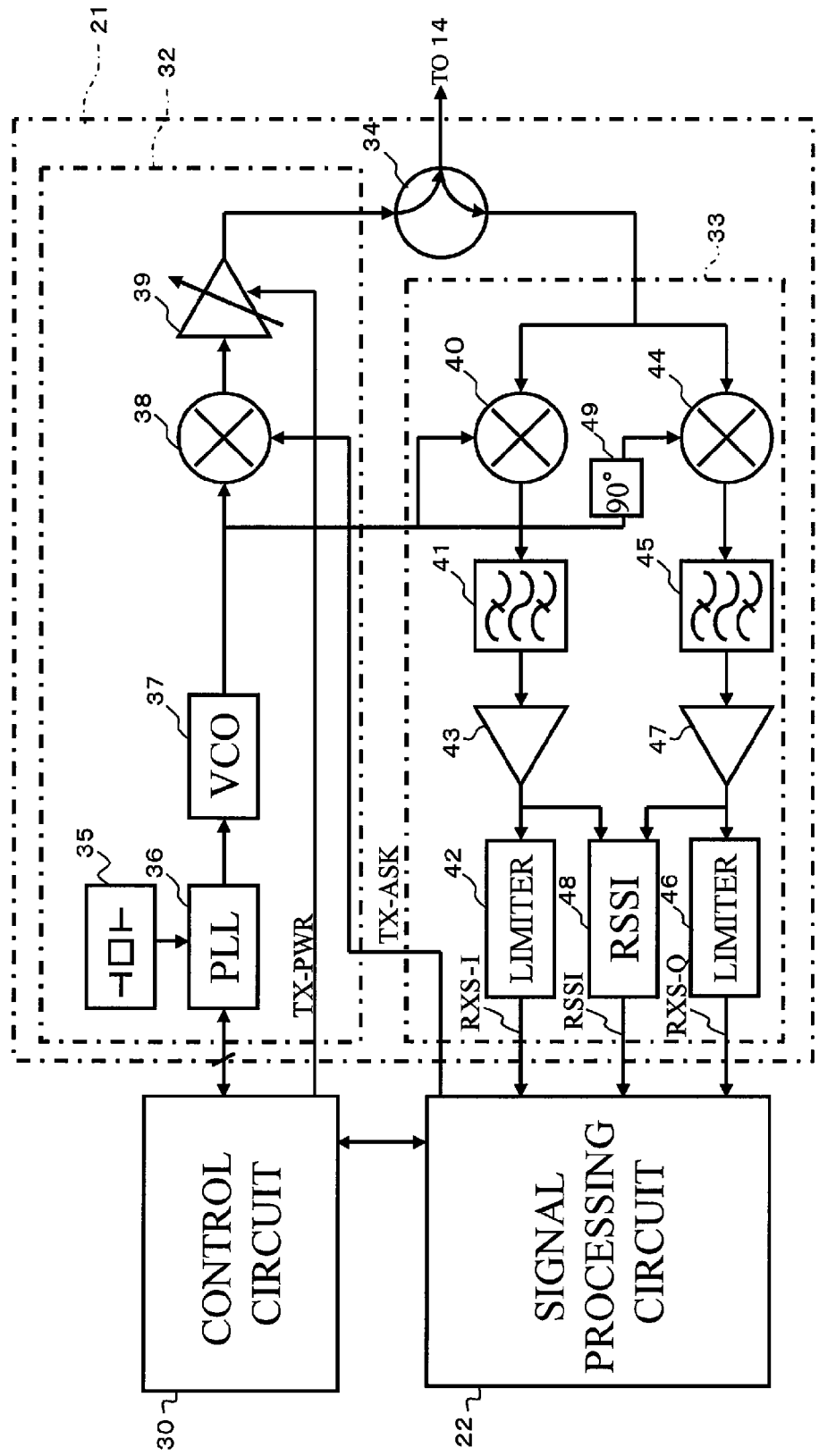

[FIG.5]
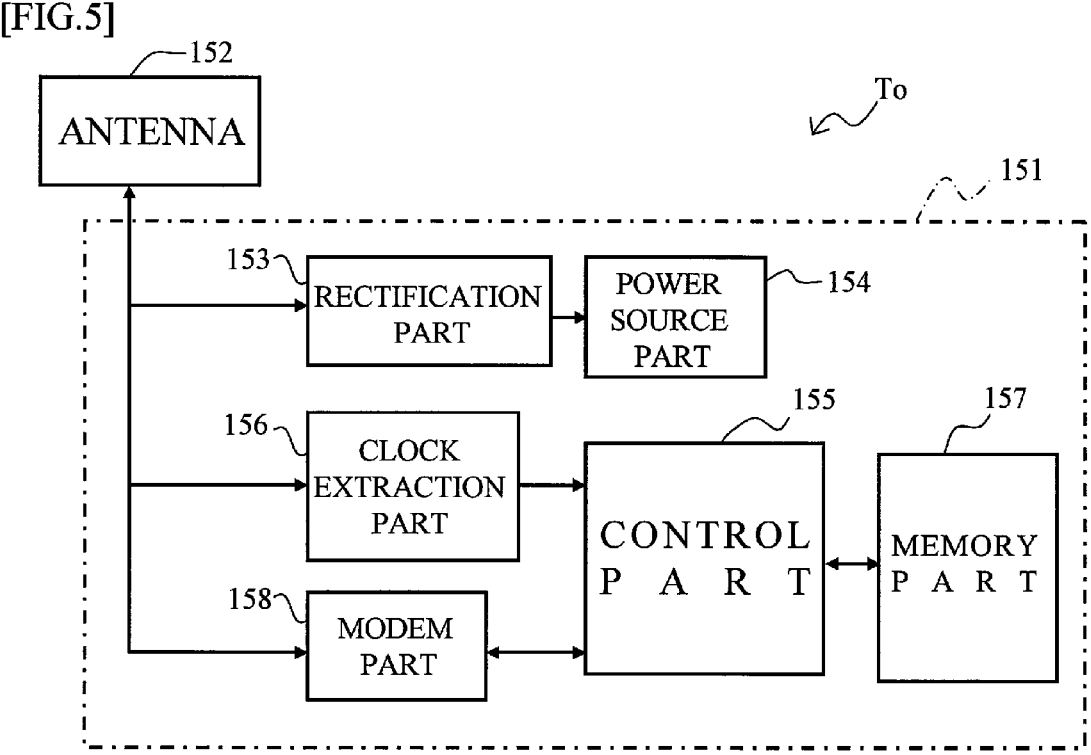
[FIG.6A]
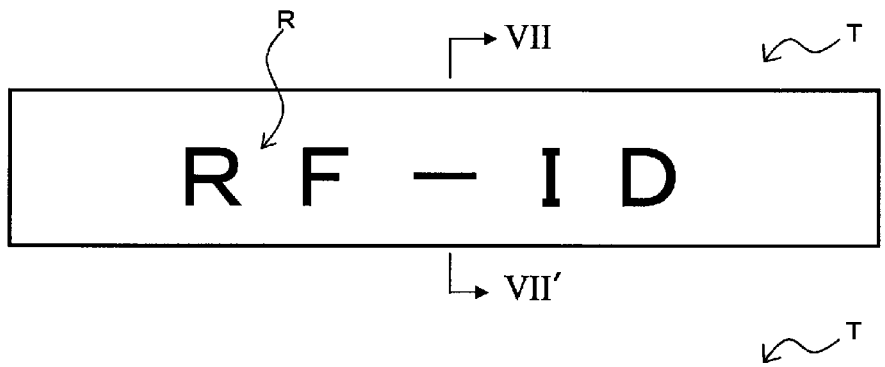
[FIG.6B]

[FIG.7]
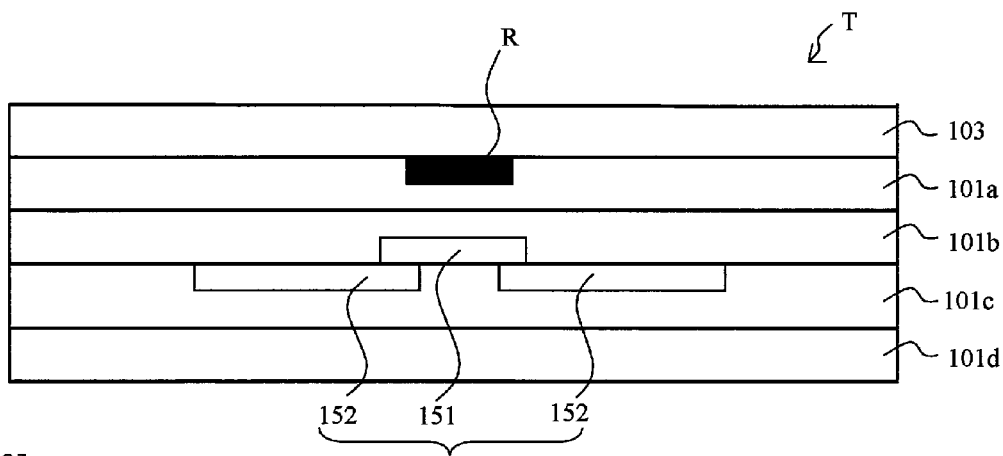
[FIG.8]
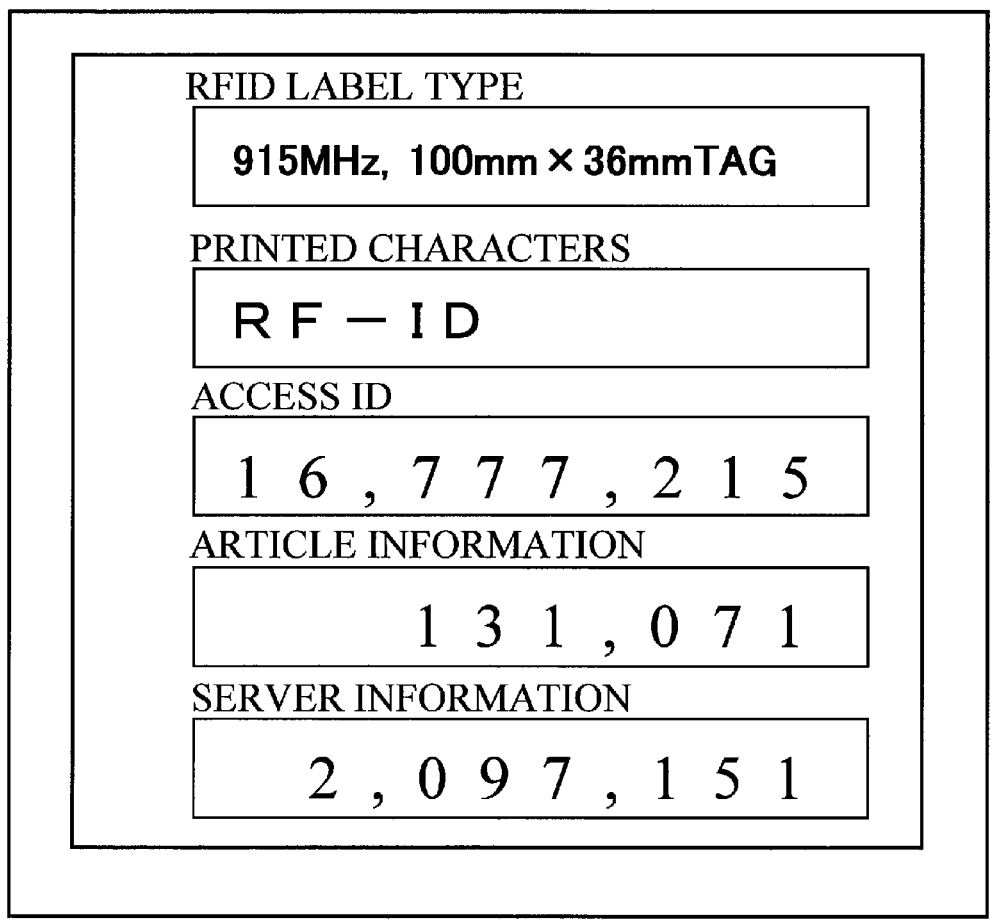

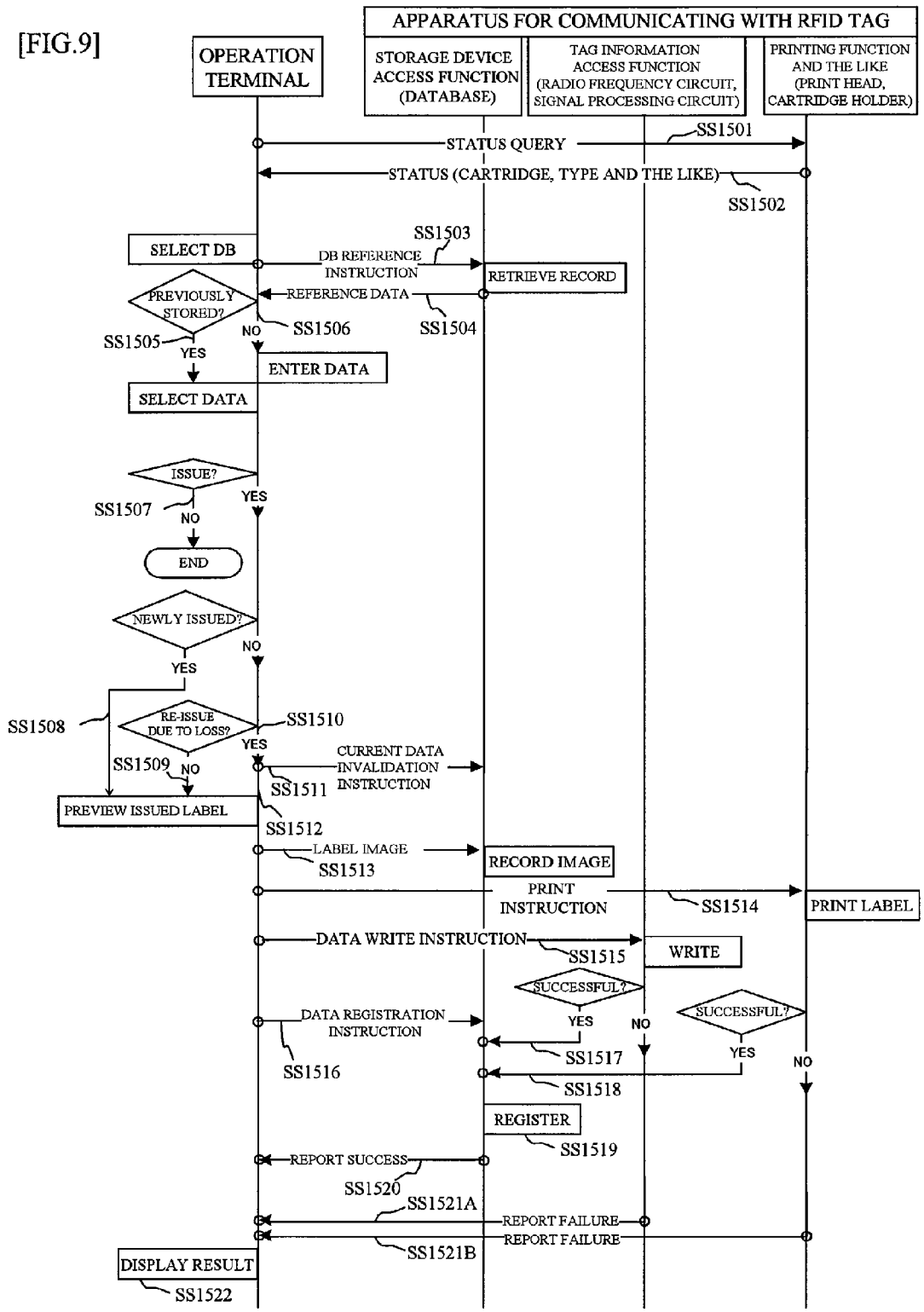

[FIG.10]
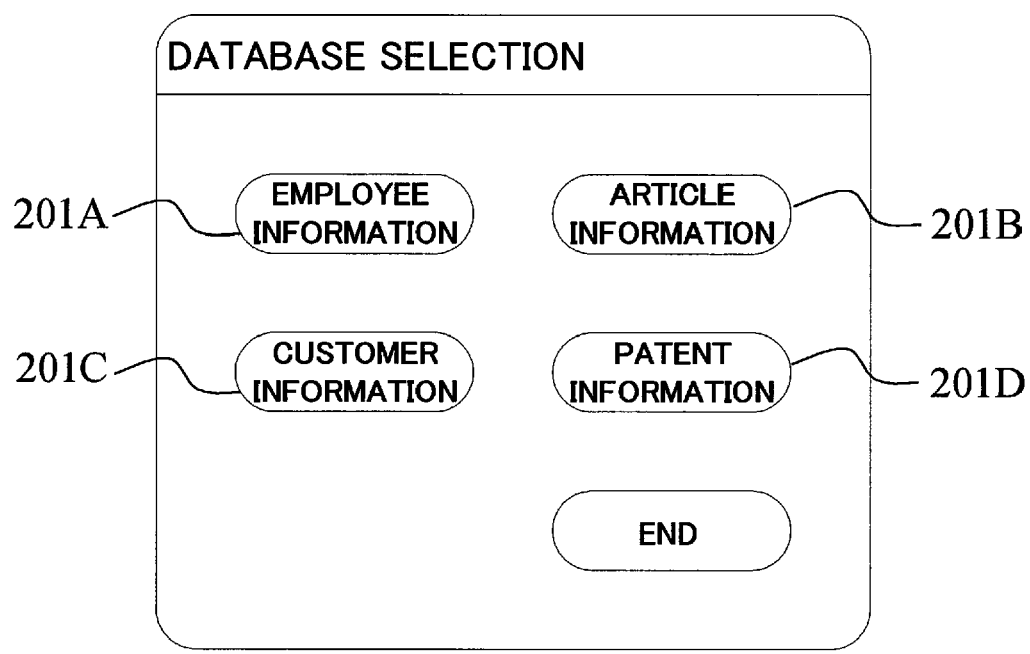

[FIG.11]

EXAMPLE OF RECORD IN EMPLOYEE INFORMATION DATABASE

| ITEMS | EMPLOYEE CODE | NAME | READING | SEX CODE | SECTION CODE | EXTENSION | ELECTRONIC MAIL ADDRESS | PORTRAIT FILE NAME | LABEL BASE COLOR CODE |
|---|---|---|---|---|---|---|---|---|---|
| RECORD | 0012001 | ICHIRO NAGOYA | NAGOYA ICHIRO | 0 | E321 | 7249 | Ichiro.nagoya@kaisha.co.jp | face0001.jpg | 0 |

| LABEL PRINT COLOR CODE | LABEL IMAGE FILE NAME | ID BIT LENGTH | TAG ID (HEXADECIMAL) | PROTOCOL CODE | ISSUED DATE | REASON FOR ISSUANCE CODE | ENABLE/DISABLE FLAG |
|---|---|---|---|---|---|---|---|
| 2 | S44005501.bmp | 64 | 1100220033000101 | 0 | 20040401 | 0 | 1 |

0: ISSUED FOR FIRST TIME
1: RE-ISSUED DUE TO FAILURE
2: RE-ISSUED DUE TO LOSS

[FIG.12]

EXAMPLE OF RECORD IN ARTICLE INFORMATION DATABASE

| ITEMS | ARTICLE CODE | ARTICLE NAME | MODEL NUMBER | PURCHASED DATE | MANAGEMENT SECTION CODE | MANAGER CODE | PICTURE FILE NAME | LABEL BASE COLOR CODE |
|---|---|---|---|---|---|---|---|---|
| RECORD | S15000001 | CPU EMULATOR | ISE9800 | 20030910 | E321 | 0012001 | obj00001.jpg | 0 |

| | LABEL PRINT COLOR CODE | LABEL IMAGE FILE NAME | ID BIT LENGTH | TAG ID (HEXADECIMAL) | PROTOCOL CODE | ISSUED DATE | REASON FOR ISSUANCE CODE | ENABLE/DISABLE FLAG |
|---|---|---|---|---|---|---|---|---|
| CONTINUED | 1 | B99008801.bmp | 64 | 5500660077000101 | 0 | 20040701 | 0 | 1 |

REISSUED LABEL CAN BE DISPLAYED BECAUSE LABEL IMAGE IS ALSO RECORDED

| Kaisha | |
|---|---|
| ARTICLE CODE | S15000001 |
| MANAGEMENT SECTION | DEVELOPMENT DEPARTMENT |
| MANAGER | ICHIRO NAGOYA |
| PURCHASED DATE | JUNE 10, 2003 |

[FIG.13]
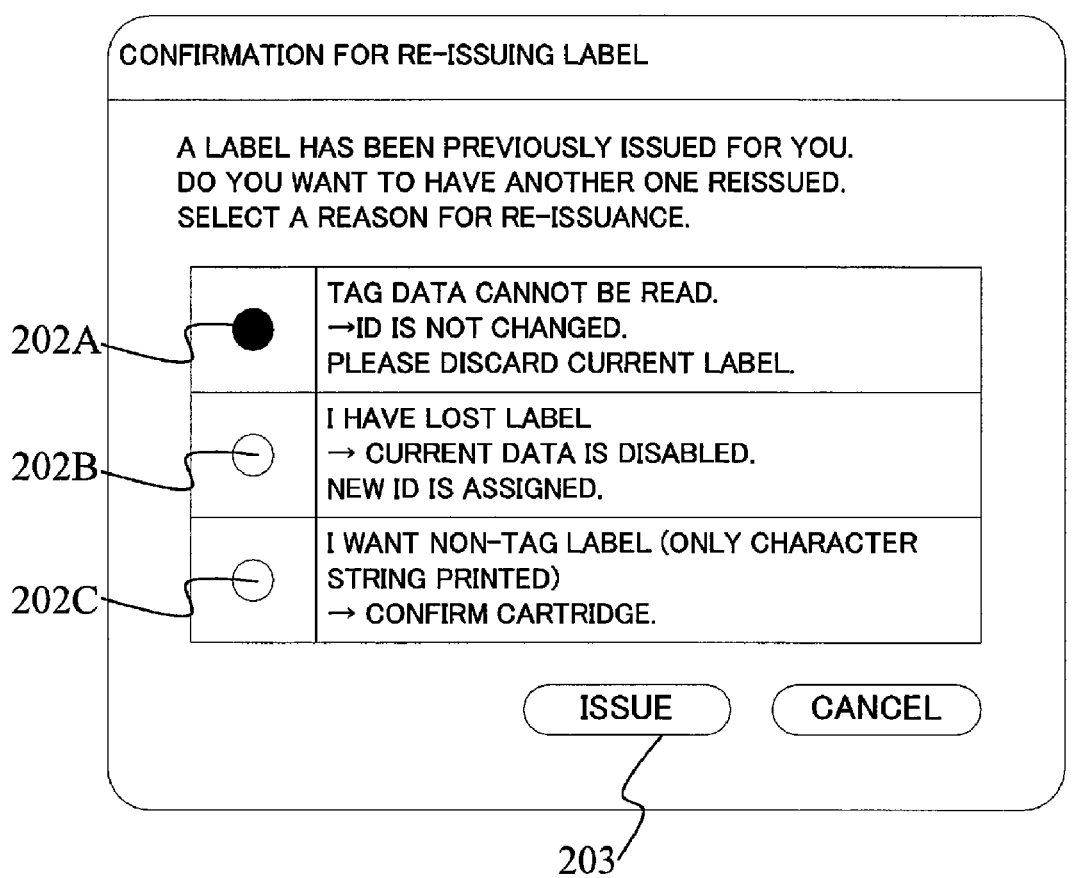

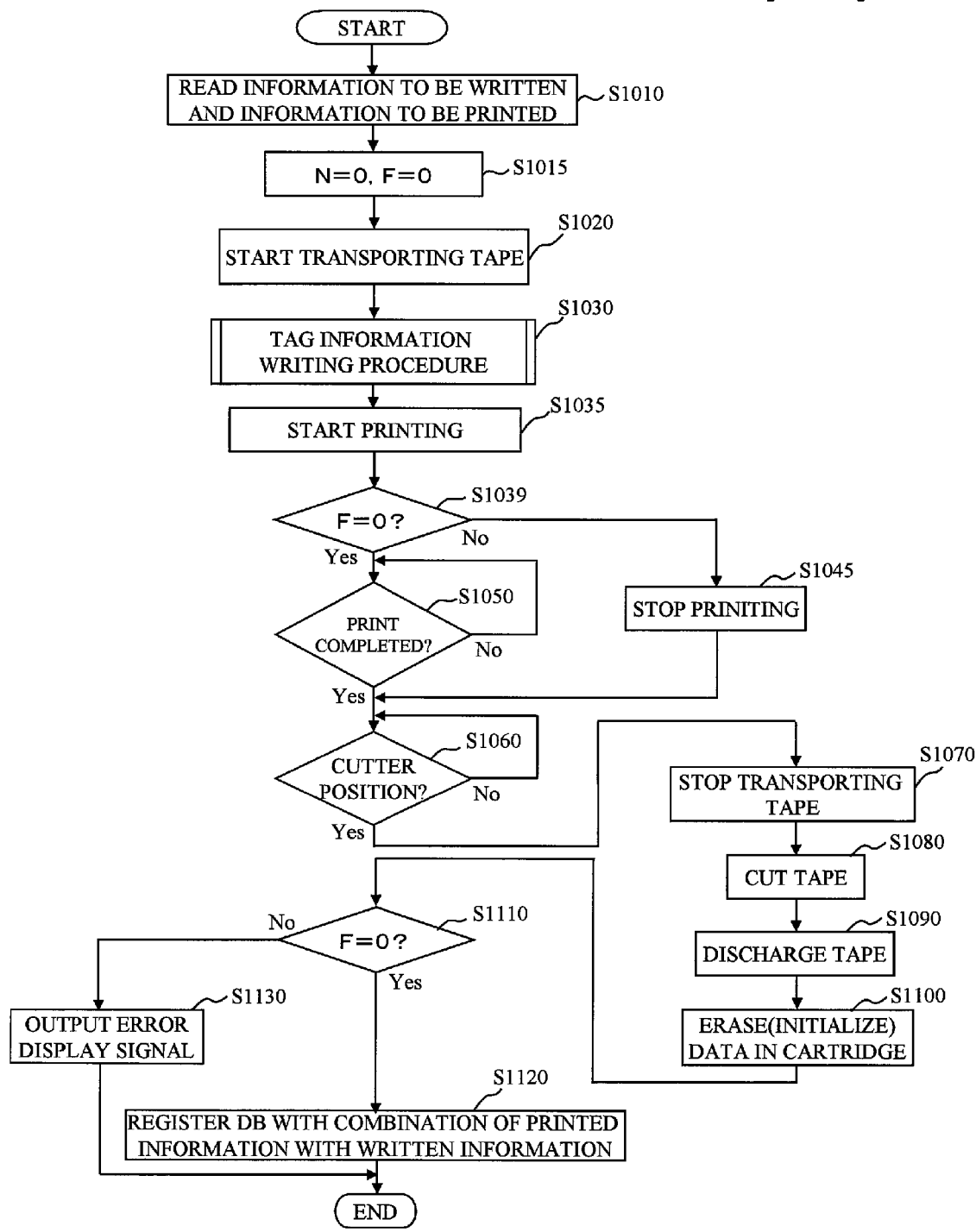
[FIG.14]

[FIG.15]
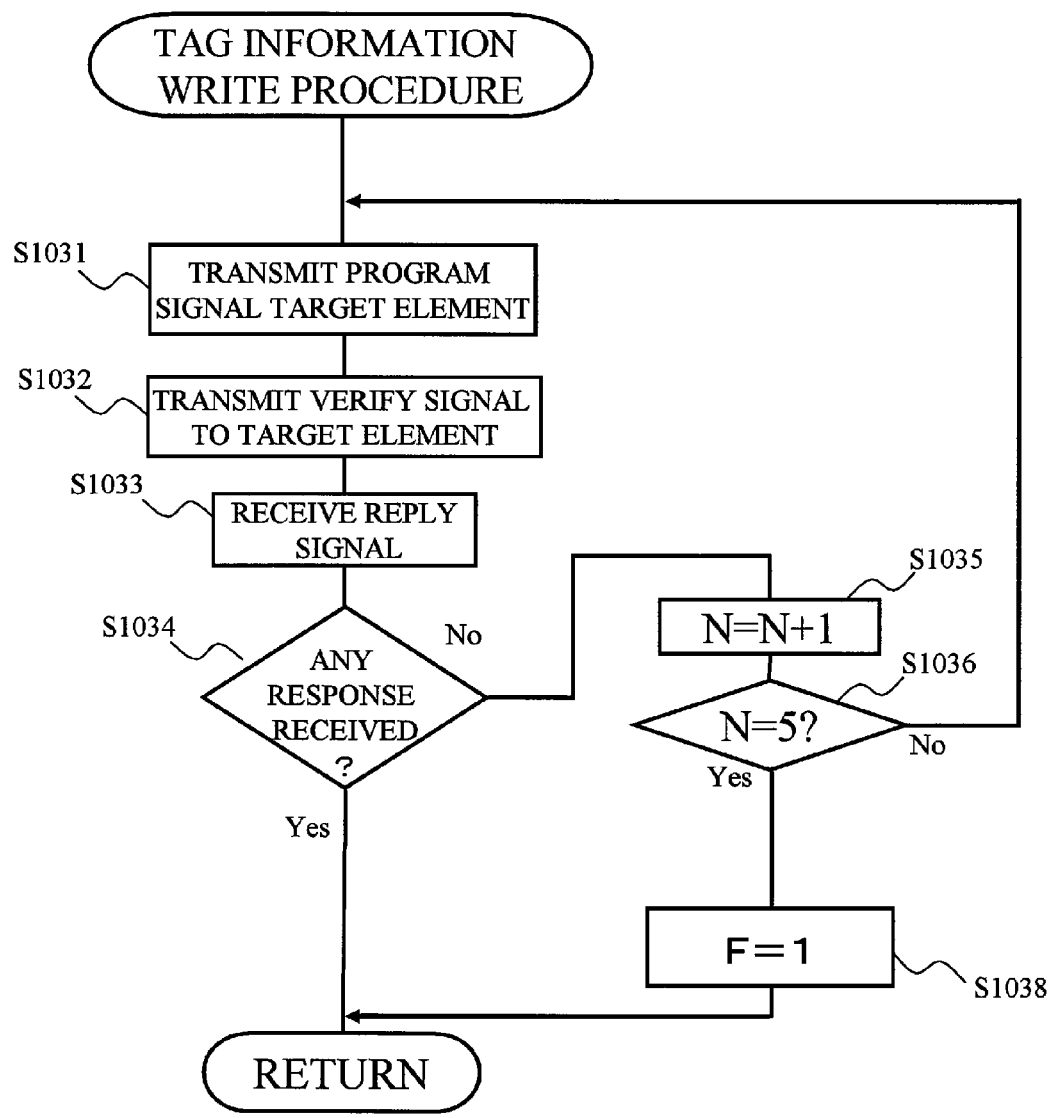

[FIG.16]

| DATABASE | ITEM CONDITION |
| --- | --- |
| EMPLOYEE MANAGEMENT DB | SEX 0 (MAN) AND NOT ISSUED |
| EMPLOYEE MANAGEMENT DB | SEX 1 (WOMAN) AND NOT ISSUED |
| SUPPLY MANAGEMENT DB | PRICE<200,000 AND NOT ISSUED |
| SUPPLY MANAGEMENT DB | PRICE≧200,000 AND NOT ISSUED |
| CUSTOMER MANAGEMENT DB | NUMBER OF TIMES OF TRADES ≧10 AND NOT ISSUED |
| CUSTOMER MANAGEMENT DB | NUMBER OF TIMES OF TRADES < 10 AND NOT ISSUED |

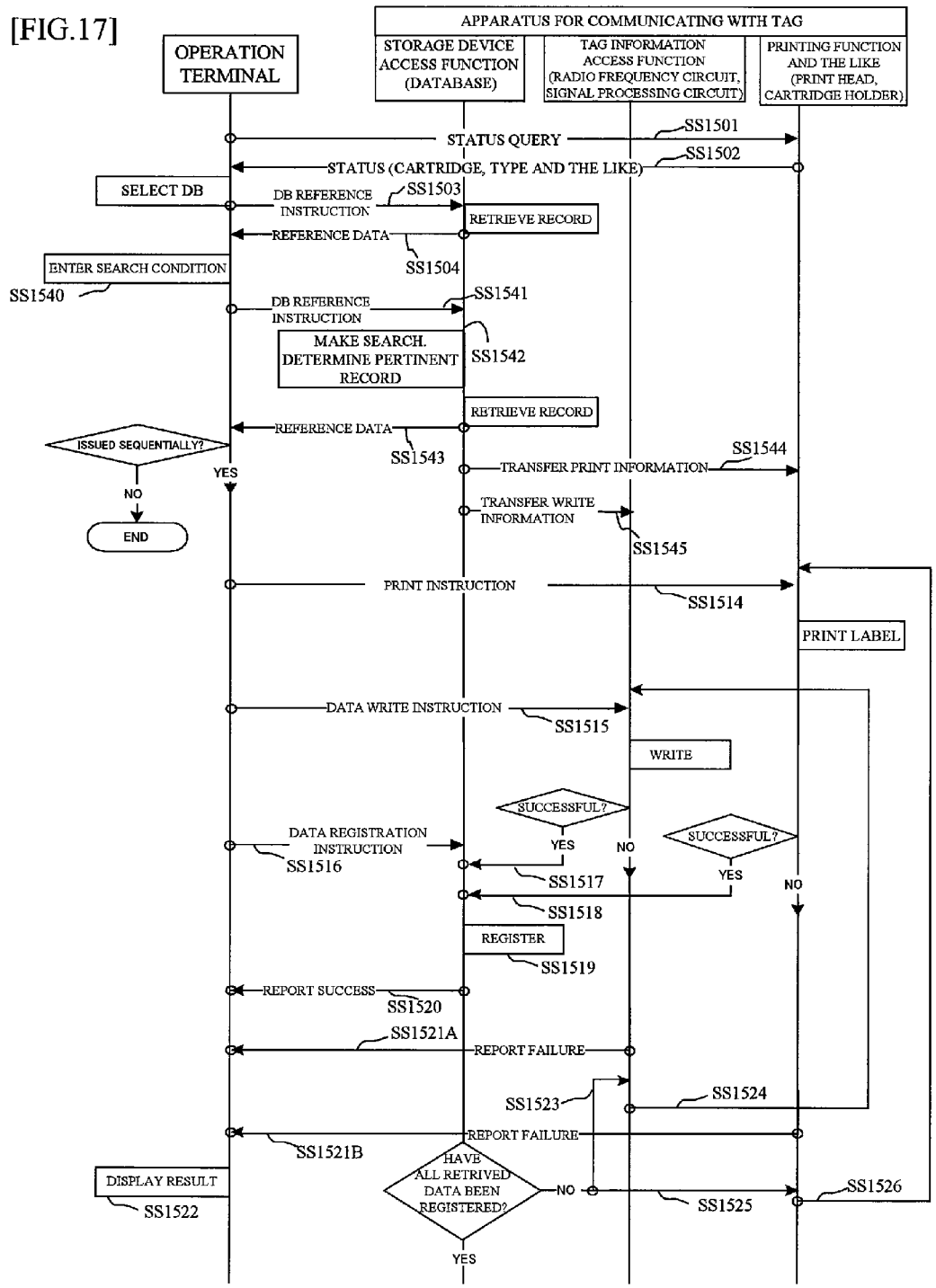

[FIG.18]
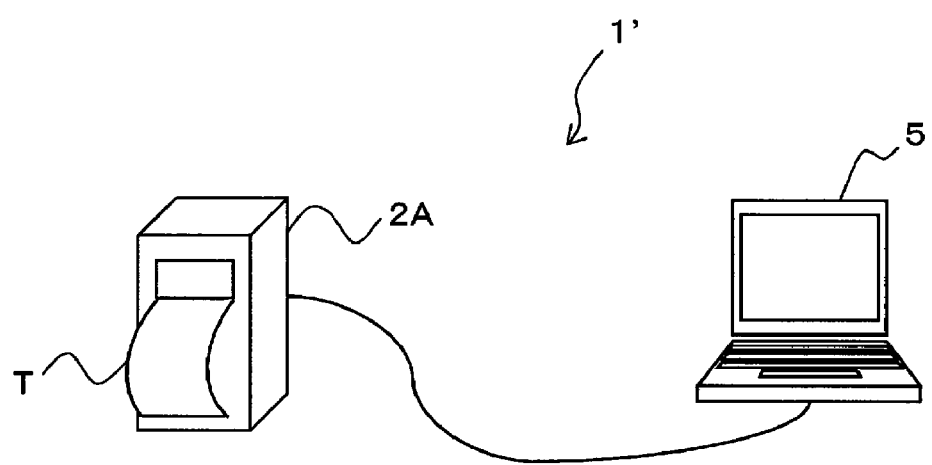

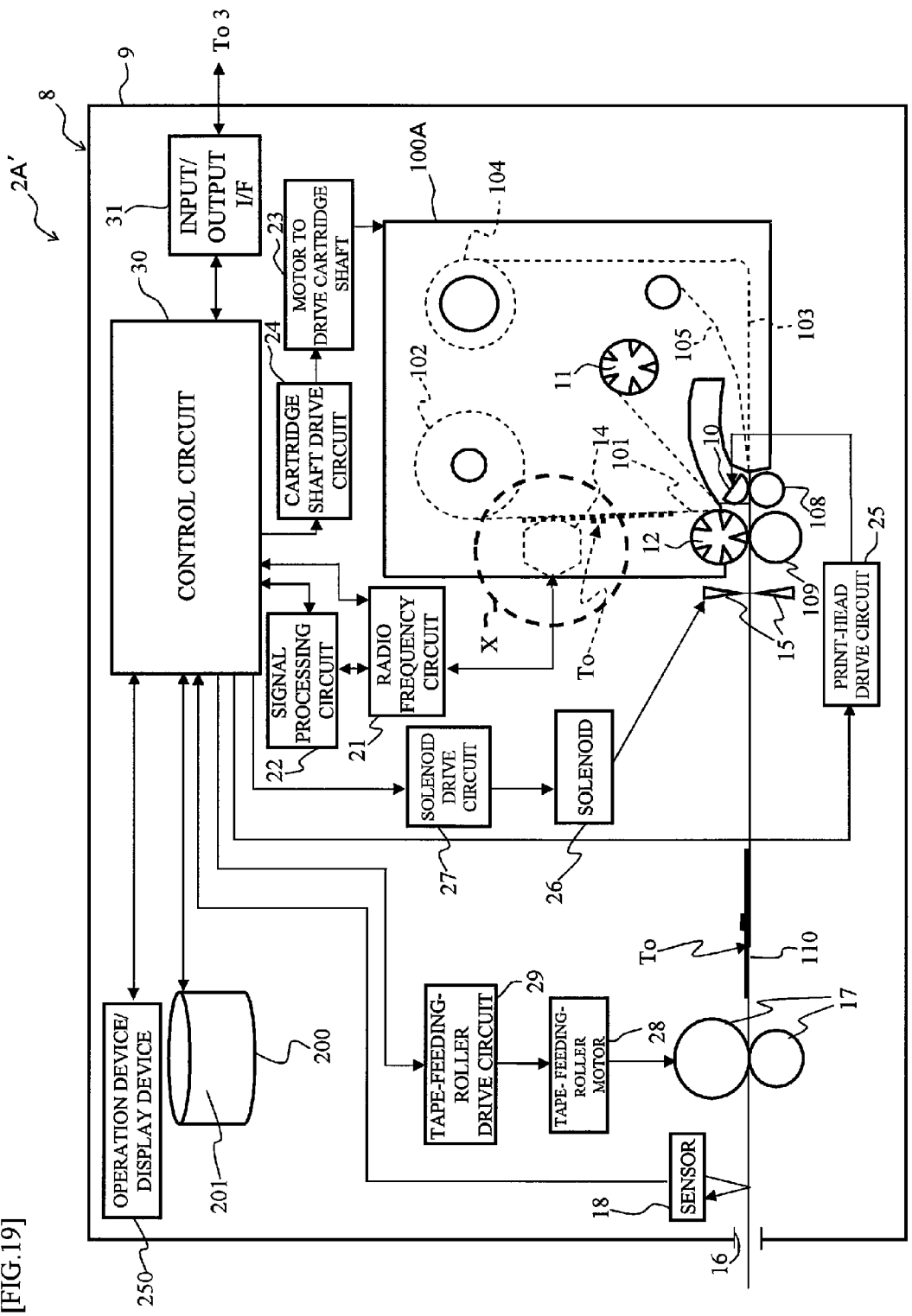

[FIG.20]
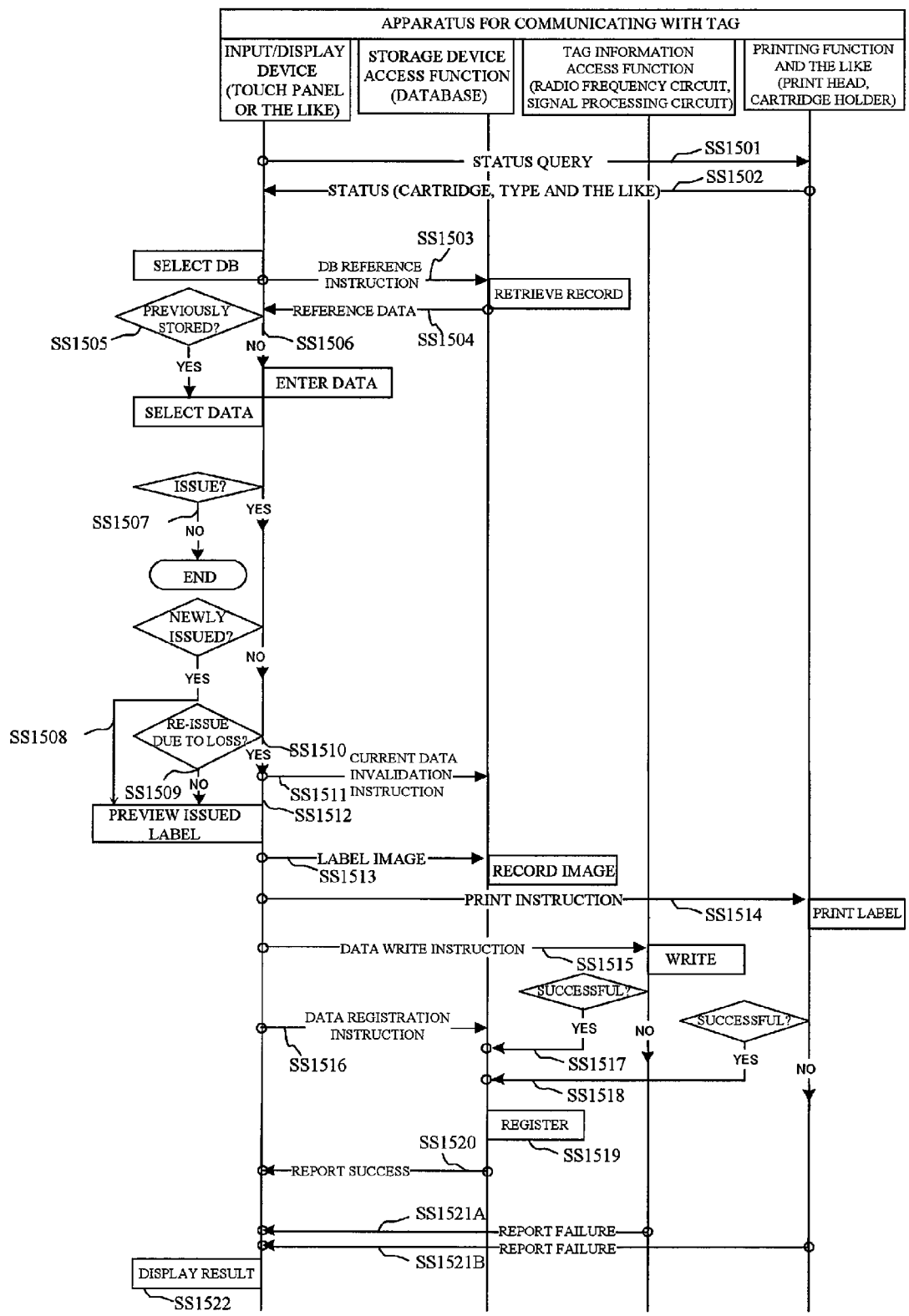

[FIG.21]
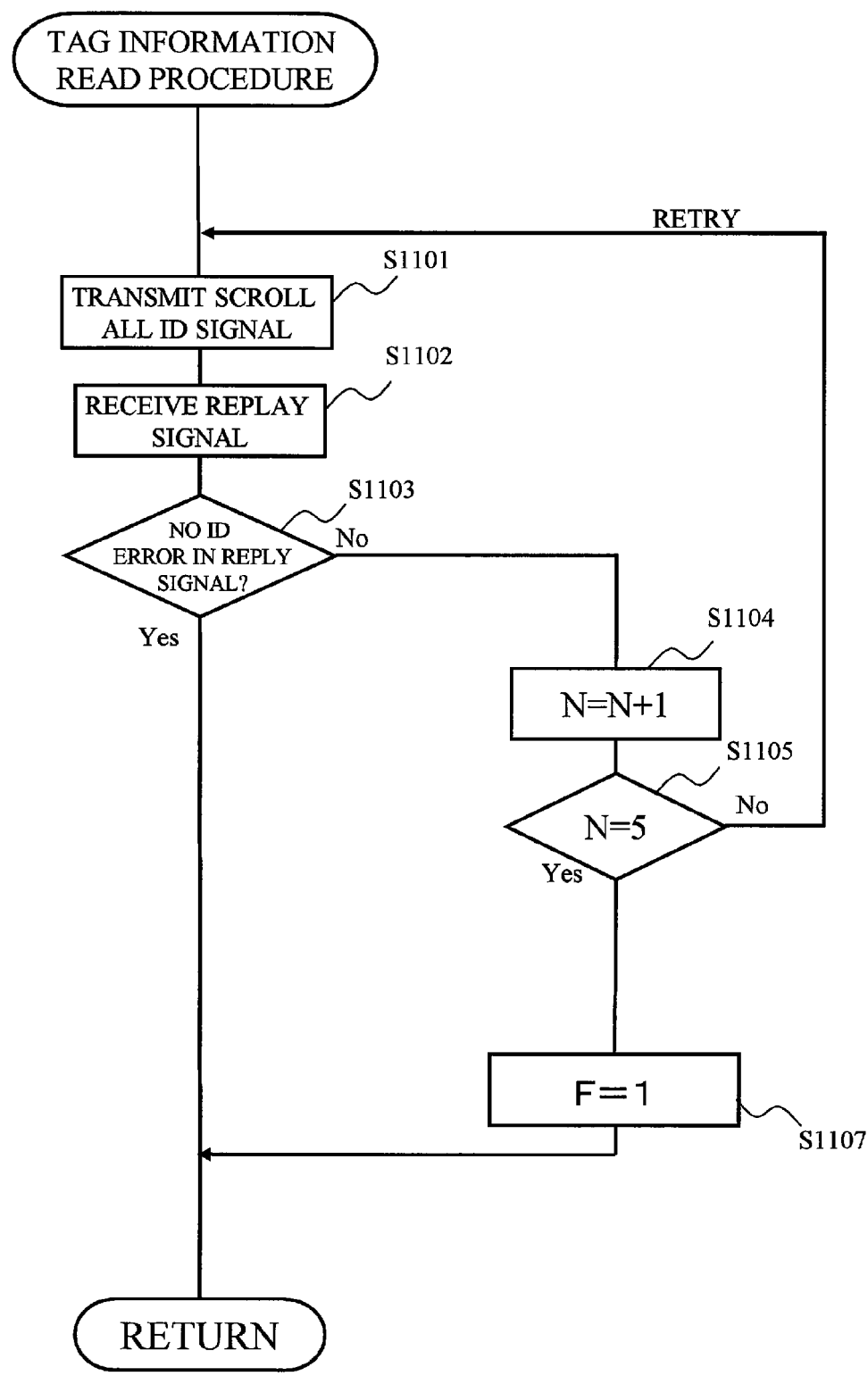

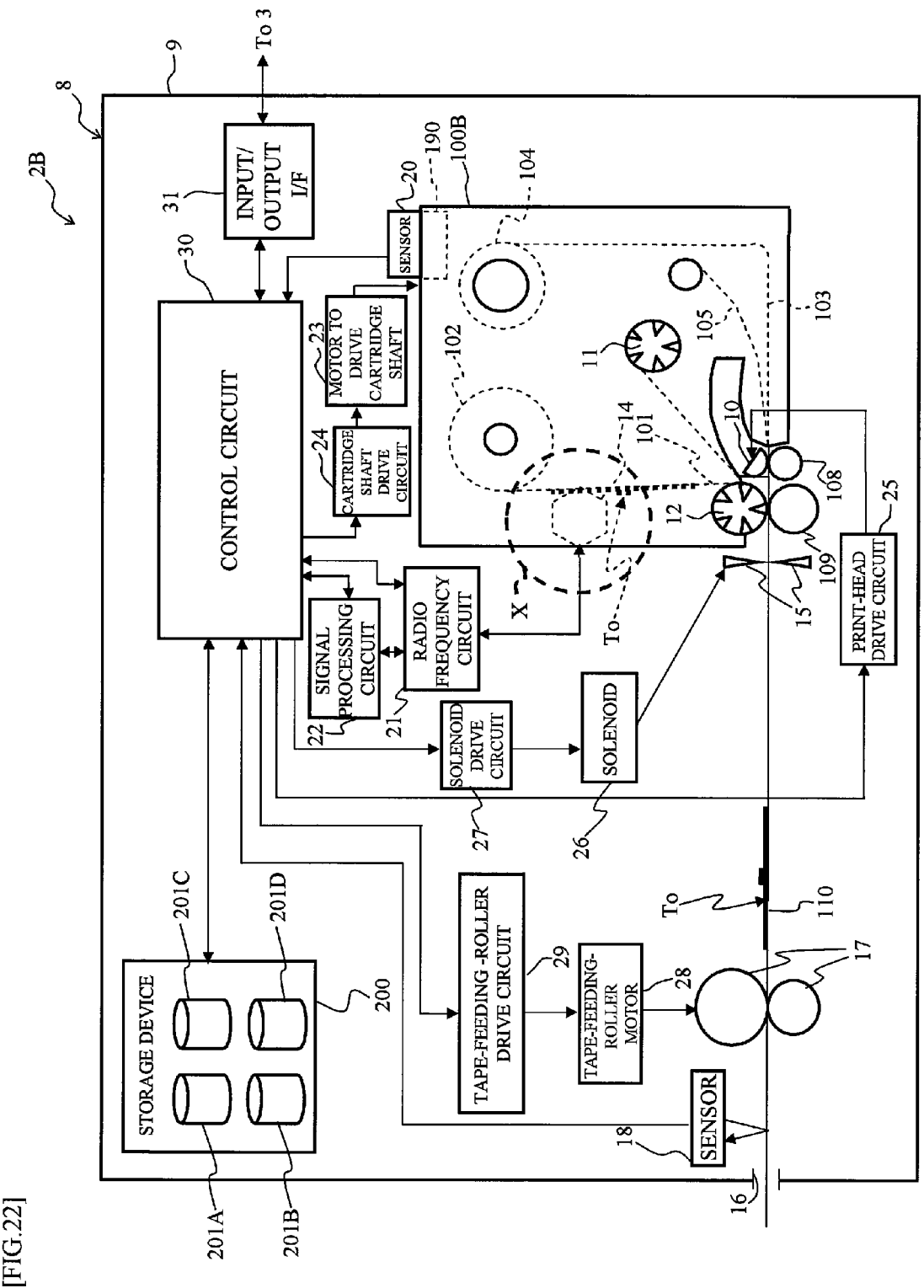
[FIG.22]

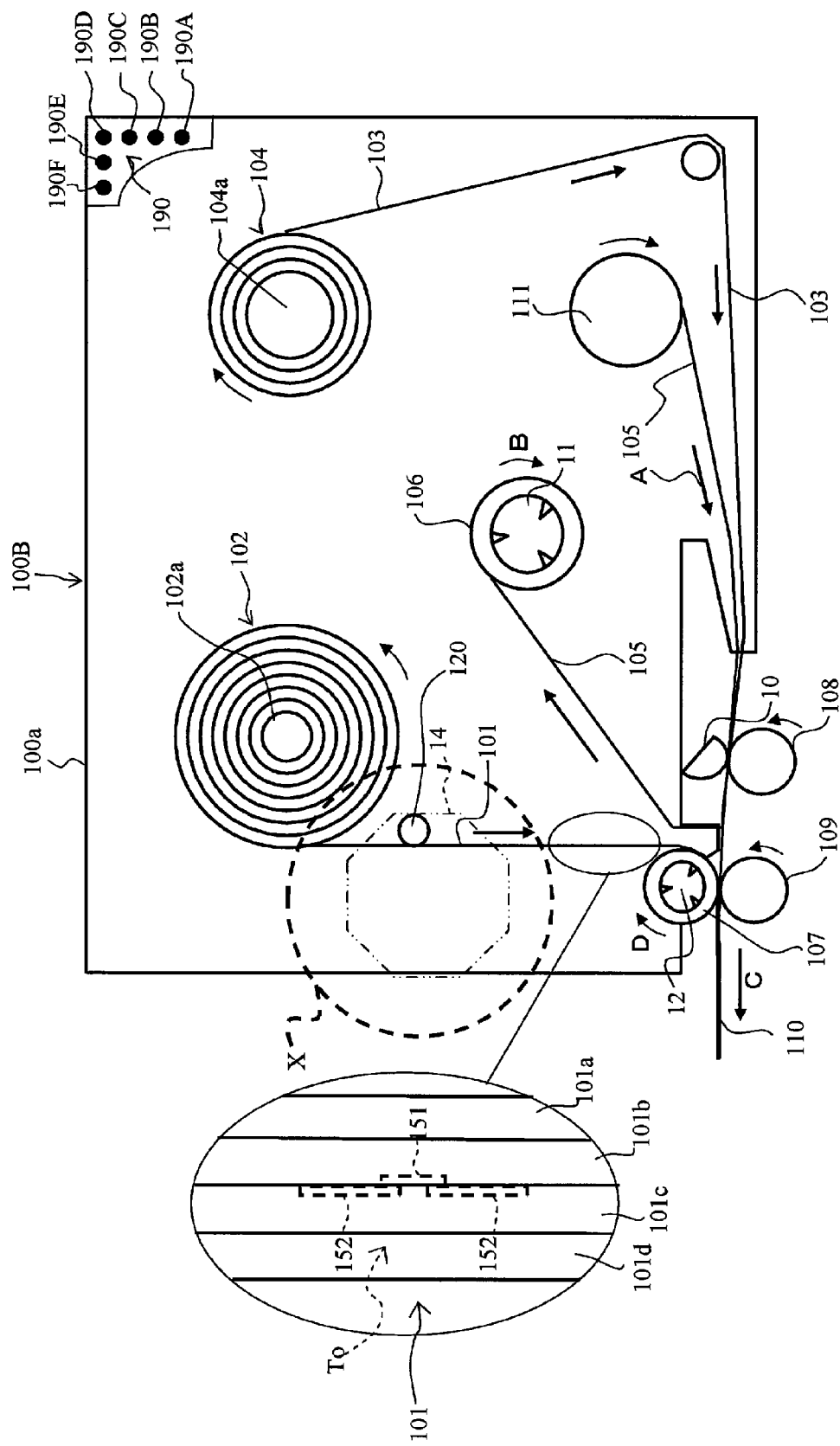
[FIG.23]

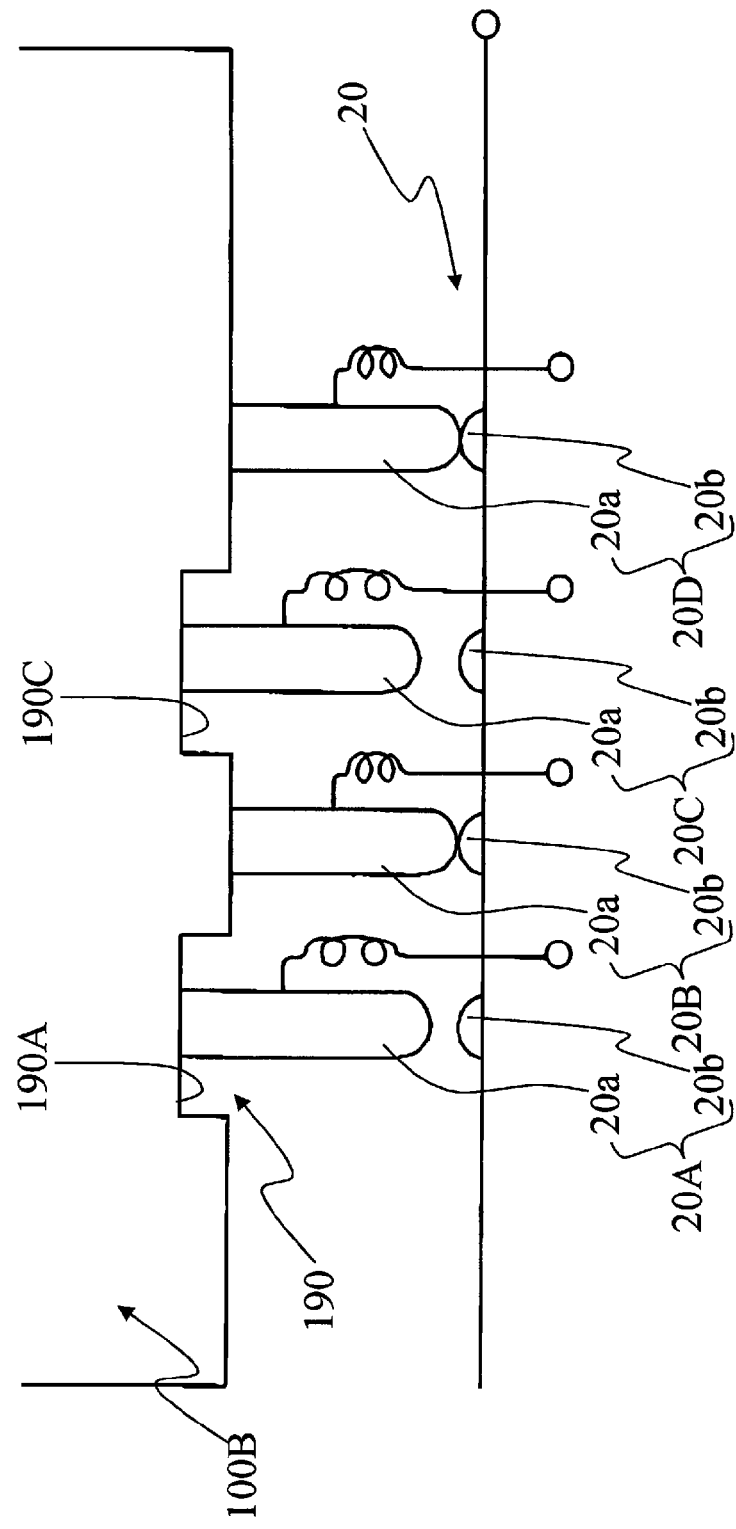

[FIG.25]

| CARTRIDGE IDENTIFICATION CODE (HEXADECIMAL) | DATABASE |
|---|---|
| 0 × 648, 0 × 548 | EMPLOYEE MANAGEMENT DB |
| 0 × 8C8, 0 × B48 | SUPPLY MANAGEMENT DB |
| 0 × 008, 0 × 088 | CUSTOMER MANAGEMENT DB |

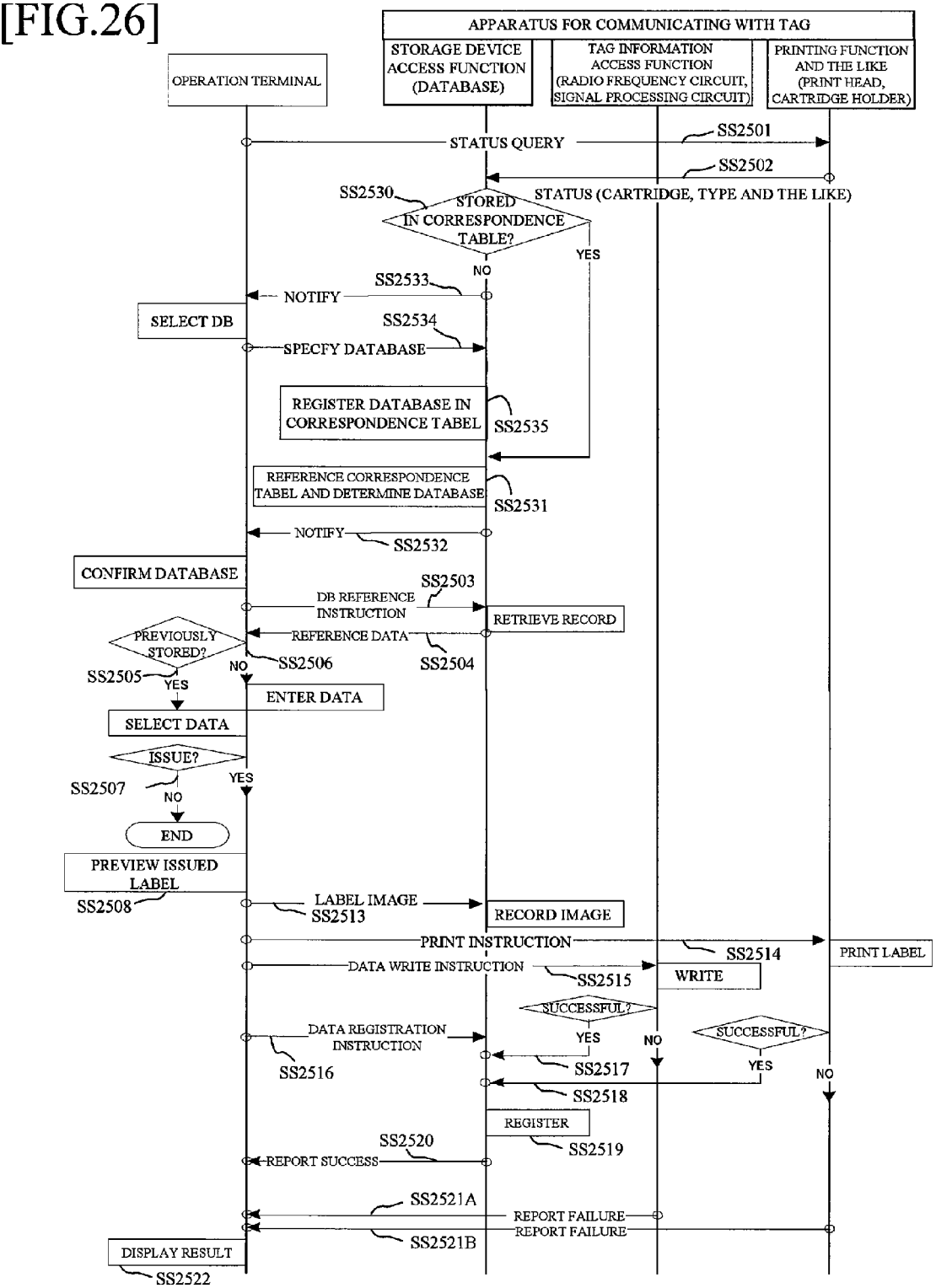
[FIG.26]

[FIG.27]
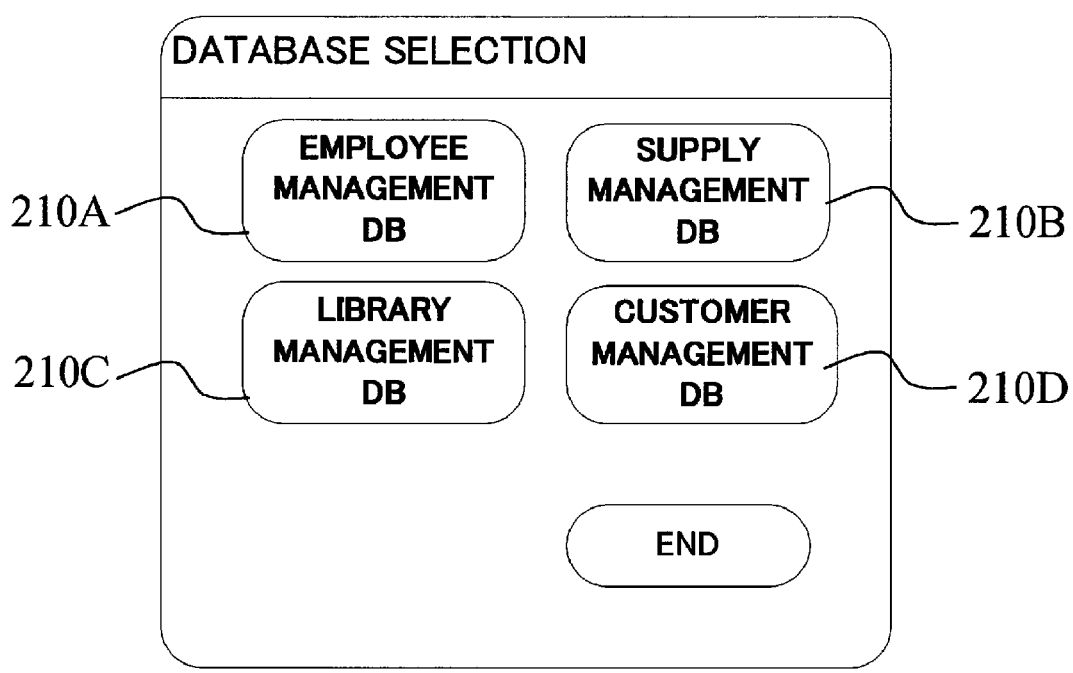

[FIG.28]
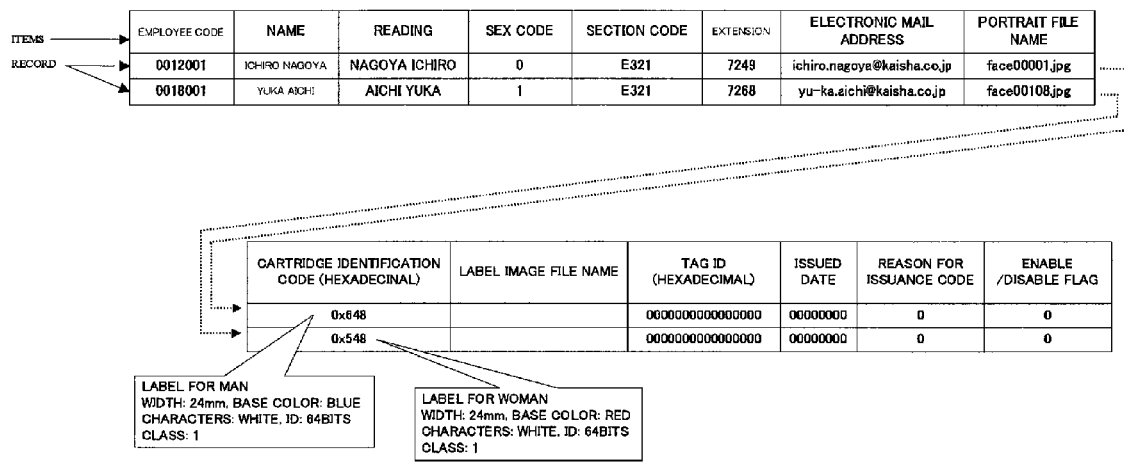
[FIG.29]
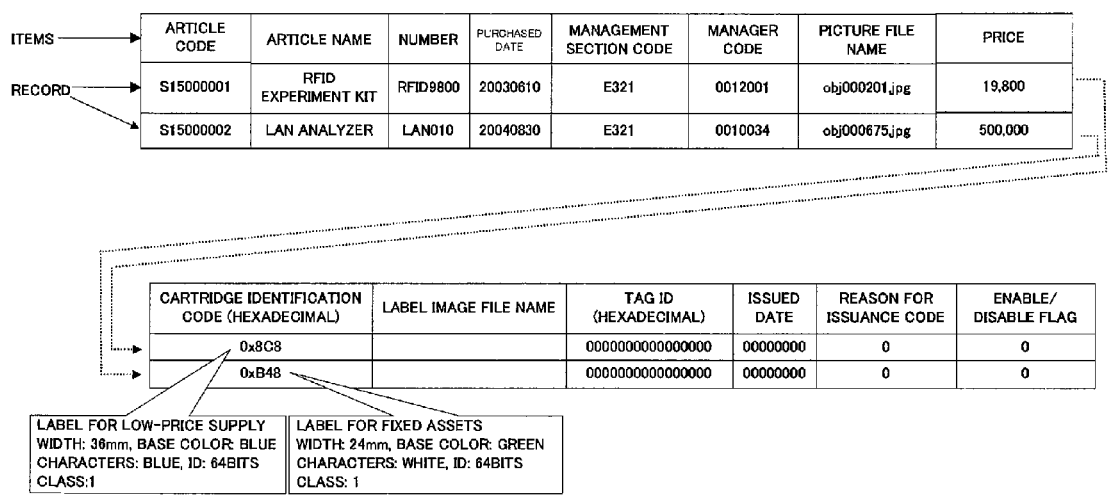

[FIG.30]

| CARTRIDGE IDENTIFICATION CODE (HEXADECIMAL) | DATABASE | ITEM CONDITION |
|---|---|---|
| 0×648 | EMPLOYEE MANAGEMENT DB | SEX 0 (MAN) AND NOT ISSUED |
| 0×548 | EMPLOYEE MANAGEMENT DB | SEX 1 (WOMAN) AND NOT ISSUED |
| 0×8C8 | SUPPLY MANAGEMENT DB | PRICE<200,000 AND NOT ISSUED |
| 0×B48 | SUPPLY MANAGEMENT DB | PRICE≧200,000 AND NOT ISSUED |
| 0×008 | CUSTOMER MANAGEMENT DB | NUMBER OF TIMES OF TRADES≧10 AND NOT ISSUED |
| 0×088 | CUSTOMER MANAGEMENT DB | NUMBER OF TIMES OF TRADES<10 AND NOT ISSUED |

[FIG.31]
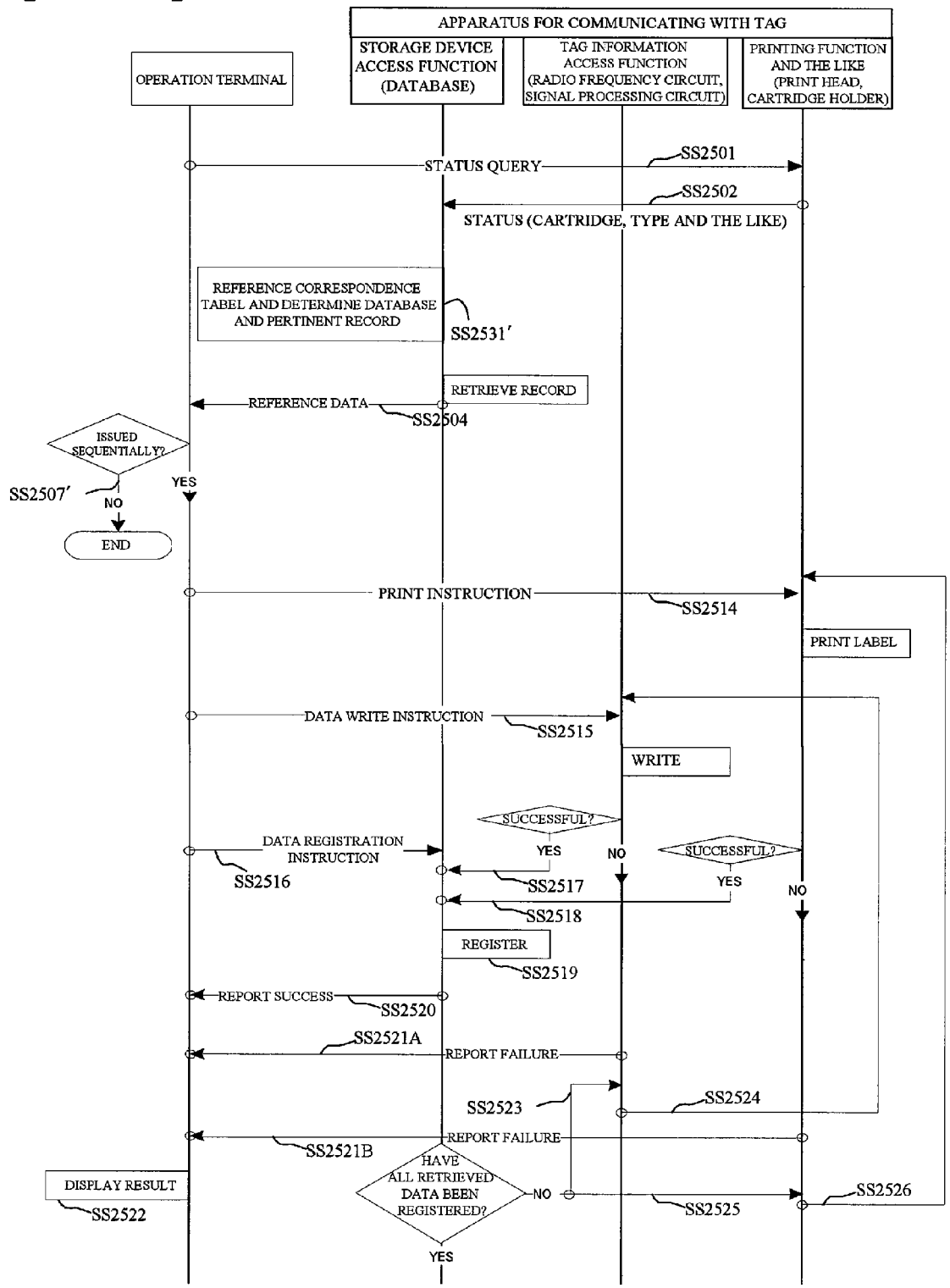

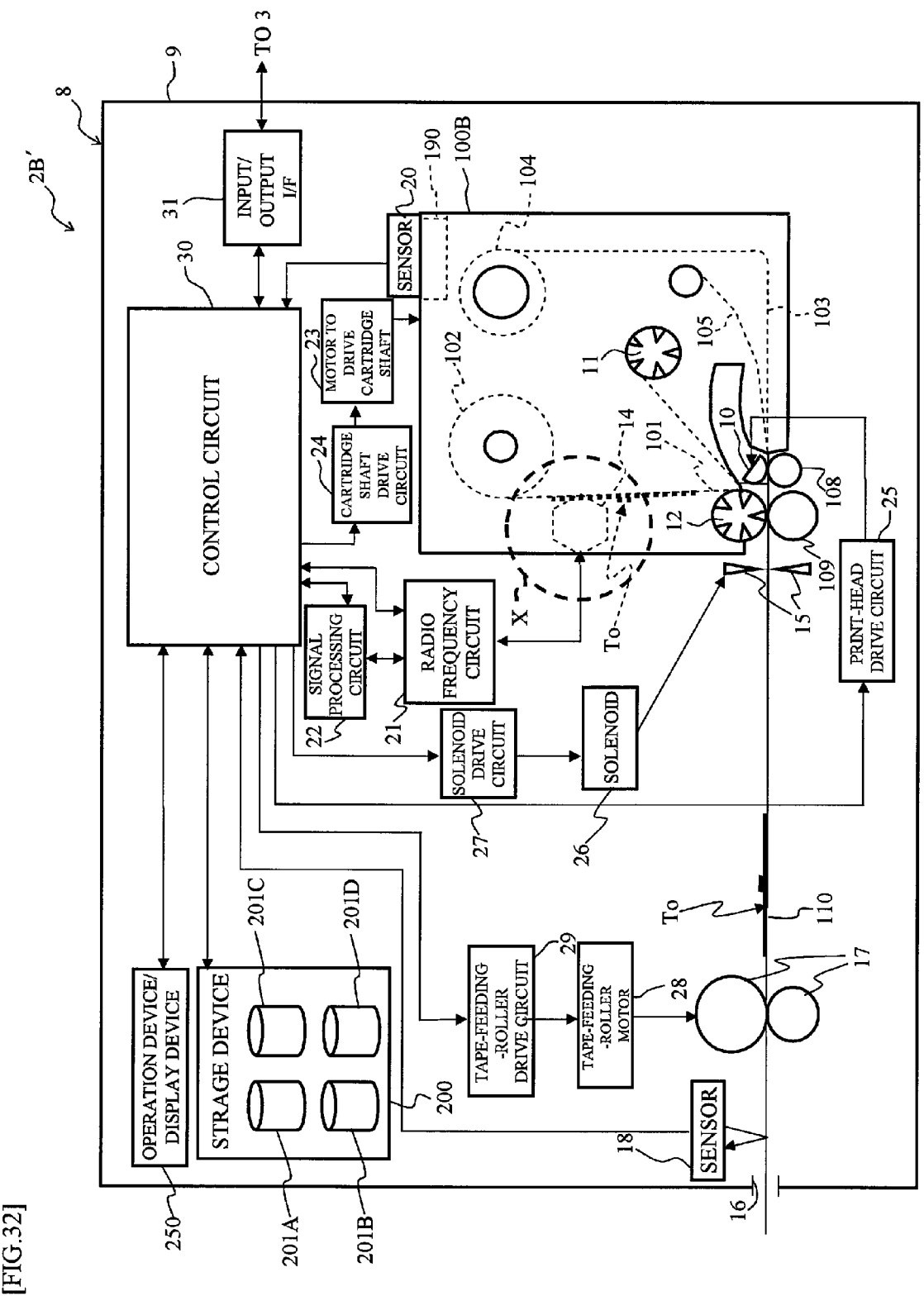
[FIG.32]

[FIG. 33]
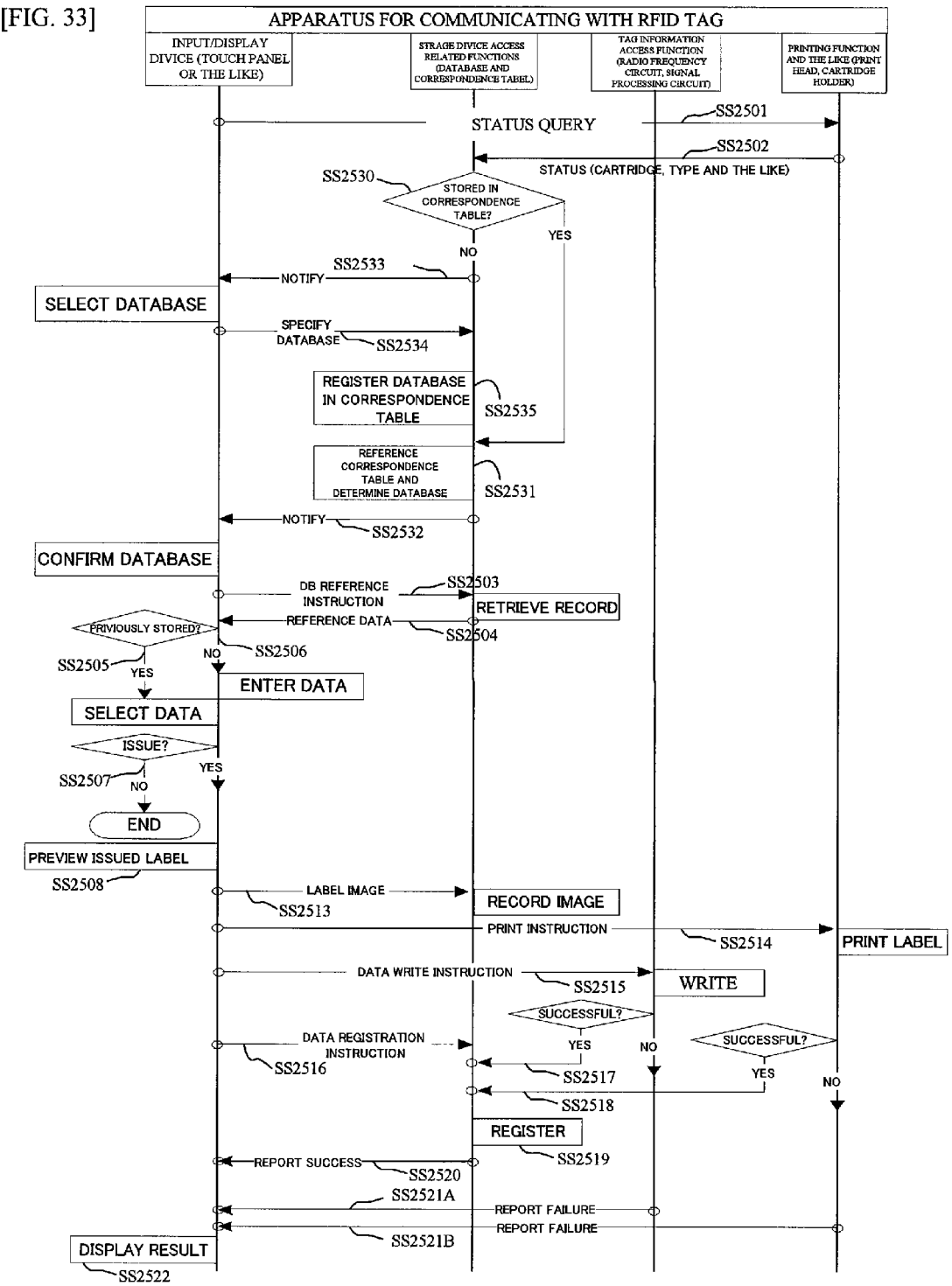

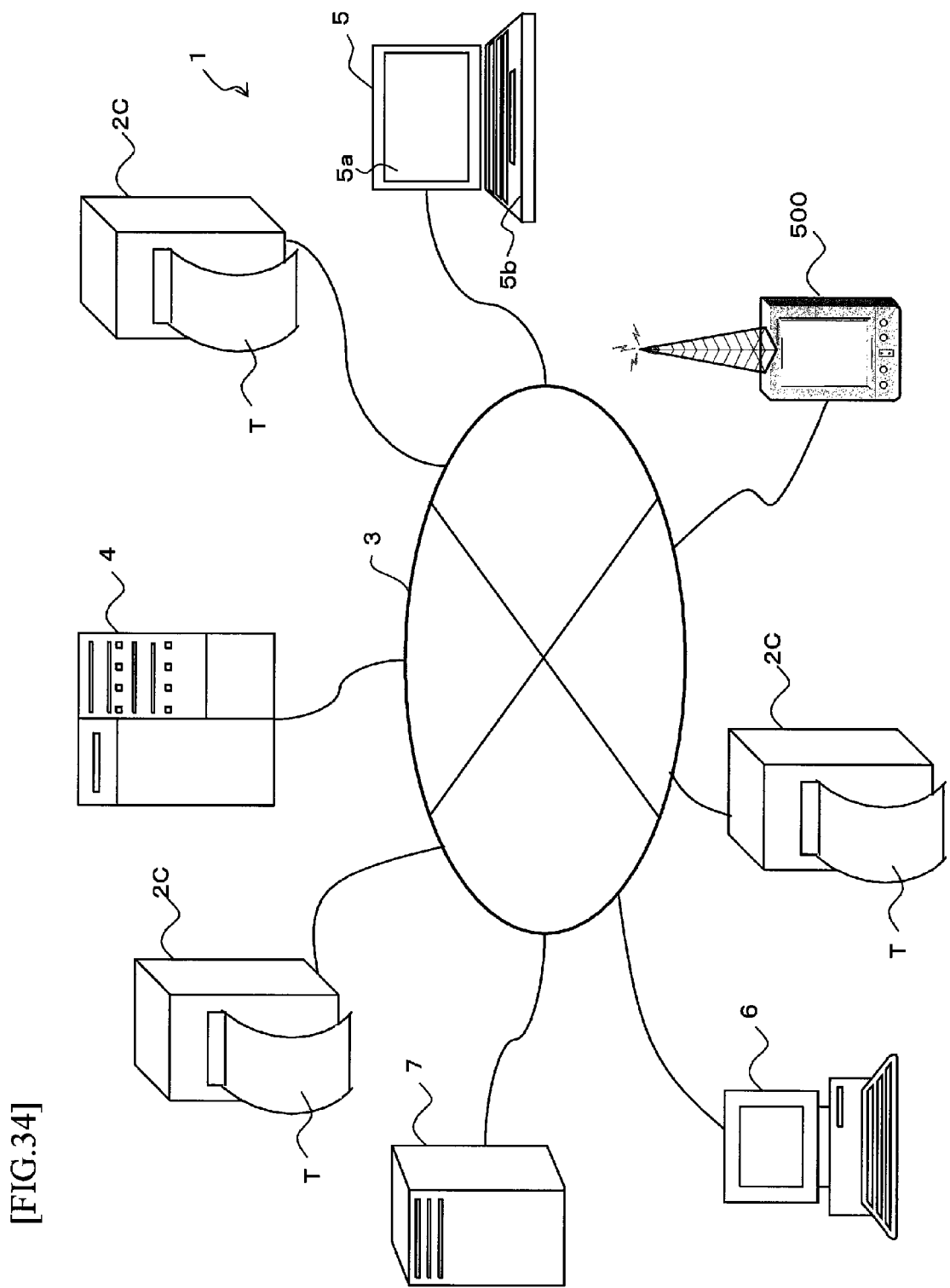
[FIG.34]

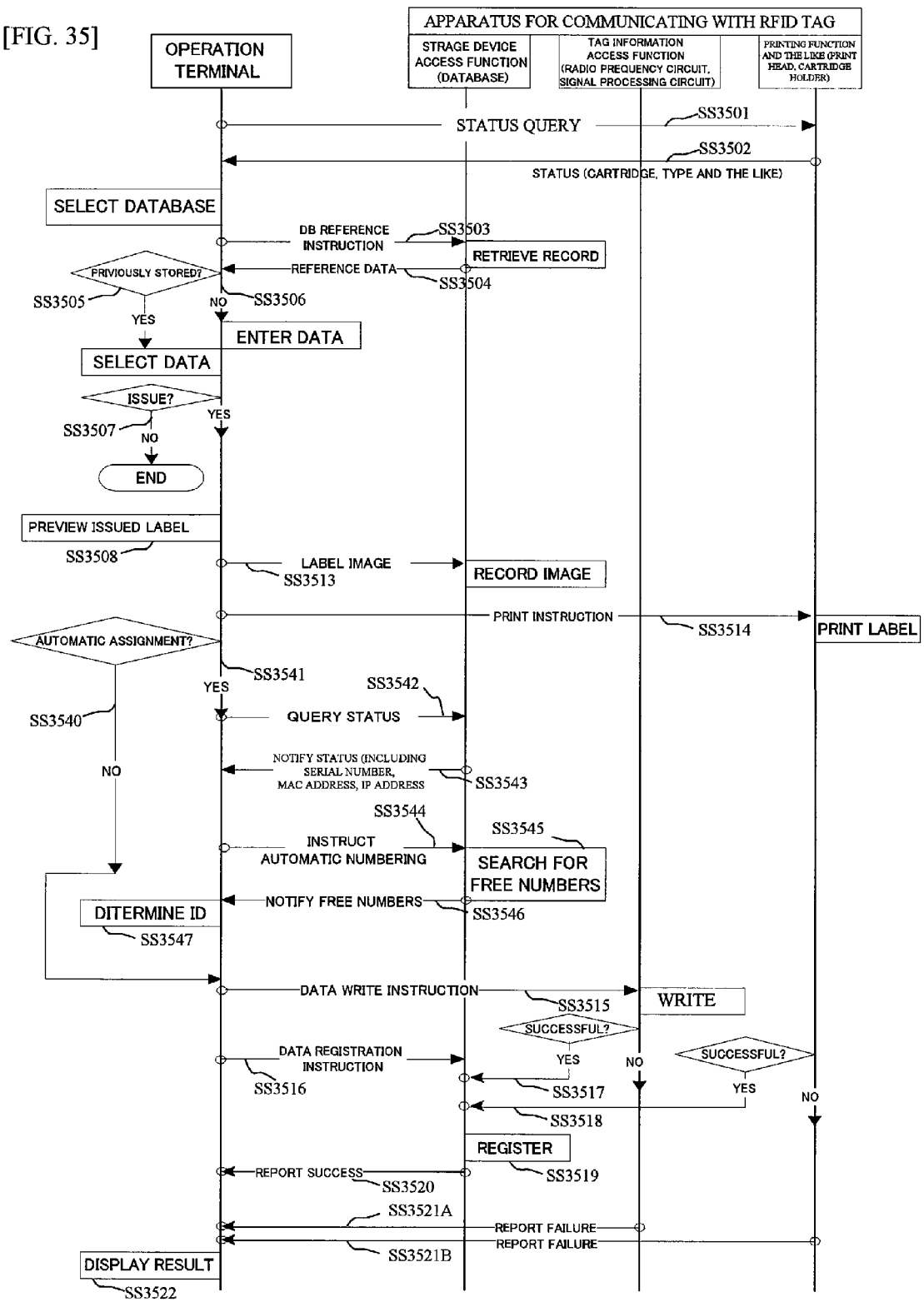

[FIG.36]
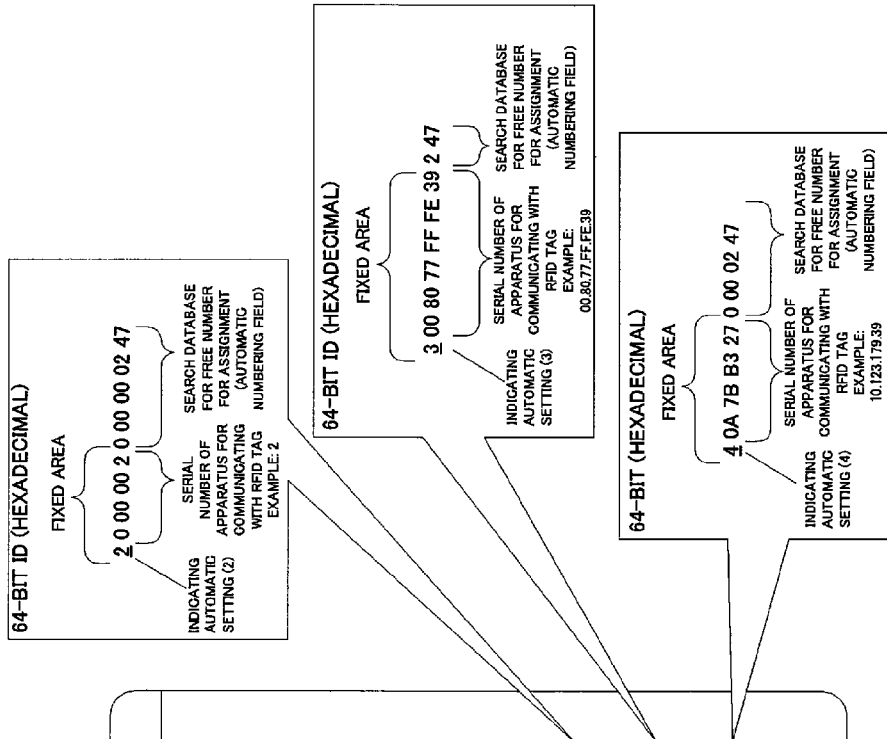
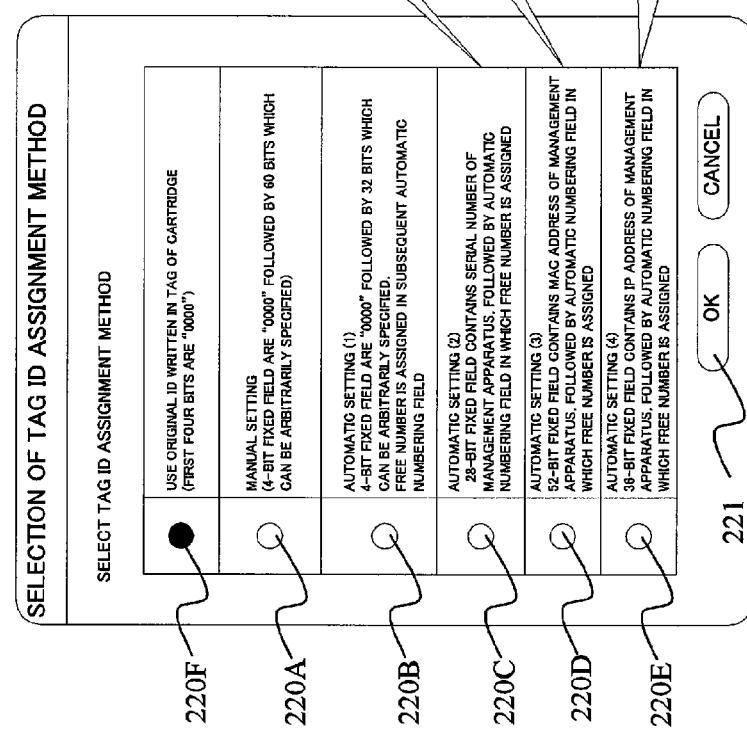

[FIG.37]
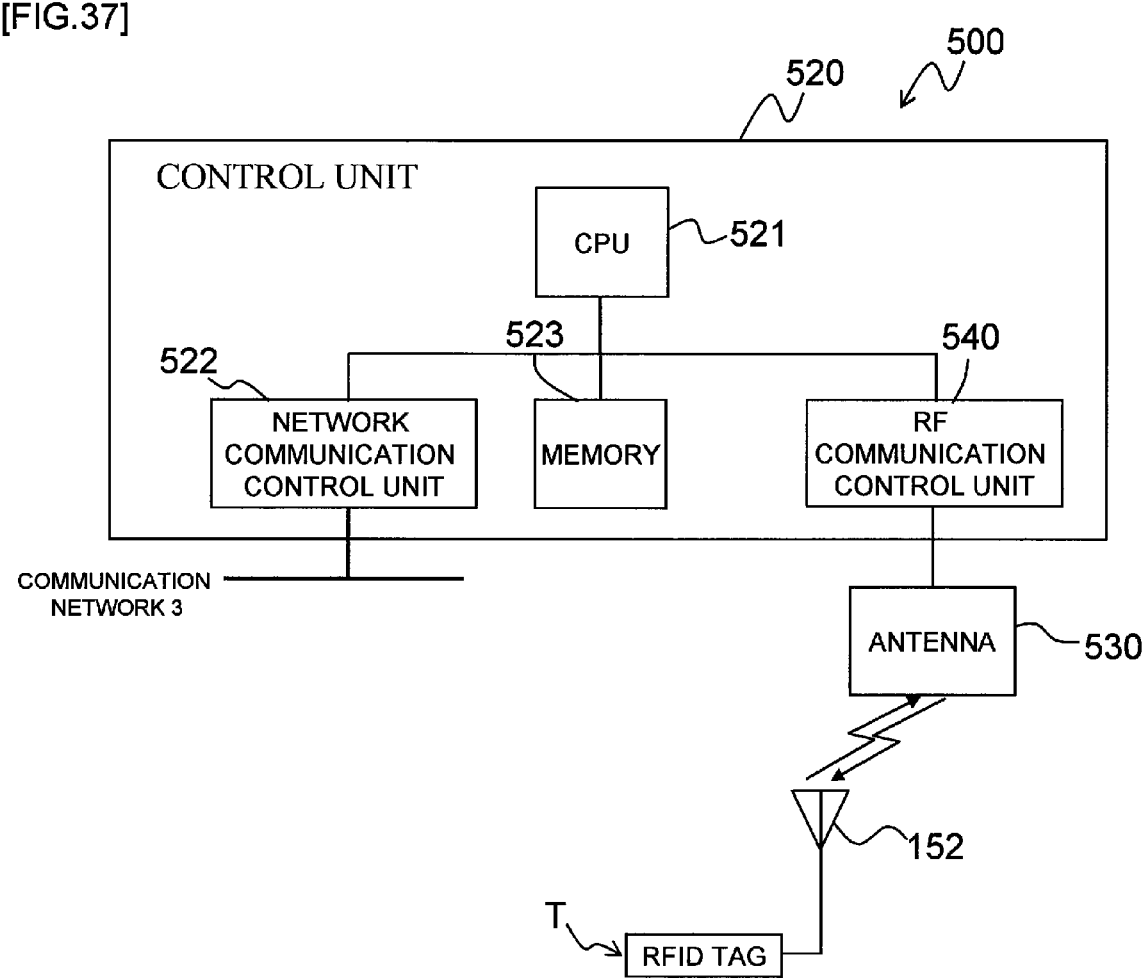

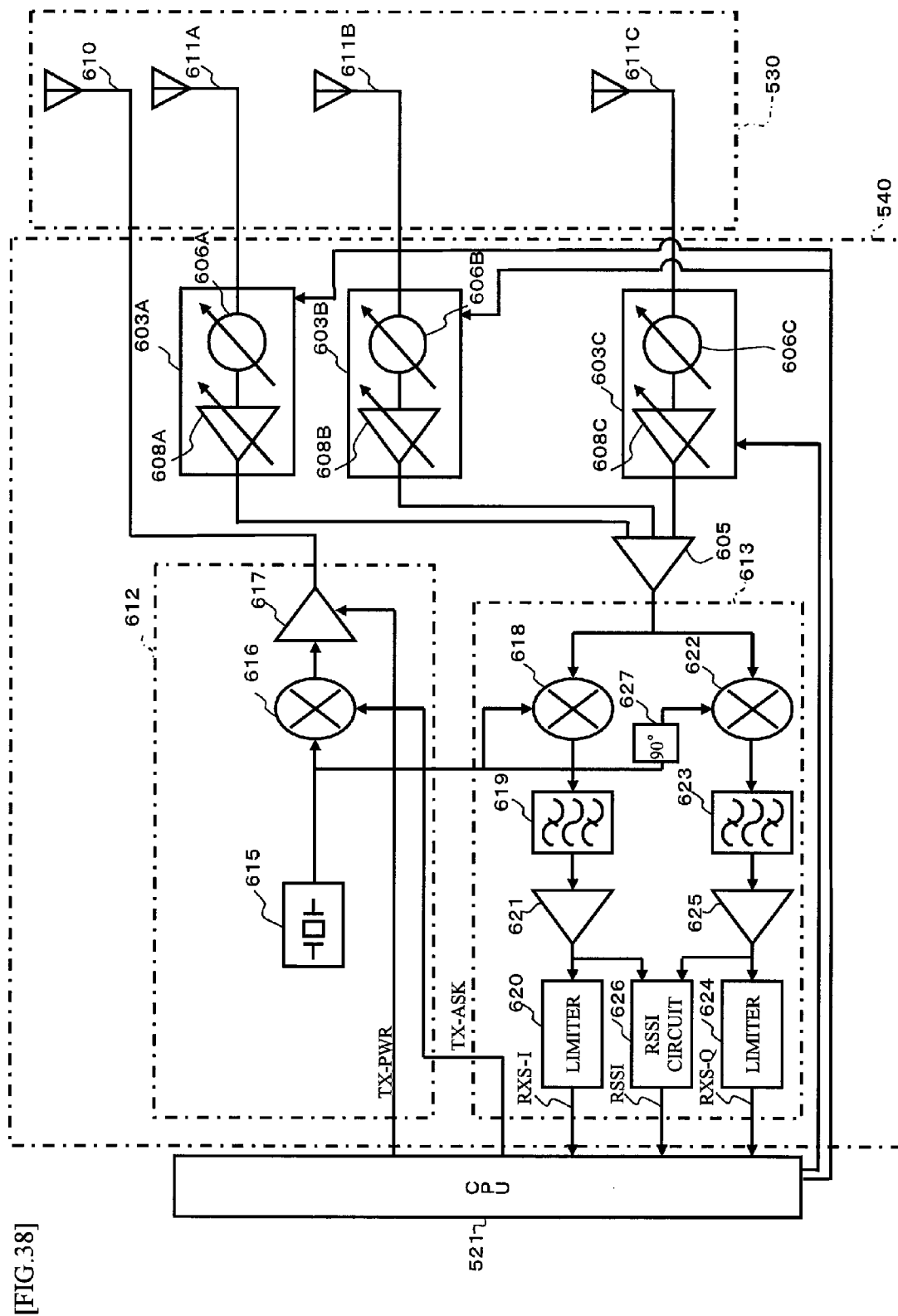
[FIG. 38]

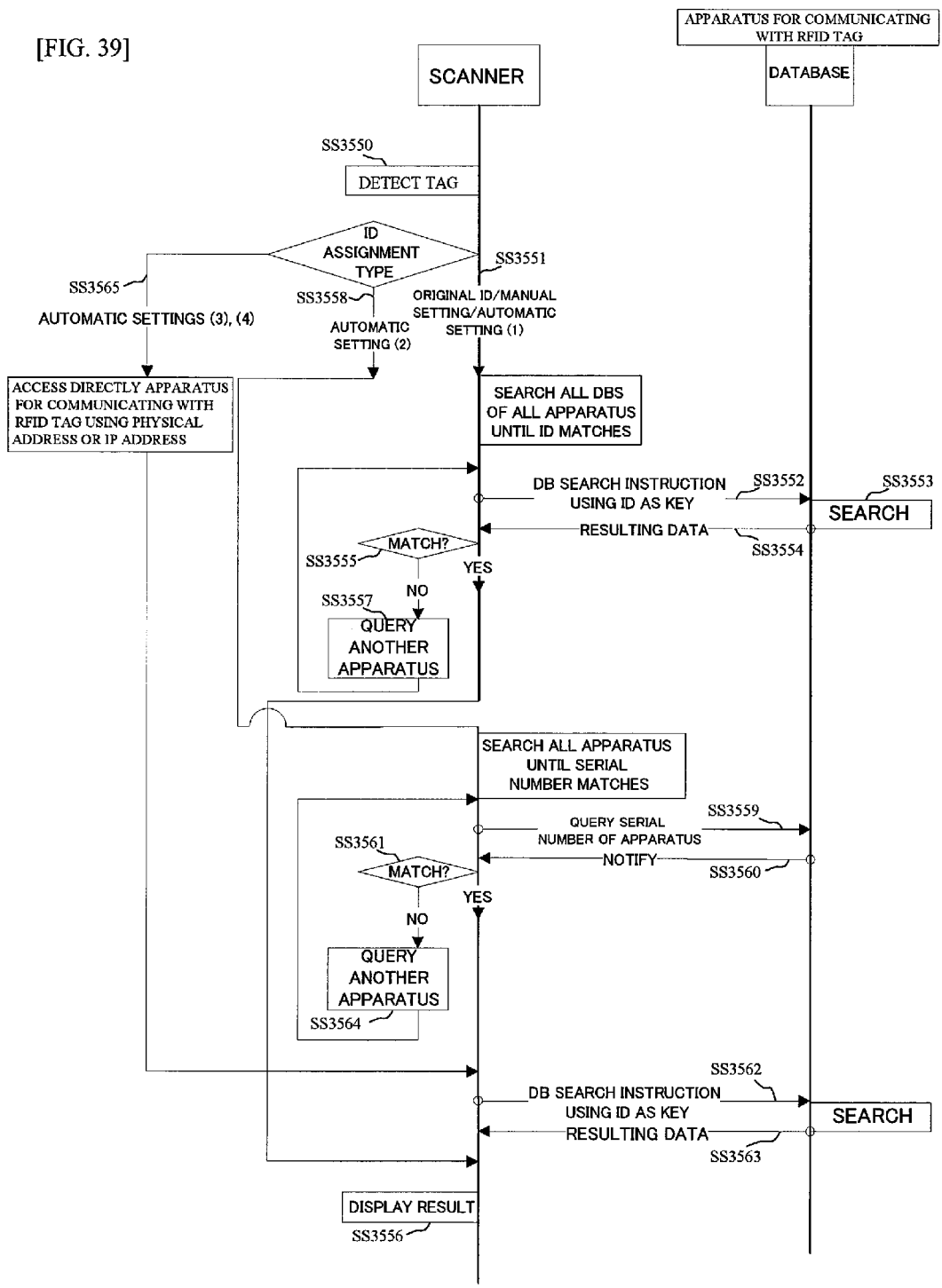
[FIG. 39]

[FIG.40]
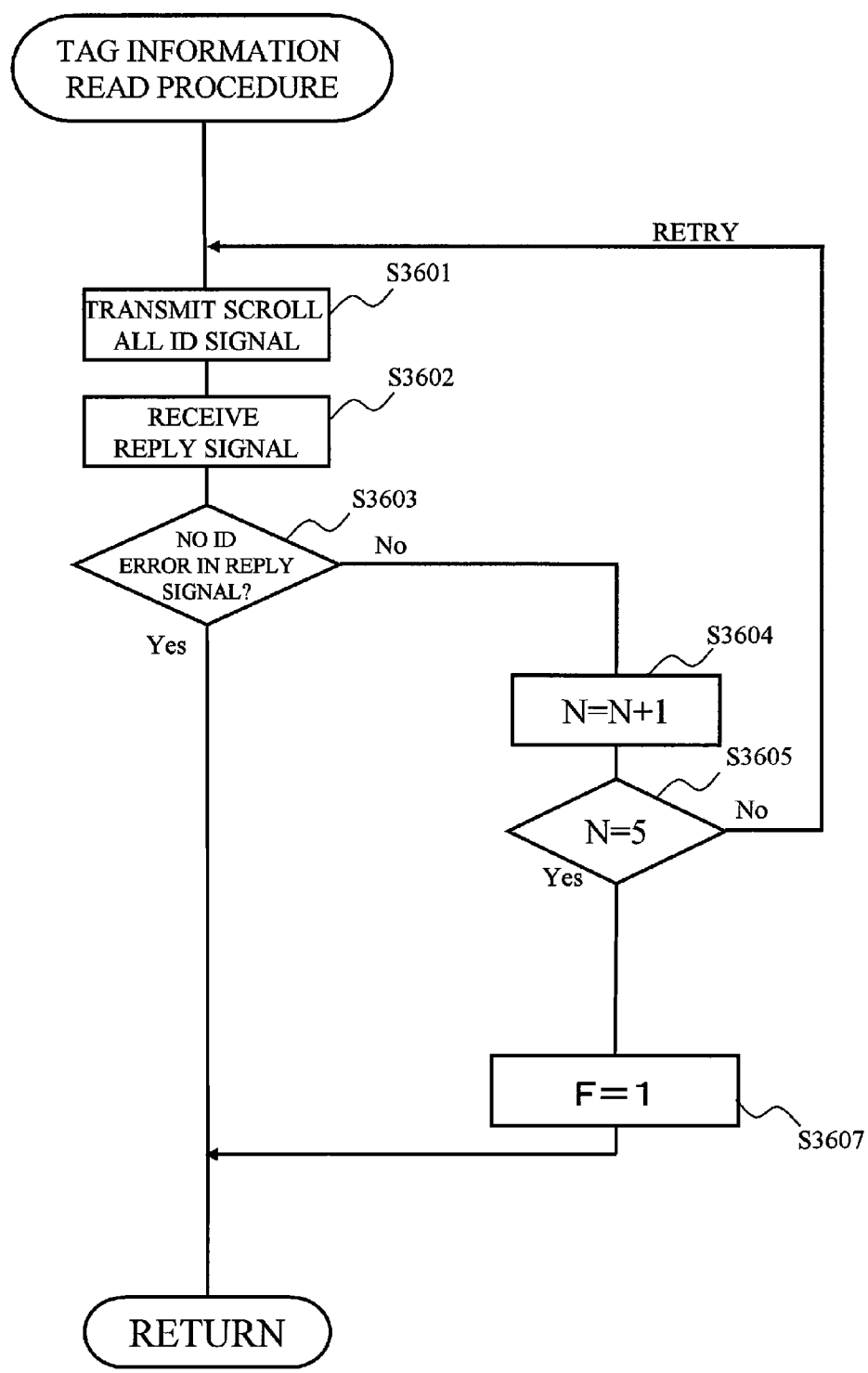

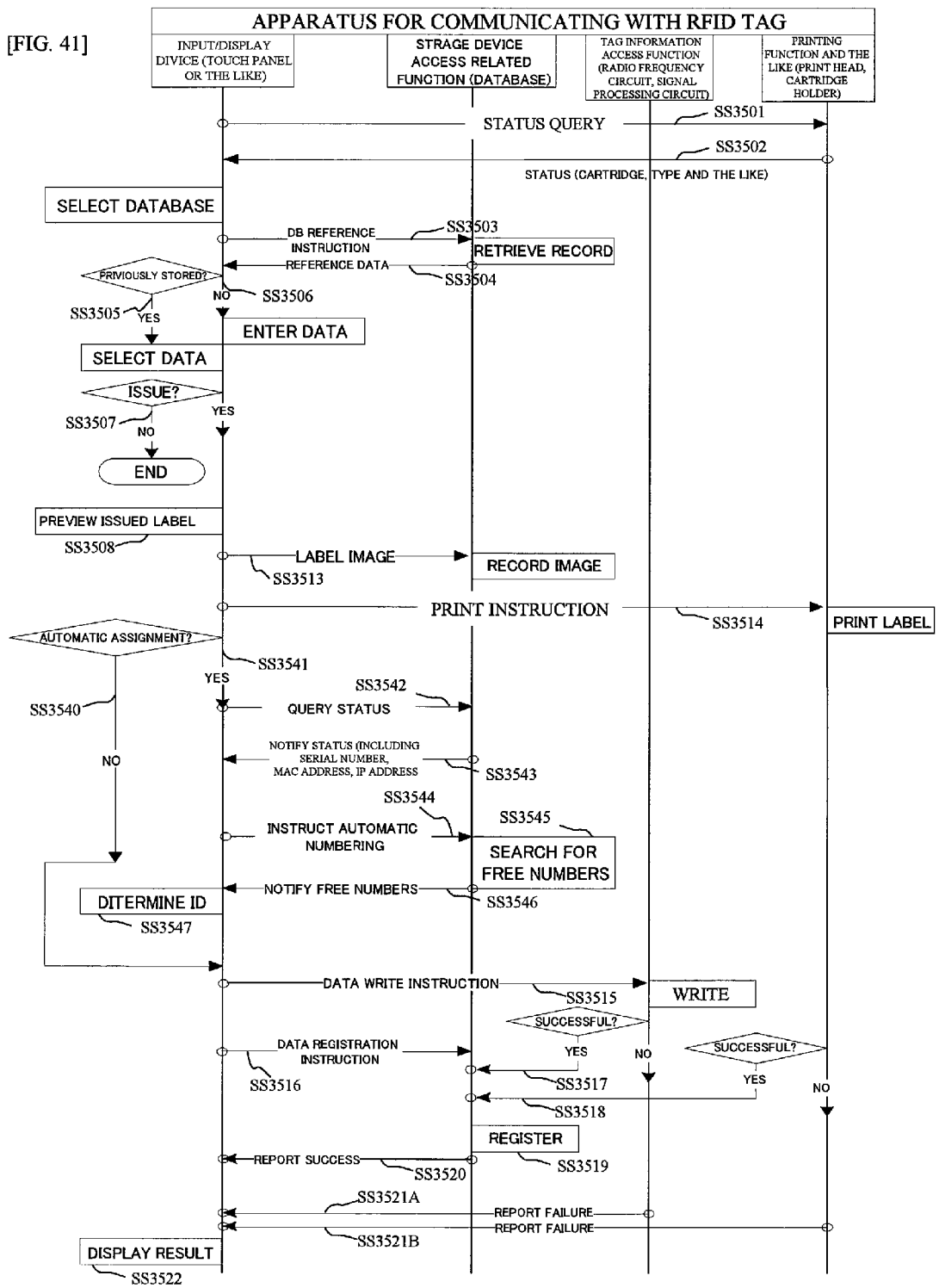

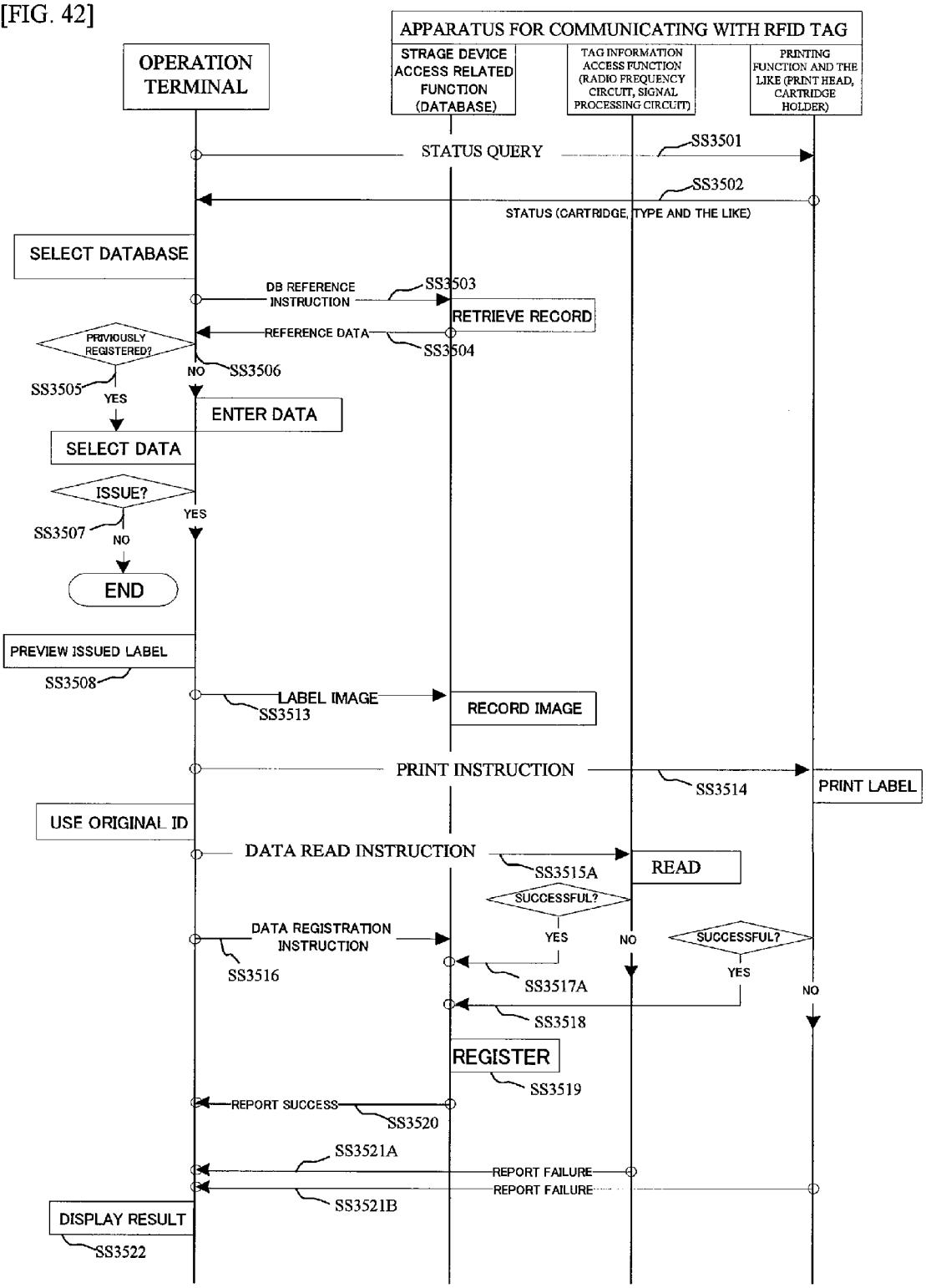

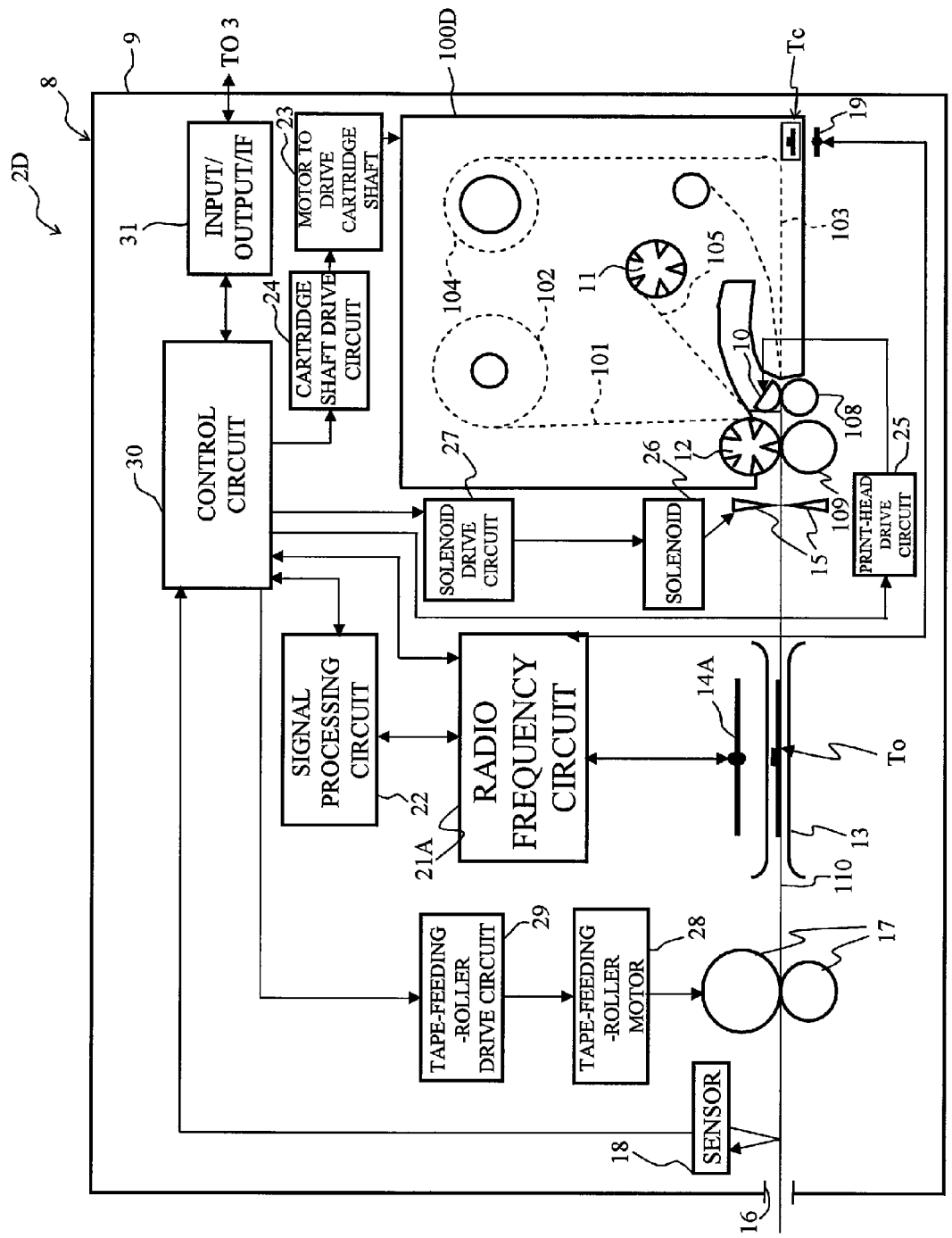
[FIG.43]

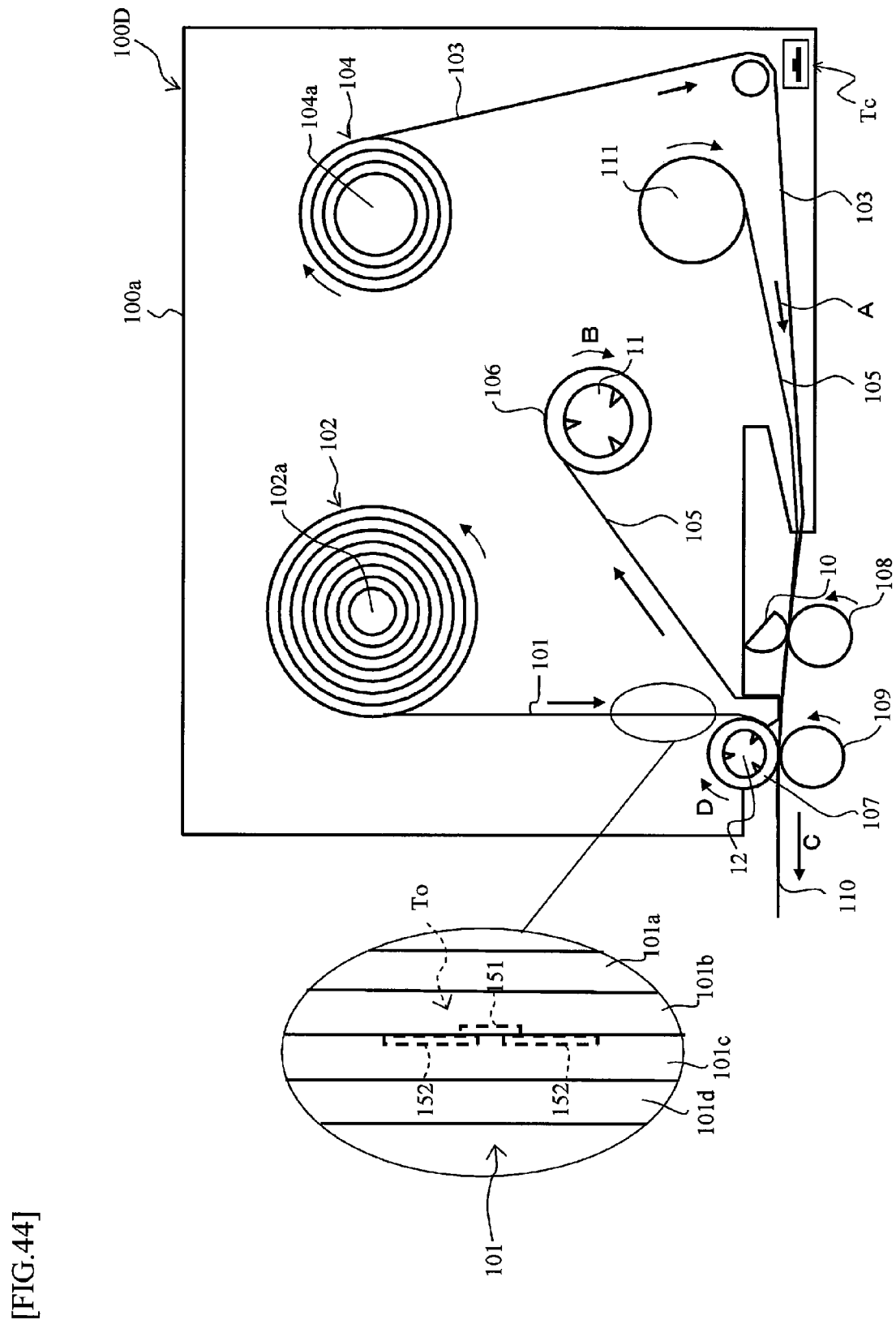
[FIG.44]

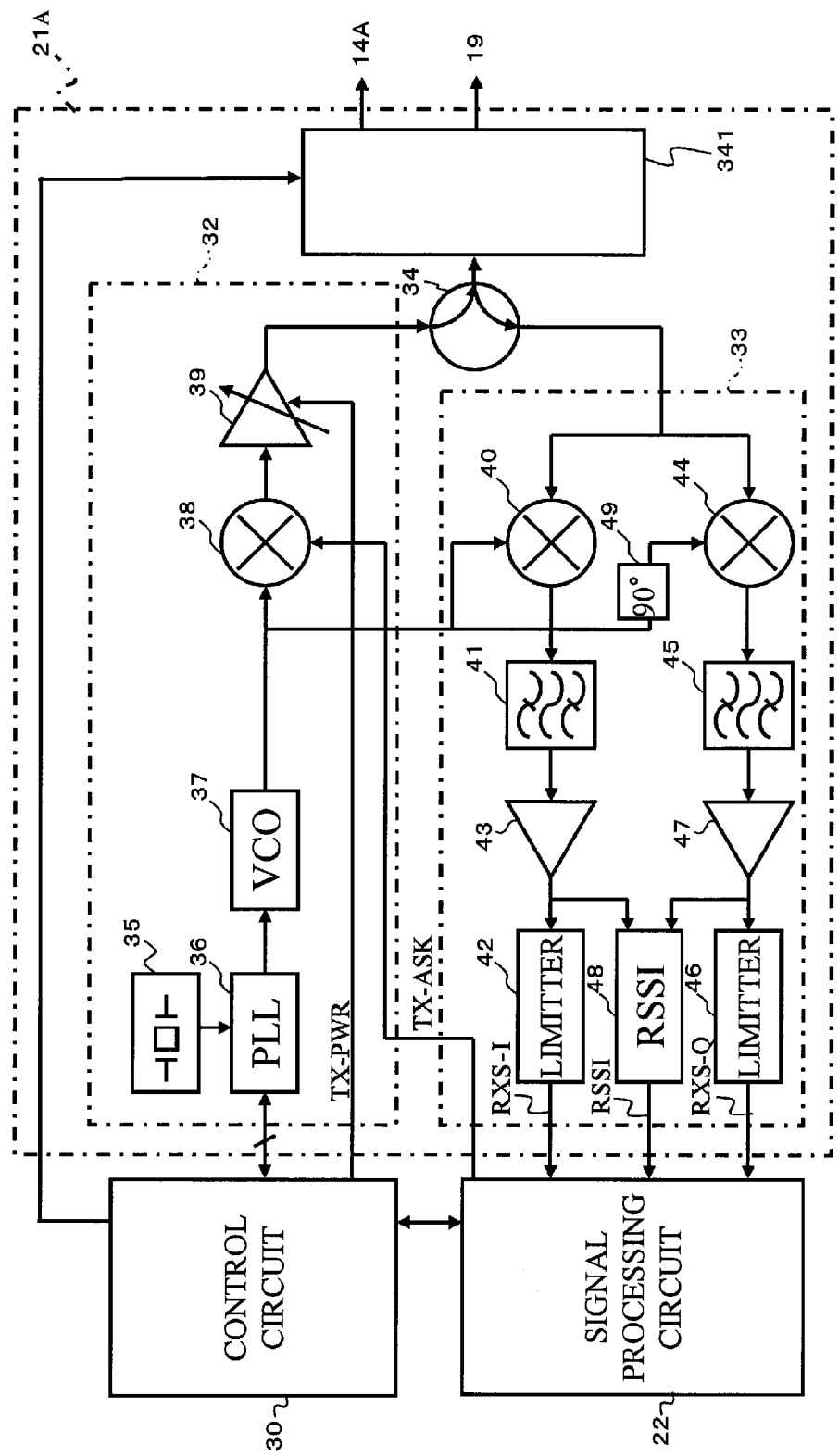
[FIG.45]

[FIG.46]
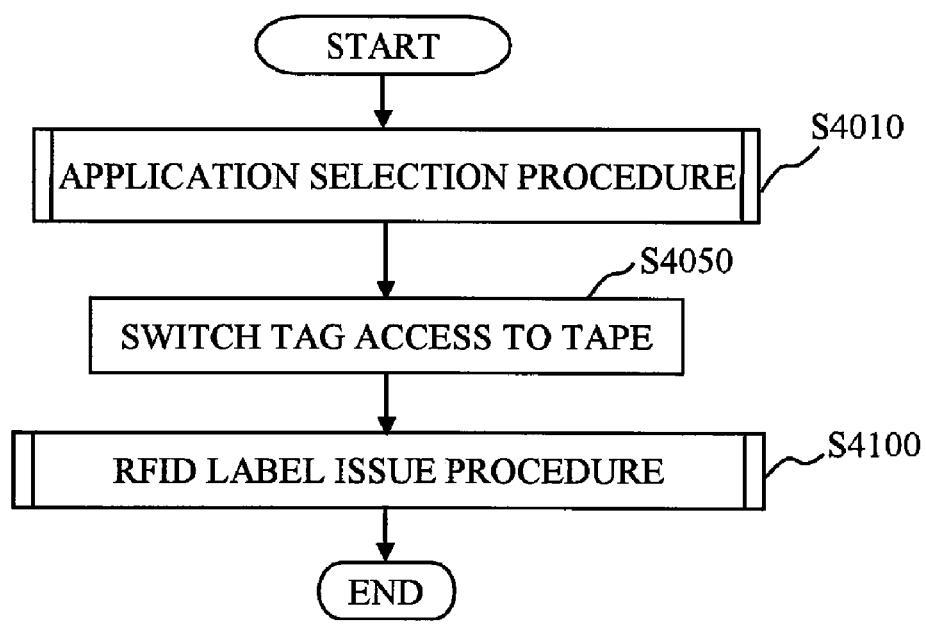

[FIG.47]
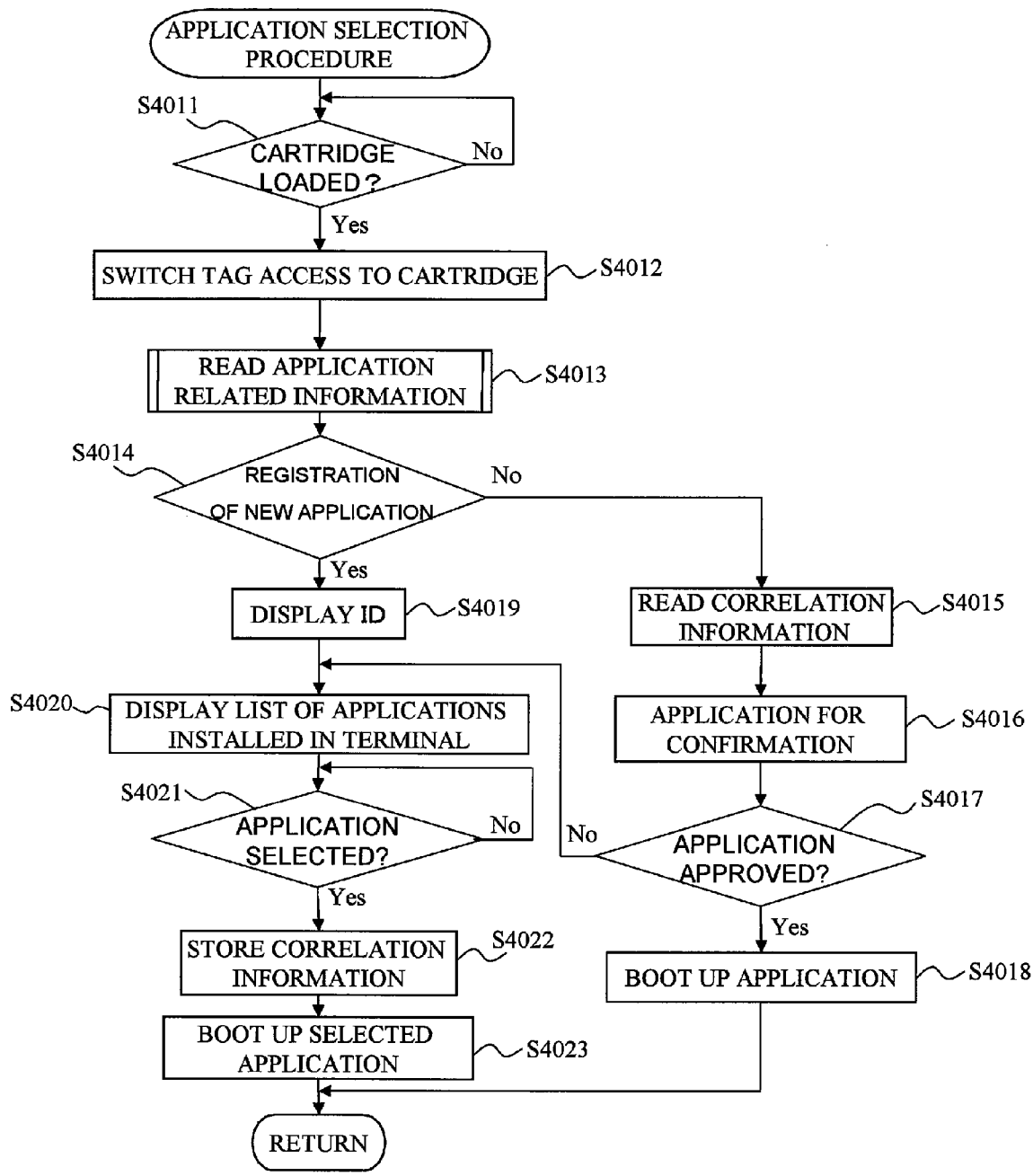

[FIG.48]
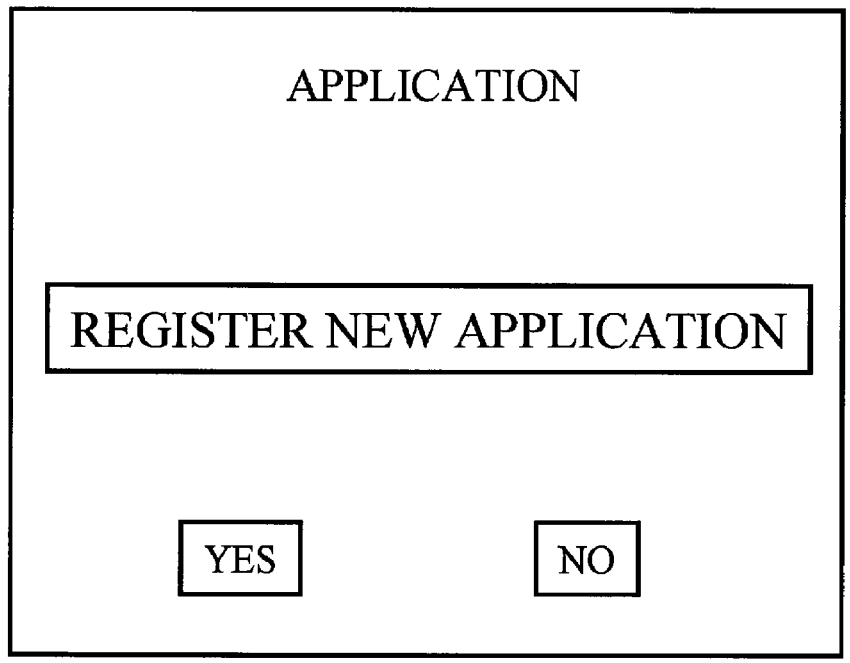

[FIG.49]

APPLICATION SELECTION SCREEN

| SERECTION | APPLICATION NAME | ID |
|---|---|---|
| O | FIXED ASSET MANAGEMENT | 11 |
| | NAME PLATE MANAGEMENT | 22 |
| | DOCUMENT MANAGEMENT | 33 |

| SELECT | | CANCEL |

[FIG.50]

APPLICATION TYPE: FOR FIXED ASSETS

PRINTED CHARACTERS

| FIXED ASSET NO. |

ARTICLE INFORMATION

MANAGER

[FIG.51]
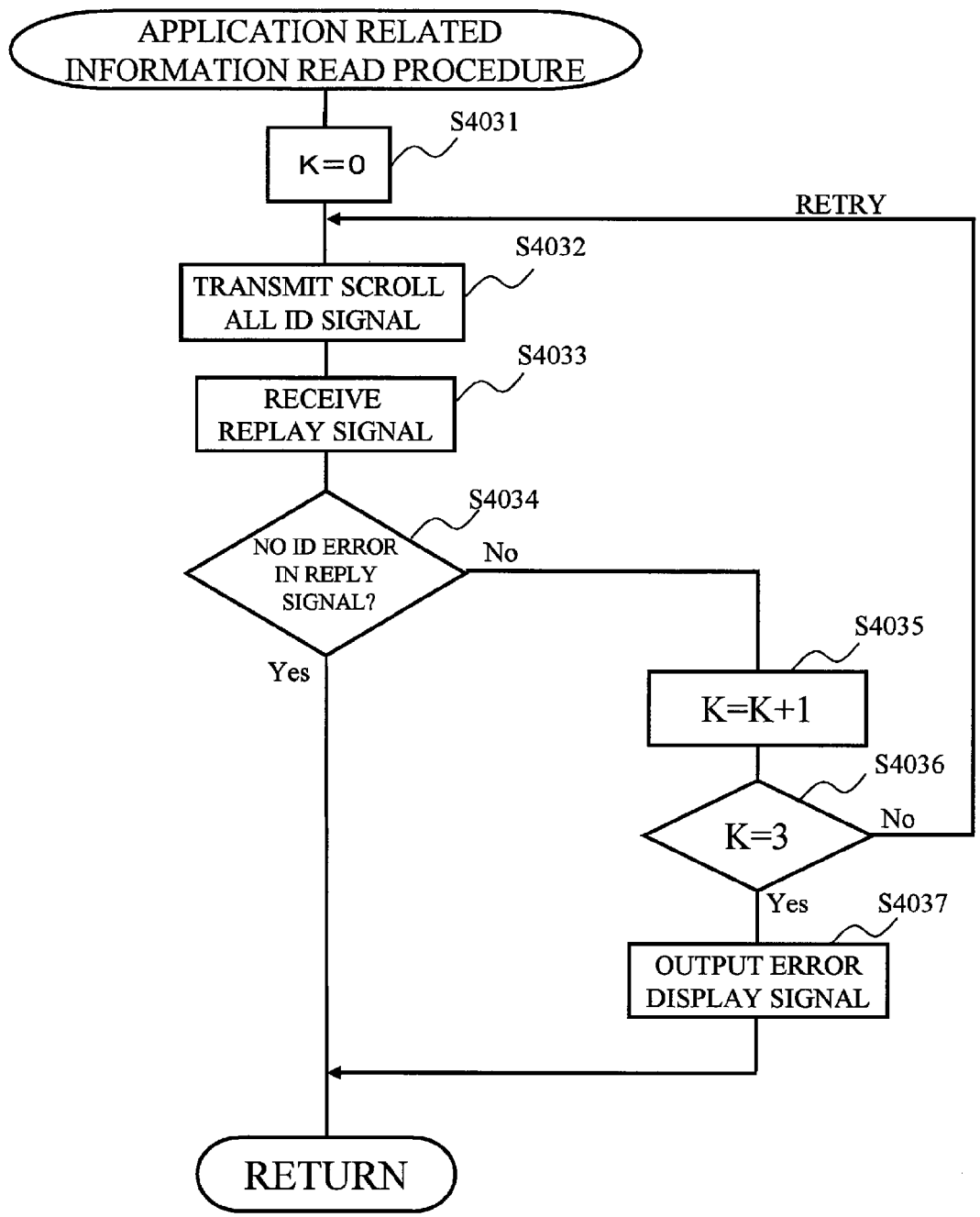

[FIG.52]
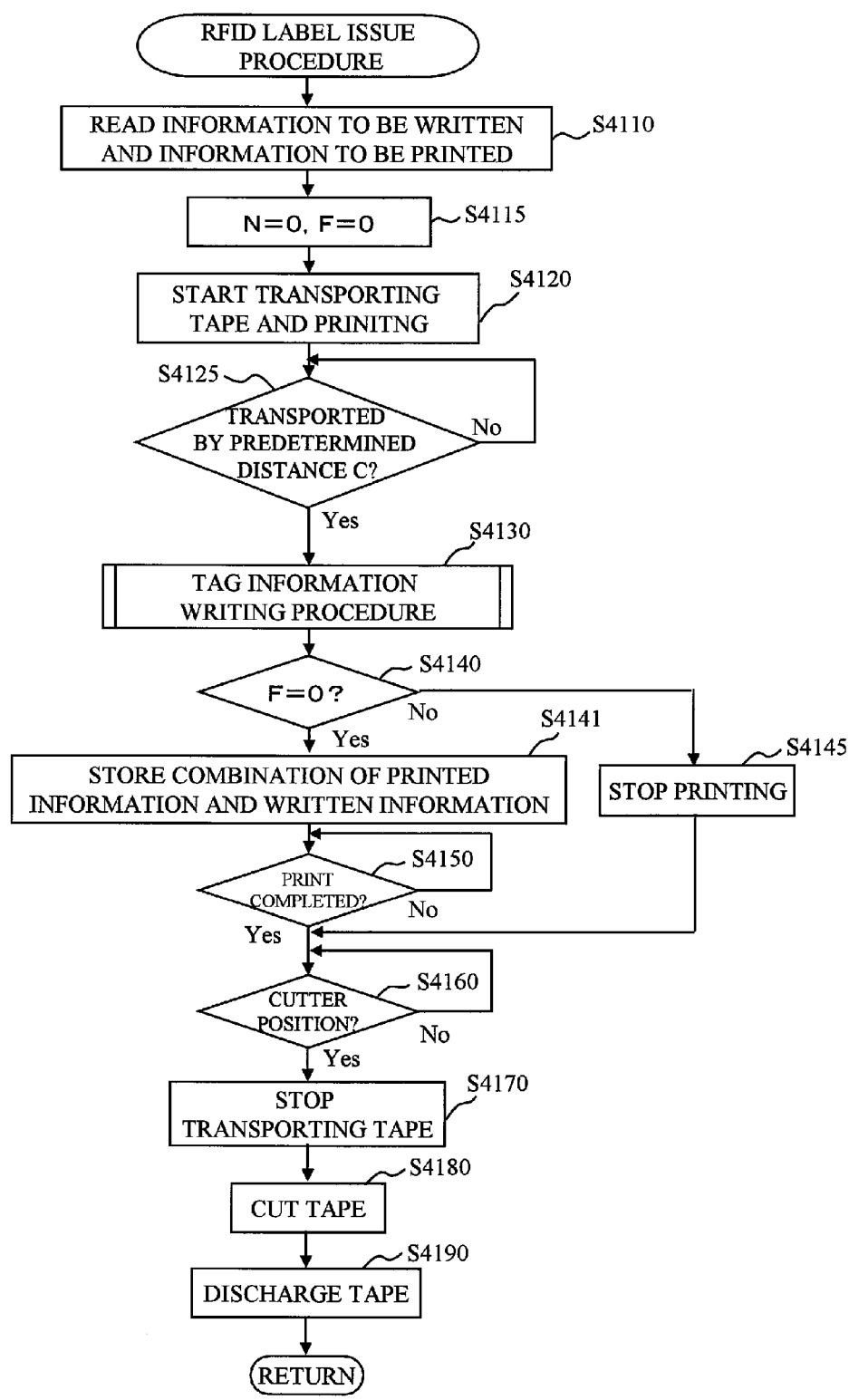

[FIG.53]
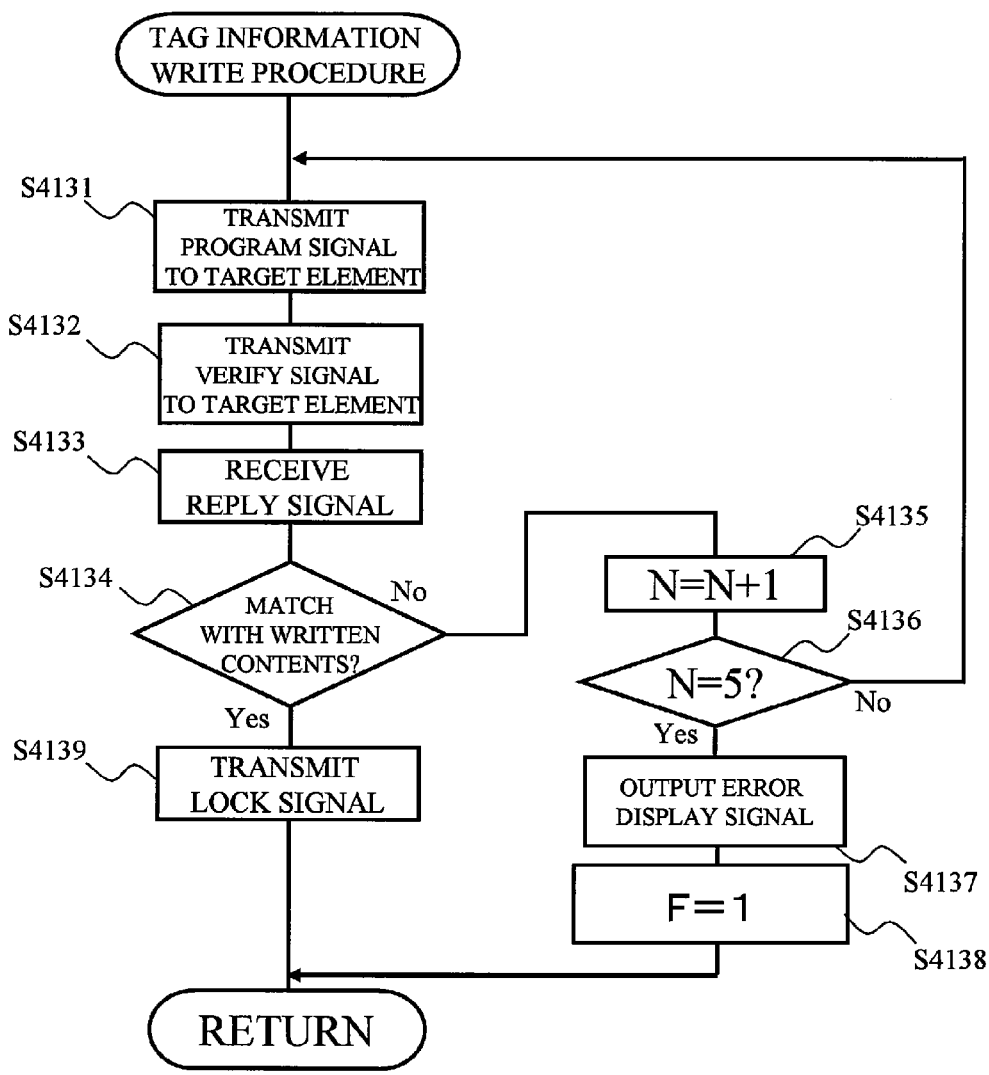

[FIG.54]
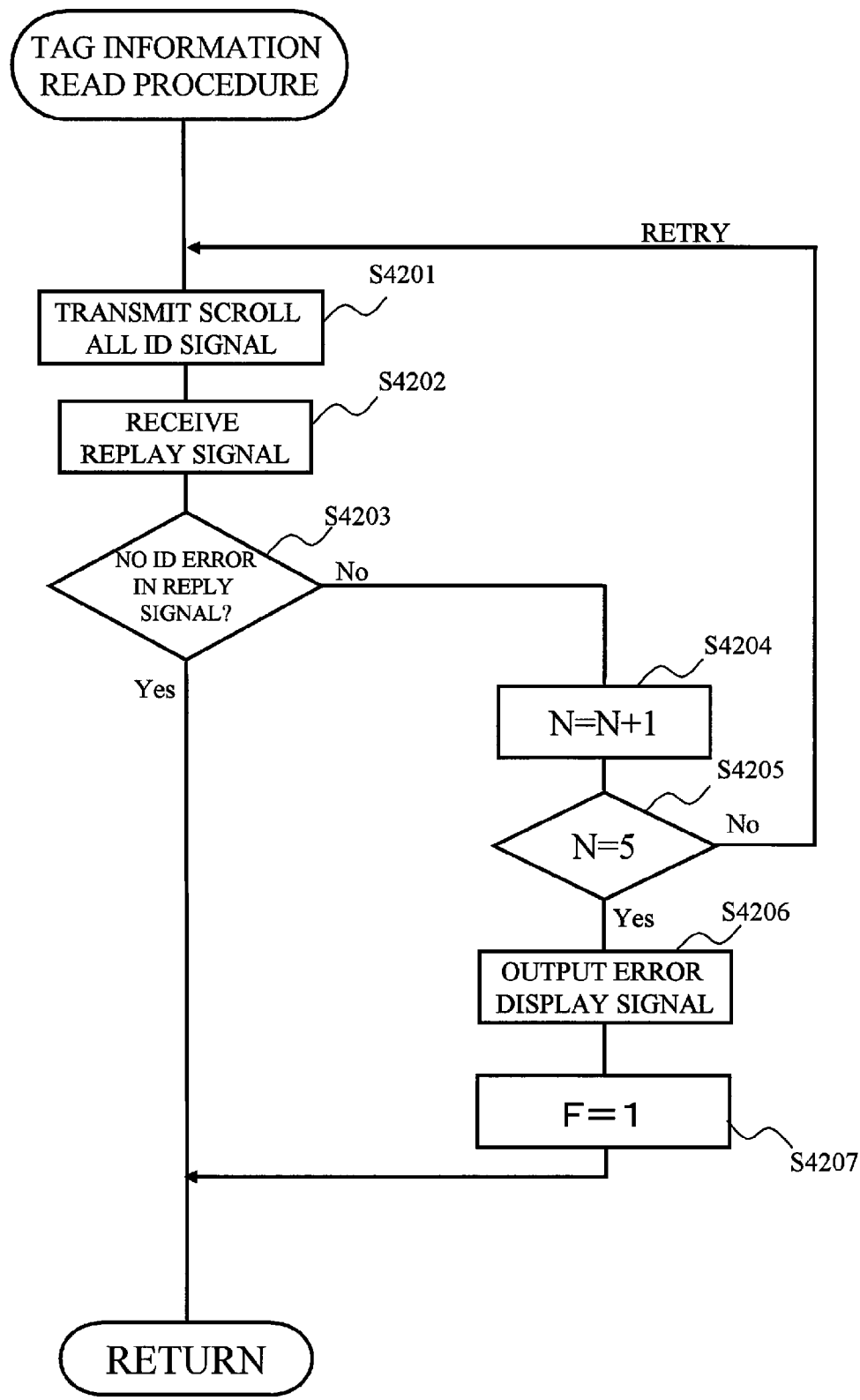

[FIG.55]
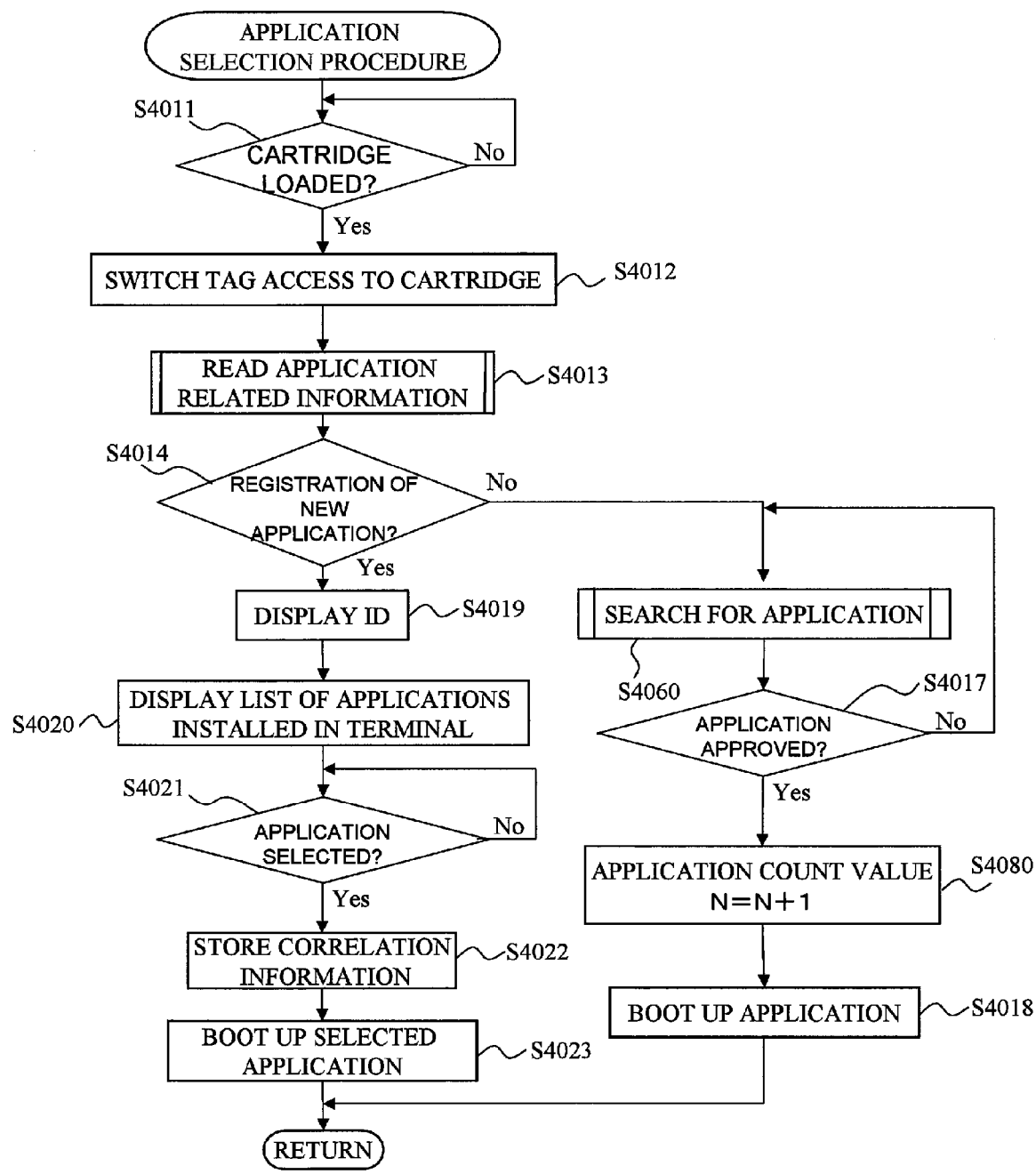

[FIG.56]
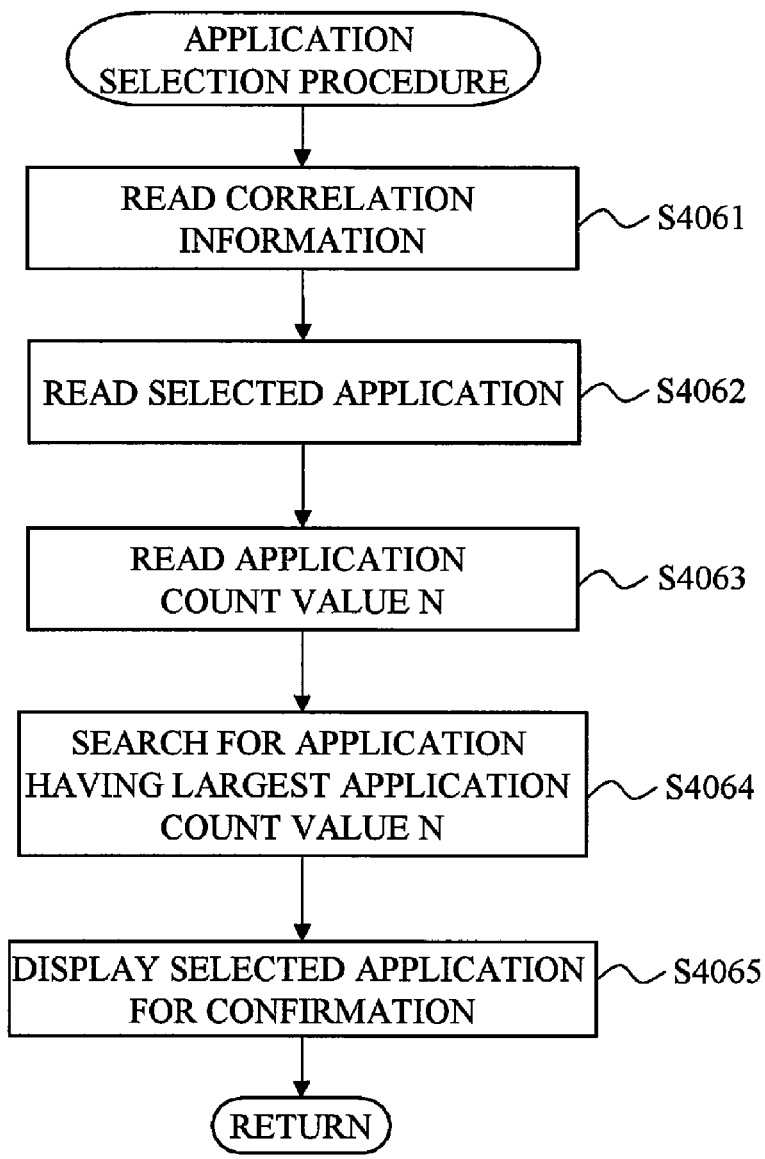

[FIG.57A]

APPLICATION SELECTION SCREEN

| SELECTION | APPLICATION NAME | ID |
|---|---|---|
| O | FIXED ASSET MANAGEMENT | 11 |
|  | NAME PLATE MANAGEMENT | 22 |
|  | DOCUMENT MANAGEMENT | 33 |

SELECT    CANCEL

[FIG.57B]

APPLICATION SELECTION SCREEN

| SELECTION | APPLICATION NAME | ID |
|---|---|---|
| O | NAME PLATE MANAGEMENT | 22 |
|  | FIXED ASSET MANAGEMENT | 11 |
|  | DOCUMENT MANAGEMENT | 33 |

SELECT    CANCEL

SYSTEM AND APPARATUS FOR MANAGING INFORMATION AND COMMUNICATING WITH A RFID TAG

CROSS-REFERENCE TO RELATED APPLICATION

This is a CIP application PCT/JP2006/300768, filed Jan. 19, 2006, which was not published under PCT article 21(2) in English and claims the benefits of Japanese Patent application No. 2005-011598 filed Jan. 19, 2005, No. 2005-017434 filed Jan. 25, 2005, No. 2005-017435 filed Jan. 25, 2005, and No. 2005-017436 filed Jan. 25, 2005.

BACKGROUND OF THE INVENTION

1. Field of the Invention

The present invention relates to a system for managing information of a RFID tag for reading and writing information from and into a RFID tag which is capable of communicating information to/from the outside by wireless communication, an apparatus for communicating with a RFID tag and a cartridge for including at least a RFID tag equipped in the system for managing information of a RFID tag, a RFID tag issued by the apparatus for communicating with a RFID tag, and a RFID information reader for reading information from the RFID tag.

2. Description of the Related Art

RFID (Radio Frequency Identification) systems permit a compact RFID tag and a reader (reading device)/writer (writing device) to read/information to be written therebetween in a non-contact fashion, as is known in the art.

A RFID circuit element contained in a label-shaped RFID label comprises an IC circuit part for storing predetermined RFID tag information, and an antenna connected to the IC circuit part for transmitting/receiving information. Since the reader/writer can access RFID tag information in the IC circuit part (for reading or writing information) even if the RFID tag is soiled or is positioned at a site at which the RFID tag is invisible, the RFID systems have been increasingly applied to practical use in a wide variety of fields such as asset management (see, for example, JP,A,2004-295406), document management in offices (see, for example, JP,A,2001-216308), name plates attached to clothing on the chest of personnel (see, for example, JP,A,9-245138), and the like. The RFID systems have also been increasingly applied to practical use in a wide variety of fields such as commodity management, inspection process, and the like.

In this event, since an IC circuit part of the RFID circuit element does not have a large storage capacity, i.e., is limited in storage capacity, it is a general tendency that predetermined identification information (tag ID) is stored in the IC circuit part, while article information itself on an article associated with the tag ID is stored in a separate database. Then, a reader reads the identification information from the RFID circuit element associated with an object, for example, and the database is searched for the article information on the object based on the read identification information.

An example of such a conventional RFID system is described, for example, in JP,A,2001-147770. In an information processing system described in JP,A,2001-147770, a reader (base station) installed in each sales counter of an establishment is connected to a database and a server installed at a remote location from the establishment through a communication network. As a reader (radio station) reads a tag ID of a RFID tag attached to each article displayed in each sales counter of the establishment, the tag ID is transmitted to the server. The server searches information stored in the database based on the tag ID, and retrieves a variety of article information (article catalog information, inventory information, sales record and the like) on the article associated with the tag ID. The article information on the article thus retrieved is processed in a predetermined manner based on instruction signals entered by a sales clerk from a portable operation terminal held by him and input into the server through the base station at each sales counter.

While the RFID labels have a variety of applications as described above, the RFID labels are issued, for example, by feeding an elongated tag tape which contains RFID circuit elements at predetermined intervals in the longitudinal direction (or sequentially supplying laminar tag sheets) and feed out the tag tape to sequentially transport the RFID circuit elements one by one. During the transport, predetermined RFID tag information generated in an apparatus for communicating with a RFID tag is transmitted to an antenna of each RFID circuit element through an antenna of the apparatus for communicating with a RFID tag to sequentially access (for reading or writing) RFID tag information in an IC circuit part of the RFID circuit element connected to the antenna, thus completing RFID labels.

In recent years, the RFID labels have been used in increasingly wider applications, so that the RFID labels are preferably tailored by the apparatus for communicating with a RFID tag described above for use in any of a wide variety of applications in a simple manner. However, any apparatus for communicating with a RFID tag has not been manufactured in consideration of this aspect, leading to a low usefulness for the operator.

However, even if an apparatus for communicating with a RFID tag provides a wide variety of RFID label issuing functions to support wide applications of RFID labels, the apparatus for communicating with a RFID tag is often used only for a fixed particular application (function) by a different user, or with tapes having different tag attribute parameters (for example, a tape width and the like) and communication parameters (for example, a communication protocol and the like), when the operator actually issues RFID labels. In this event, the operator is forced to perform tedious operations for selecting a particular one from the wide variety of functions, and therefore experiences difficulties in issuing an intended RFID label.

As described above, the RFID tag is often handled with a target article or object in a label form (i.e., RFID label) (for example by attaching or adhering, or including the RFID tag to or in the article). In this event, information related to tag information, article information or the like may be printed on the label separately from the tag ID stored in the RFID circuit element, permitting the user to conveniently view the related information. Accordingly, in recent years, the development of an apparatus for communicating with a RFID tag is in progress for issuing a printed RFID label by reading/writing information from/into a RFID circuit element and additionally printing a print on the label.

In this apparatus for communicating with a RFID tag, a label material such as a tap which has RFID circuit elements arranged thereon at predetermined intervals is fed out from a roll based on an operation instruction signal from the operator to issue RFID labels, while an IC circuit part of each RFID circuit element is accessed to read/write the tag ID. Subsequently, a predetermined print is printed on each label, thereby sequentially issuing RFID labels.

In one attempt, the information processing system described in JP,A,2001-147770 may be applied to the apparatus for communicating with a RFID tag as described above, wherein that apparatus for communicating with a RFID tag, server, database, operation terminal are interconnected through a network, such that the tag ID read/written from/into the IC circuit part is related to article information in the database. In this event, as an operation signal from the operation terminal is input to the apparatus for communicating with a RFID tag, the apparatus for communicating with a RFID tag accesses the IC circuit part of the RFID circuit element to read/write the tag ID by a tag access function, and prints corresponding information to be printed on the RFID label by a printing function. Also, the apparatus for communicating with a RFID tag generates a query signal based on the tag ID to the data base through the network, and a reply signal (search result or the like) is supplied to the apparatus for communicating with a RFID tag through the network.

However, when the external database is accessed through a network communication from the apparatus for communicating with a RFID tag which simply has the tag access function and printing function, the access to the database is likely to be affected in smoothness depending on a particular network communication environment, causing difficulties in providing smooth, rapid, and reliable RFID tag information management.

Also, when there are a plurality of databases, one of which should be queried by the apparatus for communicating with a RFID tag based on a tag ID, the apparatus for communicating with a RFID tag cannot identify the database corresponding to the tag ID, and accordingly must query these databases one by one. As such, the apparatus for communicating with a RFID tag experiences difficulties in readily and rapidly accessing a database which stores information corresponding to a target RFID circuit element for retrieving the information.

As described above, the conventional RFID systems described above fail to readily access information stored in a database, permit each operator to readily select a particular RFID label application (function) desired by the operator, and smoothly and rapidly issue RFID labels and communicate with the issued RFID labels when RFID labels are issued by the apparatus for communicating with a RFID tag.

SUMMARY OF THE INVENTION

It is a first object of the present invention to provide a system for managing information of a RFID tag which is capable of smoothly and rapidly issuing RFID labels, and communicating the issued RFID labels, an apparatus for communicating with a RFID tag, a reader for communicating with a RFID tag, a cartridge for including at least a RFID tag, and a RFID tag.

It is a second object of the present invention to provide a system for managing information of a RFID tag and an apparatus for communicating with a RFID tag which are capable of ensuring the smoothness for accesses to a database irrespective of network communication environments, and reliably managing RFID tag information, thereby smoothly and rapidly issuing RFID labels.

It is a third object of the present invention to provide a system for managing information of a RFID tag which is capable of readily and rapidly accessing a database which stores information corresponding to a target RFID circuit element to retrieve the information therefrom, thereby smoothly and rapidly issuing a RFID label or communicating the issued RFID label, an apparatus for communicating with a RFID tag, a reader for communicating with a RFID tag, and a RFID tag.

It is a fourth object of the present invention to provide a system for managing information of a RFID tag which is capable of readily selecting a particular application desired by an operator to smoothly and rapidly issuing a target RFID label, even when RFID labels are used in any of a wide variety of applications, an apparatus for communicating with a RFID tag equipped in the system for managing information of a RFID tag, and a cartridge for including at least a RFID tag for use with the apparatus for communicating with a RFID tag.

BRIEF DESCRIPTION OF THE DRAWINGS

FIG. 1 is a diagram illustrating the configuration of a system for managing information of a RFID tag to which an apparatus for communicating with a RFID tag is applied in accordance with a first embodiment of the present invention.

FIG. 2 is a conceptual diagram representing the configuration of the apparatus for communicating with a RFID tag shown in FIG. 1 in greater detail.

FIG. 3 is an explanatory diagram for describing in detail the structure of a cartridge shown in FIG. 2.

FIG. 4 is a functional block diagram illustrating functions of a radio frequency circuit shown in FIG. 3 in detail.

FIG. 5 is a functional block diagram illustrating functional components of a RFID circuit element.

FIGS. 6A and 6B are a top plan view and a bottom plan view, respectively, illustrating the appearance of an exemplary RFID label.

FIG. 7 is cross-sectional view taken along a line VII-VII' in FIG. 6.

FIG. 8 is a diagram illustrating an exemplary screen displayed on an operation terminal when RFID tag information is written or read.

FIG. 9 is a conceptual timing chart representing the operation of the apparatus for communicating with a RFID tag when it is instructed to execute a storage device access function, tag information access function, and a printing function, respectively, based on operation signals from a terminal.

FIG. 10 is a diagram illustrating a database selection screen displayed on a display device of a terminal when a database reference instruction signal is output at step SS1503 in FIG. 9.

FIG. 11 is a diagram showing an exemplary data record displayed on the display device of the terminal.

FIG. 12 is a diagram showing an exemplary data record displayed on the display device of the terminal.

FIG. 13 is a diagram illustrating a selection screen displayed on the display device for the operator to select an operation on the terminal corresponding to a re-issue due to a loss or a re-issue due to a failure at steps SS1509 and SS1510 in FIG. 9.

FIG. 14 is a flow chart illustrating a control procedure executed by a control circuit.

FIG. 15 is a flowchart illustrating in detail a procedure in step S1030 in FIG. 14.

FIG. 16 is a table showing exemplary combinations of predetermined conditions which are applied when the operator searches the database for a plurality of data for sequentially issuing a plurality of RFID labels with corresponding databases which should be searched for the data in an exemplary modification in which a plurality of data is sequentially retrieved from the database.

FIG. 17 is a conceptual timing chart illustrating basic operations executed by the apparatus for communicating with a RFID tag based on operation signals from an operation terminal.

FIG. 18 is a diagram illustrating an exemplary modification in which an operation terminal and an apparatus for communicating with a RFID tag alone are interconnected through a local network.

FIG. 19 is a conceptual diagram illustrating the configuration of a self-contained apparatus for communicating with a RFID tag in an exemplary modification.

FIG. 20 is a conceptual timing chart illustrating operations executed by the apparatus for communicating with a RFID tag.

FIG. 21 is a flowchart illustrating in detail a procedure of reading a RFID tag, executed by a control circuit of the apparatus for communicating with a RFID tag in an exemplary modification in which a read-only RFID circuit element is used.

FIG. 22 is a conceptual diagram illustrating in detail the configuration of an apparatus for communicating with a RFID tag which is equipped in a system for managing information of a RFID tag according to a second embodiment of the present invention.

FIG. 23 is an explanatory diagram for describing in detail the structure of a cartridge shown in FIG. 22.

FIG. 24 is an explanatory diagram for describing an approach for detecting cartridge type information in cooperation of an information encoded area shown in FIG. 22 with sensors.

FIG. 25 is a table showing the relation of cartridge identification information to a database (cartridge correlation).

FIG. 26 is a conceptual timing chart illustrating basic operations executed by the apparatus for communicating with a RFID tag based on operation signals from a terminal.

FIG. 27 is a diagram illustrating a database selection screen which lists databases on a display device of an operation terminal based on a notification signal from a control circuit at step SS2533 in FIG. 26.

FIG. 28 is a diagram showing an exemplary data record displayed on the display device of the operation terminal at step SS2504 in FIG. 26.

FIG. 29 is a diagram showing another exemplary data record displayed on the display device of the operation terminal at step SS2504 in FIG. 26.

FIG. 30 is a table showing the relation of cartridge identification information to particular data in databases (cartridge correlation) in an exemplary modification in which a plurality of data are sequentially retrieved from the databases.

FIG. 31 is a conceptual timing chart illustrating operations executed by the apparatus for communicating with a RFID tag.

FIG. 32 is a conceptual diagram illustrating the configuration of a self-contained apparatus for communicating with a RFID tag in an exemplary modification.

FIG. 33 is a conceptual timing chart illustrating operations executed by the apparatus for communicating with a RFID tag.

FIG. 34 is a diagram illustrating the configuration of a system for managing information of a RFID tag to which an apparatus for communicating with a RFID tag is applied in accordance with a third embodiment of the present invention.

FIG. 35 is a conceptual timing chart representing the operation of the apparatus for communicating with a RFID tag when it is instructed to execute a storage device access function, tag information access function, and a printing function, respectively, based on operation signals from a terminal.

FIG. 36 is a diagram illustrating a selection screen displayed on a display device for selecting whether a tag ID is set (assigned) to a RFID circuit element in an automatic assignment mode or a manual entry mode.

FIG. 37 is a functional block diagram illustrating in detail functional components of a scanner shown in FIG. 34.

FIG. 38 is a functional block diagram illustrating in detail the configuration of an RF communication control unit and an antenna.

FIG. 39 is a conceptual timing chart representing operations of the scanner.

FIG. 40 is a flow chart illustrating a procedure executed by a CPU when the scanner operates to detect a tag.

FIG. 41 is a conceptual timing chart representing operations executed by a self-contained apparatus for communicating with a RFID tag in an exemplary modification.

FIG. 42 is a conceptual timing chart representing operations of the apparatus for communicating with a RFID tag in an exemplary modification in which a read-only RFID circuit element is used.

FIG. 43 is a conceptual diagram illustrating in detail the configuration of an apparatus for communicating with a RFID tag according to a fourth embodiment of the present invention.

FIG. 44 is an explanatory diagram for describing in detail the structure of a cartridge.

FIG. 45 is a functional block diagram illustrating in detail functions of an RF circuit.

FIG. 46 is a flow chart illustrating a control procedure executed by a control circuit.

FIG. 47 is a flowchart illustrating in detail a procedure in step S4010 shown in FIG. 46.

FIG. 48 is a diagram illustrating an exemplary screen displayed on a display device of a terminal.

FIG. 49 is a diagram illustrating another exemplary screen displayed on a display device of a terminal.

FIG. 50 is a diagram illustrating an exemplary screen which is displayed on the display device of the terminal when an application is booted up at step S4018 or S4023 shown in FIG. 47.

FIG. 51 is a flow chart illustrating in detail a procedure in step S4013 shown in FIG. 47.

FIG. 52 is a flow chart illustrating in detail a procedure in step S4100 shown in FIG. 46.

FIG. 53 is a flow chart illustrating in detail a procedure in step S4130 shown in FIG. 52.

FIG. 54 is a flow chart illustrating in detail a RFID tag reading procedure when a RFID label is issued by reading RFID tag information from a RFID circuit element while printing a corresponding print on the RFID label.

FIG. 55 is a flow chart illustrating in detail a procedure of selecting an application in an exemplary modification in which the apparatus for communicating with a RFID tag is configured to support a plurality of applications.

FIG. 56 is a flow chart illustrating in detail a procedure in step S4060 shown in FIG. 55.

FIG. 57 is a diagram illustrating an exemplary screen displayed on the display device of the terminal.

DETAILED DESCRIPTION OF THE PREFERRED EMBODIMENTS

In the following, some embodiments of the present invention will be described with reference to the accompanying drawings.

A first embodiment of the present invention will be described with reference to FIGS. 1 to 21.

FIG. 1 is a diagram illustrating the configuration of a system for managing information of a RFID tag to which an apparatus for communicating with a RFID tag is applied in accordance with the first embodiment.

In the system 1 for managing information of a RFID tag illustrated in FIG. 1, the apparatus 2A for communicating with a RFID tag (RFID tag information management apparatus) is connected to a route server 4, a terminal (operation terminal) 5, a general purpose computer 6, and a plurality of information servers 7 through a wired or a wireless communication network 3.

The terminal 5 is, for example, a so-called microcomputer or a personal computer, and comprises a display 5a, an operation device or keyboard (or a mouse and the like) 5b, as well as a CPU (central processing unit), a ROM, a RAM and the like, not shown. The terminal 5 is configured to process signals in accordance with a program previously stored in the ROM in response to operations on the operation device 5b, utilizing a temporarily storage function of the RAM, and make a predetermined display on the display device 5a.

FIG. 2 is a conceptual diagram representing the configuration of the apparatus 2A in greater detail.

In FIG. 2, a main body 8 of the apparatus 2A is formed with a recessed cartridge holder (not shown, container receiving holder) in which a cartridge 100A is removably loaded.

The main body 8 comprises a print head (thermal head, printing device) 10 for printing predetermined characters on a cover film (print-receiving medium) 103 fed out from a second roll 104; a ribbon take-up roller driving shaft 11 for driving an ink ribbon 105 that has finished the print to the cover film 103; a tape feeding roller drive shaft (driving device) 12 for transporting the cover film 103 and a base tape (tag tape) 101 for a label tape fed out from a first roll (roll of tape with RFID tag) 102, while bonding the cover film 103 to the base tape 101, to feed out the resulting tag label tape 110 with print from the cartridge 100A; an antenna (apparatus antenna) 14 for transmitting/receiving a signal to/from RFID circuit elements To (described later in detail) disposed on the tag label tape 110 with print using a radio frequency in a UHF band or the like; a cutter 15 for cutting off the tag label tape 110 with print to a predetermined length at a predetermined timing to issue a label-shaped RFID label T (described later in detail); feeding rollers 17 for transporting and delivering the guided RFID labels T to a delivery port (discharge port) 16; and a cabinet (housing) 9 which is formed with the cartridge holder for removably fitting the cartridge 100A therein, and the carry-out exit 16, and defines a shell for containing the foregoing components.

The antenna 14 comprises a directive antenna (known patch antenna which is omitted in the illustration and detailed description, in this example) which is directive to one direction (in front on the sheet of FIG. 2 in this example). The antenna 14 is disposed near the first roll 102 in the axial direction thereof (in a direction going into the sheet of FIG. 2), such that it can communicate with a region X near the first roll 102 from which the base tape 101 is fed out. It should be noted that part of the first roll 102 falls out of the region X in this example, the first roll 102 may entirely fall within the region X.

The main body 8 further includes a radio frequency circuit 21 for accessing (reading or writing) the RFID circuit element To through the antenna 14; a signal processing circuit 22 for processing a signal read from the RFID circuit element To; a motor 23 to drive cartridge shaft for driving the ribbon take-up roller driving shaft 11 and the tape feeding roller drive shaft 12 described above; a cartridge shaft drive circuit 24 for controlling the drive of the motor 23 to drive cartridge shaft; a print-head drive circuit 25 for controlling the power supplied to the print head 10; a solenoid 26 for driving the cutter 15 to perform cutting operations; a solenoid drive circuit 27 for controlling the solenoid 26; a tape-feeding-roller motor 28 for driving the feeding rollers 17; a tape-feeding-roller drive circuit 29 for controlling the tape-feeding-roller motor 28; a control circuit 30 for generally controlling the apparatus 2A through the radio frequency circuit 21, signal processing circuit 22, cartridge shaft drive circuit 24, print-head drive circuit 25, solenoid drive circuit 27, tape-feeding-roller drive circuit 29, and the like; and a storage device 200 (tag information storage device) comprised, for example, of a non-volatile hard disk or the like which stores a variety of databases 201 (database for storing information of a RFID tag).

The control circuit 30, which is based on a so-called microcomputer, comprises a central processing unit (CPU), a ROM, a RAM and the like, though detailed illustration is omitted. The control circuit 30 performs signal processing in accordance with a program previously stored in the ROM using a temporary storage function of the RAM. The control circuit 30 is also connected, for example, to the communication network 3 through an input/output interface 31 (input device of an operation signal), so that the control circuit 30 can communicate information and signals (including operation signals applied from the terminals 5) with the aforementioned route server 4, other terminals 5, general purpose computer 6, information server 7 and the like, all of which are connected to the communication network 3.

FIG. 3 is an explanatory diagram for describing in detail the structure of the cartridge 100A.

Referring to FIG. 3, the cartridge 100A comprises a housing 100A; a first roll 102 loaded in the housing 100A and having the base tape 101 (tag tape) wound therearound; a second roll 104 having the transparent cover film 103 approximately as wide as the base tape 101 wound therearound; a ribbon-supply roll 111 for feeding out the ink ribbon 105 (a thermal transfer ribbon, however, this is not necessary when the cover film is made of a heat sensitive tape); a ribbon take-up roller 106 for taking up a ribbon 105 after characters have been printed on the cover film; and a pressure roller 107 for bonding the base tape 101 with the cover film 103 with pressure to create the tag label tape 110 with print, and feeding the resulting tape 110 in a direction indicated by an arrow A (i.e., additionally functioning as a tape feed roller).

The first roll 102 has the base tape 101 wound around a reel member 102a. The base tape 101 has a plurality of the RFID circuit elements To sequentially formed in a longitudinal direction at predetermined regular intervals.

In this embodiment, the base tape 101 has a four-layer structure (see a partially enlarged view in FIG. 3) which comprises a laminate comprised of an adhesive layer 101a made of an appropriate adhesive material, a colored base film 101b made of PET (polyethylene terephthalate) or the like, an adhesive layer 101c made of an appropriate adhesive material, and a separation sheet 101d in this order from a side thereof which is rolled inward (from the right in FIG. 3) to the opposite side (to the left in FIG. 3).

The base film 101b is provided with an antenna (tag antenna) 152 integrally formed on the back surface thereof (on the left side in FIG. 3) for transmitting/receiving information, and an IC circuit part 151 connected to the antenna 152 for storing information such a manner that the information can be updated (rewritten). The base film 101b, antenna 152, and IC circuit part 151 make up the RFID circuit element To.

The adhesive layer 101a is formed on the front of the base film 101b (on the right side in FIG. 3) for bonding the cover film 103 thereon at a later time. The separation sheet 101d is also bonded to the back surface (on the left side of FIG. 3) of the base film 101b by the adhesive layer 101c for wrapping the RFID circuit element To therein. It should be noted that the separation sheet 101d is peeled off when the finished RFID label T is bonded to a predetermined article or the like, so that the adhesive layer 101c enables the RFID label T to be bonded to the article or the like.

The second roll 104 has the cover film 103 wound around a reel member 104a. The cover film 103 fed out from the second roll 104 is pressed against the ribbon 105 driven by the ribbon supply roll 111 and the ribbon take-up roller 106, which are disposed inward from the back side of the cover film 103 (i.e., the side of the cover film 103 which is bonded to the base tape 101), by the print head 10, such that the ribbon 105 is brought into close contact with the back side of the cover film 103.

The ribbon take-up roller 106 and the tape feeding roller 107 are respectively driven to rotation by a driving force of the motor 23 to drive cartridge shaft (see FIG. 2 described above) which is transmitted to the ribbon take-up roller driving shaft 11 and the tape feeding roller drive shaft 12. The motor 23 to drive cartridge shaft may be, for example, a pulse motor disposed outside of the cartridge 100A.

In the cartridge 100A configured as described above, the base tape 101 fed out from the first roll 102 is supplied to the pressure roller 107. The cover film 103 fed out from the second roller 104, in turn, is pressed against the ribbon 105 driven by the ribbon supply roll 111 and the ribbon take-up roller 106, which are disposed inward from the back side of the cover film 103 (i.e., the side of the cover film 103 which is bonded to the base tape 101), by the print head 10, such that the ribbon 105 is brought into close contact with the back side of the cover film 103.

Then, when the cartridge 100A is loaded in the cartridge holder of the main body 8, and a roll holder (not shown) is moved from a separate position to a contact position, the cover film 103 and the ink ribbon 105 are sandwiched between the print head 10 and a platen roller 108, while the base tape 101 and the cover film 103 are sandwiched between the tape feeding roller 107 and a sub-roller 109. Subsequently, the ribbon take-up roller 106 and the tape feeding roller 107 are driven to rotate in directions indicated by arrows B and D, respectively, in synchronism with each other by the driving force of the motor 23 to drive cartridge shaft. In this event, the tape feeding roller drive shaft 12, the sub-roller 109 and the platen roller 108 described above are coupled with each other by gears (not shown), such that the pressure roller 107, sub-roller 109, and platen roller 108 are rotated with the accompaniment to the driven tape feeding roller drive shaft 12 to feed out the base tape 101 from the first roll 102 to the tape feeding roller 107, as described above. On the other hand, the cover film 103 is fed out from the second roll 104, and a plurality of heating elements of the print head 10 are powered by the print-head drive circuit 25. As a result, a print R (see FIG. 7, later described) is printed on the back side of the cover film 103. Then, the base tape 101 is bonded to and integrated with the cover film 103, on which the print R has been printed, by the tape feeding roller 107 and sub-roller 109 to form a tag label tape 110 with print which is delivered to the outside of the cartridge 100A, as indicated by an arrow C. Subsequently, the ribbon take-up roller driving shaft 11 is driven to take up the ink ribbon 105, which has been used to print the print on the print-receiving tape 103, onto the ribbon take-up roller 106. A guide roller 120 is disposed near the base tape just fed out from the first roll 102, and maintains constant conditions for communications with the RFID circuit elements To by restricting the distance between the transport path of the base tape 101 and the antenna 14 within a predetermined range at all times, even if the base tape 101 is fed out from a different position of the base tape roll 102 as the remaining base tape 101 varies.

FIG. 4 is a functional block diagram illustrating functions of the radio frequency circuit 21 in detail. Referring to FIG. 4, the radio frequency circuit 21 comprises a transmitting portion 32 for transmitting a signal to the RFID circuit element To through the antenna 14; a receiving portion 33 for receiving reflected waves from the RFID circuit element To, received by the antenna 14; and a transmit-receive splitter 34.

The transmitting portion 32 comprises a crystal oscillator 35 for generating a carrier for accessing (reading or writing) RFID tag information (RFID tag control information) in the IC circuit part 151 of the RFID circuit element To; a PPL (Phase Locked Loop) 36; a VCO (Voltage Controlled Oscillator) 37; a transmission multiplying circuit 38 (which may be implemented by a variable amplification factor amplifier or the like for amplitude modulation) for modulating the carrier (RFID tag information) generated by the crystal oscillator 35 based on a signal supplied from the signal processing circuit 22 (modifying the amplitude of the carrier based on a "TX_ASK" signal from the signal processing circuit 22 in this embodiment); and a variable transmission amplifier 39 for determining an amplification factor based on a "TX_PWR" signal from the control circuit 30 to amplify the carrier modulated by the transmission multiplying circuit 38. The carrier generated by the crystal oscillator 35 preferably falls within the UHF band, and the output of the transmission amplifier 39 is transmitted to the antenna 14 through the transmit-receive splitter 34 and then supplied to the IC circuit part 151 of the RFID circuit element To. It should be noted that the RFID tag information is not limited to the transmission through a modulated signal but may be transmitted simply on a carrier.

The receiving portion 33 comprises a first receiving signal multiplying circuit 40 for multiplying reflected wave from the RFID circuit element To received by the antenna 14 by the carrier for demodulation; a first bandpass filter 41 for extracting signals only in a required band from the output of the first receiving signal multiplying circuit 40; a first receiving signal amplifier 43 for amplifying the output of the first bandpass filter 41; a first limiter 42 for further amplifying the output of the first receiving signal amplifier 43 and converting the amplified output to a digital signal; a second receiving signal multiplying circuit 44 for multiplying the reflected waves from the RFID circuit element To received by the antenna 14 by the carrier, the phase of which has been delayed by 90° by a phase shifter 49 after the carrier was generated; a second bandpass filter 45 for extracting signals only in a required band from the output of the second receiving signal multiplying circuit 44; a second receiving signal amplifier 47 for amplifying the output of the second bandpass filter 45; and a second limiter 46 for further amplifying the output of the second receiving signal amplifier 47 and converting the amplified output to a digital signal. A signal "RXS-I" output from the first limiter 42, and a signal "RXS-Q" output from the second limiter 46 are applied to the signal processing circuit 22 for further processing.

The outputs of the first receiving signal amplifier 43 and second receiving signal amplifier 47 are also applied to an RSSI (Received Signal Strength Indicator) circuit 48 which in turn applies the signal processing circuit 22 with a signal "RSSI" indicative of the strength of these signals. In this way, the apparatus 2A of this embodiment demodulates reflected waves from the RFID circuit element To through I-Q orthogonal demodulation.

FIG. 5 is a functional block diagram illustrating functional components of the RFID circuit element To. Referring to FIG. 5, the RFID circuit element To comprises the aforementioned antenna 152 for transmitting/receiving signals to/from the antenna 14 of the apparatus 2A at a radio frequency in the short wave band, UHF band, microwave band or the like in a non-contact fashion; and the IC circuit part 151 connected to the antenna 152.

The IC circuit part 151 comprises a rectification part 153 for rectifying a carrier received by the antenna 152; a power source part 154 for accumulating energy of the carrier rectified by the rectification part 153 for use by the IC circuit part 151 as a drive power source; a clock extraction part 156 for extracting a clock signal from the carrier received by the antenna 152 and supplying the extracted clock signal to a control part 155; a memory part 157 which functions as an information storage device capable of storing predetermined information signals; a modem part 158 connected to the antenna 152; and the control part 155 for controlling the operation of the RFID circuit element To through the rectification part 153, clock extraction part 156, modem part 158 and the like.

The modem part 158 demodulates communication signals transmitted from the antenna 14 of the apparatus 2A and received by the antenna 152, and modulates and reflects the carrier received by the antenna 152 based on a response signal from the control part 155.

The control part 155 conducts basic control involved in interpreting a received signal demodulated by the modem part 158, generating a response signal based on information signals stored in the memory part 157, transmitting the response signal back through the modem part 158 and the like.

FIGS. 6A and 6B are a top plan view and a bottom plan view, respectively, illustrating the appearance of an exemplary RFID label T which is formed by reading or writing information from or to the RFID circuit element To, and cutting the tag label tape 110 with print into individual RFID labels T, as previously described. FIG. 7 in turn is a cross-sectional view taken along a line VII-VII' in FIG. 6A.

Referring to FIGS. 6A, 6B, 7, the RFID label T contains a plurality (two in this embodiment) of RFID circuit elements To. As illustrated in FIG. 7, the RFID label T has the RFID circuit elements To embedded in a five-layer structure in which the print-receiving tape 103 is added to the four-layer structure illustrated in FIG. 3. The five layers are comprised of the print-receiving tape 103, the adhesive layer 101a, the base film 101b, the adhesive layer 101c, and the separation sheet 101d, which are laminated from the print-receiving tape 103 (upper side in FIG. 7) to the opposite side (lower side in FIG. 7). As described above, the RFID circuit elements To, each including the antenna 152 and disposed on the back side of the base film 101b, is embedded in the adhesive layer 101c, and a print R (in the example, a print "RF-ID" indicative of the type of the RFID label T) is printed on the back side of the print-receiving tape 103.

FIG. 8 is a diagram illustrating an exemplary screen which may be displayed on the terminal 5 (or general purpose computer 6) when the apparatus 2A as described above accesses RFID tag information (for reading or writing) in the IC circuit part 151 of the RFID circuit element To.

Referring to FIG. 8, in this embodiment, the terminal 5 (or general purpose computer 6) can display the type of a RFID label (access frequency and tag size); the print R printed on the RFID label corresponding to the RFID circuit element To; an access (read or write) tag ID unique to the RFID circuit element To; the address of article information (object information) stored in the database 201 (database for storing information of a RFID tag, storage device) in the storage device 200, described later in greater detail; the address at which information related thereto (see FIGS. 11, 12, later described) is stored in the information server 7 and route server 4; and the like.

For issuing a RFID label, the apparatus 2A is activated through operations on the terminal 5 (or general purpose computer 6) to print the print R on the print-receiving tape 103 and information to be written such as the write ID, object information such as article information corresponding thereto, and the like into the IC circuit part 151 (or read a tag ID which has been previously stored in the IC circuit part 151).

The database 201 in the storage device 200 stores a correspondence relationship (i.e., correlation information, an information of indicating a relationship one to the other) between the written (or read) tag ID (identification information) of the RFID circuit element To in the issued RFID label T and information (object information such as article information or the like) on an object associated with the RFID label T (object, article, member, machine, facilities or the like to which the RFID label T is attached, adhered, or mounted or in which the RFID label T is included) written into the IC circuit part 151 of the RFID circuit element To (or information read from the IC circuit part 151) during a read (or a write) operation as described above, such that the correspondence relationship can be referenced as required. Additionally, the correspondence relationship may be stored in the route server 4. In addition to the correlation information, the object information may also be stored together in the database 201 (see FIGS. 11, 12, later described). When the correlation information (an information of indicating a relationship one to the other) alone is stored in the database 201 in the storage device 200, the object information and the like may be stored in the information server 7 (database external to the apparatus 2A) such that the object information can be referenced.

Essentially, in the system 1 for managing information of a RFID tag which comprises the apparatus 2A in the configuration described above, the apparatus 2A which comprises the storage device 200 that stores the databases 201 has a tag information access function through the antenna 14; a storage device access function; and a printing function associated with the print head 10, and collectively executes the three functions in response to an access instruction to information in a RFID tag, an access instruction to a storage device, and a printing instruction included in one operation signal from the terminal 5 external to the apparatus 2A and associated with one another. In the following, details on the functions will be described one by one.

FIG. 9 is a conceptual timing chart representing the operation of the apparatus 2A when it is instructed to execute the three functions (storage device access function, tag information access function, and printing function) based on an operation signal from the terminal 5.

Referring to FIG. 9, prior to actual communications of data, the terminal 5 first outputs a status query signal for querying the type of the cartridge 100A (step SS1501). Specifically, there are several types of cartridges 100A which differ in tag attribute parameters (tape width, tag arranged interval, tag sensitivity and the like) or communication parameters (frequency, communication protocol or the like) associated with the RFID circuit elements To contained in the base tape 101. Each cartridge 100A is provided with an information encoded area at an appropriate location which includes information indicative of the type of the cartridge. The cartridge holder of the apparatus 2A is provided with an appropriate detecting device for reading the cartridge type information on the information encoded area (for example, a mechanical sensor such as a mechanical switch, an optical sensor such as a bar code scanner, or a magnetic sensor, or detection through a wireless communication and the like). The result of the detection associated with the cartridge type is supplied, for example, to the control circuit 30. In response to the status query signal, the control circuit 30 supplies the terminal 5 with a status response signal which includes the cartridge type information based on the detection of the result (step SS1502).

In this event, the database 201 in the storage device 200 of the apparatus 2A actually includes a plurality of databases 201A, 201B, . . . (see FIG. 10, later described). As the operator operates the terminal 5 to select one of these databases from which data is retrieved for use, a database reference instruction signal is supplied to the storage device 200 through the control circuit 30 in response to the selection (step SS1503). In response to the database reference instruction signal, a data record (records) of data previously stored in the database (object information data associated with the RFID label T in this example) is retrieved from the storage device 200, and displayed on the display device 5a of the terminal 5 in a list form through the control circuit 302 for use as reference data (step SS1504).

After the operator has viewed the reference data displayed on the display device 5a, when the database 201 has already stored data which the operator is going to handle, for example, for issuing a RFID label T associated with the data or simply editing the data in the future, the operator selects the data from the list of registered data (step SS1505). When such intended data has been not registered in the database 200, the operator additionally enters the data in a corresponding database for registration (step SS1506).

When the data selected or registered in this way is not a used to issue a RFID label T (or a simple printed label which does not contain the RFID circuit element To, as will be later described), the procedure is terminated (step SS1507). On the other hand, when the RFID label T is issued, the terminal 5 is involved in different operations depending on whether the data has not ever been used to issue the RFID label T, i.e., the data is used to issue a new RFID label for the first time, or the data has previously used to issue the RFID label T.

When a new RFID label T is issued, the operator performs appropriate operations involved in the issuance on the terminal 5, causing the control circuit 30 of the apparatus 2A to generate an image representative of the appearance (printed characters) of the RFID label T which is to be issued, and to display the image on the display device 5a of the terminal 5 (step SS1508).

When the RFID label T has been previously issued, the operator is forced to operate in different modes on the terminals 5 depending on whether the RFID label T is re-issued due to a failure of the previously issued RFID label (failure triggered re-issuance); due to a loss of the previously issued RFID label (loss triggered re-issuance); or due to an intended duplication of the same label as the previously issued RFID label T (additional issuance). When a new RFID label T is re-issued due to a failure or is additionally issued, the operator operates in an appropriate mode corresponding thereto on the terminal 5 (see FIG. 13, later described), causing the control circuit 30 of the apparatus 2A to generate an image representative of the appearance (printed characters) of the RFID label T which is to be issued, and to display the image on the display device 5a of the terminal 5, in a manner similar to the above (step SS1509). When a RFID label T is re-issued due to a loss, the operator performs a corresponding appropriate operation on the terminal 5 (step SS1510, and see FIG. 13, later described, as well), causing the terminal 5 to supply the storage device 200 with a disable instruction signal for disabling functions of the RFID circuit element To of the lost RFID label T (step SS1511). In response, the storage device 200 makes the lost RFID label T unusable (refer to an enable/disable flag in FIGS. 11 and 12, later described). Subsequently, the control circuit 30 generates an image representative of the appearance (printed characters) of the RFID label T which is to be issued, and displays the generated image on the display device of the terminal 5 in a manner similar to the foregoing (step SS1512).

Subsequently, the image representative of the appearance of the RFID label T thus issued and displayed for preview is stored in a corresponding database in relation to the data (object information or the like) or tag ID (step SS1513).

When the operator instructs the start of tag production (issuance) on the terminal 5 after the foregoing stages, the apparatus 2A is supplied with a single operation signal which comprises the access instruction to information in a RFID tag (for writing data in this example), printing instruction, and storage device access (issue data registration) instruction, as mentioned above. The printing instruction signal is supplied to the print drive circuit 25 through the control circuit 30 (step SS1514), causing the print drive circuit 25 to drive the print head 10 to print a corresponding print on the cover film 103. The data write instruction signal is supplied to the signal processing circuit 22 and radio frequency circuit 21 through the control circuit 30 (step SS1515), and information such as a tag ID is written into the RFID circuit element To through the antenna 14. The issue data registration instruction is supplied to the control circuit 30 which waits for a report signal indicating that the data was successfully written into the RFID circuit element To (step SS1517) and for a report signal indicating that the print was successfully printed on the RFID label T (step SS1518), confirms that the control circuit 30 has received these report signals, and registers the database 201 in the storage device 200 with issue data which includes correlation (a relationship one to the other) information of the tag ID written into the RFID circuit element To from the control circuit 30 with the object information and the like (or together with the object information as well) (step SS1519). Then, the control circuit 30 supplies the operation terminal 5 with a data write success report signal indicating that the issue data has been registered in the database 201 (step SS1520). When the control circuit 30 fails to print the print on the RFID label T or to write the data into the RFID circuit element To, the control circuit 30 supplies the operation terminal 5 with a data write failure report signal (step SS1521A) or a print failure report signal (step SS1521B). Then, the display device 5a of the operation terminal 5 displays the result corresponding to the report signals (success or failure) (step SS1522).

FIG. 10 is a database selection screen which is displayed on the display device 5a of the terminal 5 when the database reference instruction signal is supplied from the terminal 5 to the storage device 200 at step SS1503 in FIG. 9 above. FIG. 10 illustrates the screen when the storage device 200 of the apparatus 2A stores the database 201 which comprises an employee information database 201A, an article information database 201B, a customer information database 201C, and a patent information database 201D. As described above, the reference instruction signal is supplied to the storage device 200 at step SS1503 to retrieve a data record (records) from one selected from the four databases 201A-201D. The retrieved data record is displayed on the display device 5a of the terminal 5 for use as reference data.

FIG. 11 is a diagram showing an exemplary data record thus displayed. This example shows a record which is displayed on the display device 5a of the terminal 5 as reference data when the operator has selected the employee information database 201A shown in FIG. 10, for example, in order to create a name plate for an employee which is associated with a RFID label T. As shown, in this example, the data record contains fields of the following record items: "employee code," "name," "reading," "sex code," "section code," "extension," "electronic mail address," "portrait file name," "label base color code," "label print color code," "label image file name," "ID bit length," "tag ID (in hexadecimal notation)," "protocol code," "issued date," "reason for issuance code," and "enable/disable flag."

Among these fields, the "employee code," "name," "reading," "sex code," "section code," "extension," "electronic mail address," and "portrait file name" belong to the object information (information on an employee who carries the name plate). These object information items related to "tag ID" in the record, enumerated side by side in the shown table, substantially form correlation information (an information of indicating a relationship one to the other) of the object information items to the tag ID.

The "label base color code," "label print color code," "label image file name," "ID bit length," "protocol code," "issued date," "reason for issuance code," "enable/disable flag" are information items which are associated with the particular RFID label T.

Among these information items, the "reason for issuance code" is set to "0" when it indicates that a RFID label was issued for the first time (i.e., newly issued RFID label); to "1" when it indicates that a RFID label was re-issued due to a tag failure (see step SS1509 in FIG. 9 above); and to "2" when it indicates that a RFID label was re-issued due to a loss (see step SS1510 in FIG. 9). It should be noted that a data record associated with a previously issued RFID label is not deleted even when the RFID label is re-issued due to a tag failure, in which case a record associated with the re-issued RFID label has the same "tag ID" as the record associated with the previous RFID label, but has different "issued date" and "reason for issuance code." Likewise, a data record associated with a previously issued RFID label is not deleted even when the RFID label is re-issued due to a loss, in which chase a record associated with the re-issued RFID label has different "tag ID, "issued date," and "reason for issuance code" from the previous record.

The "enable/disable flag" set at "1" indicates that the RFID circuit element To is normally functioning, while the "enable/disable flag" set at "0" indicates that the RFID circuit element To is not normally functioning (including a scenario where the functions are disabled or set in a sleep mode in response to a command sent from the apparatus 2A, and a scenario where the apparatus 2A unsuccessfully read or wrote data from or into the RFID circuit element To, or unsuccessfully printed on the RFID label). When the apparatus 2A was unsuccessful in reading/writing data or printing, for example, the "enable/disable flag" is set to "0," and the "issue data" is reset to "000000." In this event, at the time the data registration instruction signal is received at step SS1516 shown in FIG. 9, the "enable/disable flag" may be preliminarily set to "1," and the control circuit 30 may access the database 201A to rewrite the "enable/disable flag" from "1" to "0," for example, at the time the control circuit 30 does not receive the read/write or print success report signal within a predetermined period of time at step SS1517 or SS1518 (or the control circuit 30 may receive a separate failure report), or at the time the failure is displayed on or recognized by the operator on the terminal 5 (conversely, the "enable/disable flag" may be preliminarily set to "0" upon receipt of an instruction, and rewritten to "1" upon receipt of an access success report). Additionally, in this event, the apparatus 2A may retry to read/write data into the RFID circuit element To or print a print on the RFID label T, in which case, a new record may not be created, but the same record is still used, where the "enable/disable flag" may be rewritten from "0" to "1" when the read or write or print is successfully carried out. In any case, the foregoing procedure implements a data-access device for enabling or disabling information stored in the database of the storage device in accordance with the result of a determination made by a determining device for access to a tag (or a determining device for print) in respective aspects of the present invention.

FIG. 12 is a diagram showing another exemplary data record displayed on the display device 5a of the terminal 5. In this example, FIG. 12 shows a record which is displayed on the display device 5a of the terminal 5 as reference data when the operator has selected the article information database 201B shown in FIG. 10, for example, in order to issue a management label for an in-house managed part associated with the RFID label T. As shown, in this example, the record contains columns of the following record items: "article code," "article name," "model number," "purchased date," "management section code," "manager code," "picture file name," "label base color code," "label print color code," "label image file name," "ID bit length," "tag ID (in hexadecimal notation)," "protocol code," "issued date," "reason for issuance code," and "enable/disable flag." In addition, FIG. 12 shows an exemplary label image file for this record together therewith.

Among these record items, the "article code," "article name," "mode," "purchased date," "management section code," "manager code," and "picture file name" belong to the object information (information on an article on which a label is adhered). Like the foregoing example, object information items related to "tag ID" in the record, enumerated side by side in the shown table, substantially form correlation information (an information of indicating a relationship one to the other) of the object information items to the tag ID.

Also, like the foregoing example, the "label base color code," "label print color code," "label image file name," "ID bit length," "protocol code," "issued date," "reason for issuance code," "enable/disable flag" are information items which are associated with the particular RFID label T.

Since the items "reason for issuance code," "tag ID," "issued date" and the like are treated in a similar manner to the foregoing example, descriptions thereon are omitted.

FIG. 13 shows a selection screen displayed on the display device 5a for the operator to operate on the terminal 5 in accordance with whether a RFID label is re-issued due to a loss or a failure, as determined at step SS1509 or SS1510 in FIG. 9 above. Referring to FIG. 13, in regard to reasons for re-issuance, the screen provides a check box 202A corresponding to re-issuance due to a failure, and a check box 202B corresponding to re-issuance due to a loss. As the operator selects the check box 202A and clicks on an "issue" button 203, the display device 5a of the terminal 5 displays a generated image representative of the appearance of a RFID label T at step SS1509 in a manner described above. As the operator selects the checkbox 202B and clicks on the "issue" button 203, the terminal 5 supplies a disable instruction signal to the storage device 200 at step SS1511 in a manner described above. Then, at step SS1512, the display device 5a displays an image representative of the appearance of the RFID label T similar to the above.

Additionally, in this example, the screen also provides a check box 202C which corresponds to a non-RFID label which can be issued from a base tape without RFID circuit elements To contained in a cartridge loaded in the cartridge holder in the apparatus 2A, though not related to re-issuance. When the operator selects the check box 202C and clicks on the "issue" button 203, for example, steps SS1515, SS1517, SS1520 are skipped in FIG. 9. Upon confirmation of a report on the successful print by the print head 10 alone (at step SS1518), the control circuit 30 registers at step SS1519 the RFID label in the database 201 in response to a data registration instruction signal generated at step SS1516. In this way, the system 1 for managing information of a RFID tag can also issue a normal printed label without a tag and register data associated therewith (print data alone).

On the other hand, in response to a printing instruction signal generated at step SS1514, a data write instruction signal generated at step SS1515 and a data registration instruction signal generated at step SS1516 in FIG. 9, the apparatus 2A writes information (tag ID) into the IC circuit part 151 of the RFID circuit element To through the antenna 14, prints a print on the cover film 103 by the print head 10, and registers associated data (the data record including the tag ID as shown in FIG. 11 or 12) in the database 201. FIG. 14 is a flow chart illustrating a control procedure executed by the control circuit 30 when the foregoing procedures are performed.

Referring to FIG. 14, the flow is first started when the control circuit 30 receives (identifies) the operation signal including the printing instruction signal, data write instruction signal, and data registration instruction signal through the communication network 3 and input/output interface 31, from the terminal 5 on which the operator performs a predetermined operation (see steps SS1514, SS1515, SS1516 in FIG. 9 above). Then, at step S1010, the control circuit 30 captures information (tag ID and the like) which should be written into the IC circuit part 151 of the RFID circuit element To through the antenna 14, based on the data write instruction signal from the terminal 5, and information to be printed (for example, the tag ID itself corresponding to the RFID circuit element To or information related to the application of the RFID label T, or the like) which should be printed on the RFID label T by the print head 10.

Subsequently, the flow goes to step S1015, where the control circuit 30 initializes a variable N for counting the number of times a retry is made when no response is returned from the RFID circuit element To, and a flag F indicative of a normal or a failed communication.

Then, at step S1020, the control circuit 30 supplies a control signal to the cartridge shaft drive circuit 24 to drive the ribbon take-up roller 106 and tape feeding roller 107 with a driving force of the motor 23 to drive cartridge shaft. In this way, the base tape 101 is fed out from the first roll 102 and supplied to the tape feeding roller 107, while the cover film 103 is fed out from the second roll 104. Further, the control circuit 30 supplies a control signal to the tape-feeding-roller motor 28 through the tape-feeding-roller drive circuit 29 to drive or rotate the feeding roller 17. As a result, the base tape 101 is bonded to the cover film 103 (after a print has been printed thereon, as will be later described) by the tape feeding roller 107 and sub-roller 109 for integration into the tag label tape 110 with print which is then transported to the outside of the cartridge 100.

Subsequently, at step S1030, the control circuit 30 performs a tag information writing procedure which involves transmitting predetermined RFID tag information (tag ID and the like) to the RFID circuit element To on the base tape 101 to write the RFID tag information into the RFID circuit element To (see FIG. 15, later described, for details).

Then, the flow goes to step Sl035, where the control circuit 30 supplies a control signal to the print drive circuit 25 to power the print head 10 which prints a print R such as characters, symbols, bar code or the like read at step S1010 in a predetermined area of the cover film 103 (for example, an area which is later adhered to the back side of the RFID circuit element To arranged at a predetermined pitch on the base tape 101). After step S1035, the flow goes to step S1039.

At step S1039, the control circuit 30 determines whether or not the flag F is set to "0." When the writing procedure has been normally completed, the flag F remains to be "0" (see step S1038 in a flow chart illustrated in FIG. 15, later described). Accordingly, the determination at step S1039 should be YES, causing the flow to go to step S1050.

At step S1050, the control circuit 30 confirms whether or not characters have been printed on an area of the cover film 103 corresponding to the RFID circuit element To which should be processed at this time, followed by the flow going to step S1060.

At step S1039 described above, if the writing procedure has not been normally completed for some reason, the flag F is set to "1" (see at step S1038 in the flow chart illustrated in FIG. 15, later described). Accordingly, the determination at step S1039 is NO, causing the flow to go to step S1045, where the control circuit 30 supplies a control signal to the printhead drive circuit 25 to stop the power to the print head 10 which stops the printing in response to the control signal. In this way, the control circuit 30 explicitly displays that a pertinent RFID circuit element To is defective through such interrupted printing. After step S1045 is completed, the flow goes to step S1060.

At step S1060, the control circuit 30 determines whether or not the tag label tape 110 with print has been transported to a predetermined position at which the tag label tape 110 with print should be cut by the cutter 15. Specifically, the control circuit 30 may determine whether or not the tag label tape 110 with print has been further transported by a predetermined distance long enough for a RFID circuit element To under processing and a print area on the cover film 103 corresponding thereto to go beyond the cutter 15 by a predetermined length (margin) by detecting an appropriate identification mark borne on the base tape 101 (more specifically, for example, the separation sheet 101d, or the cover film 103 or the like) corresponding to each RFID circuit element To by a known tape sensor disposed outside of the cartridge 100A (for example at a location downstream of the cutter 15 in the transport direction). Alternatively, instead of making such a detection, a determination may be made based on the information to be printed whether or not the total length of the print character length of the print R and a predetermined margin exceeds the overall length of the RFID circuit element To. This is because when the total length exceeds the overall length of the RFID circuit element To, the cutter 15 can be prevented from cutting the adhered RFID circuit element To by cutting a region beyond the margin of the tag label tape 110 with print at least at the time the print R has been printed on the cover film 103.

When the determination at step S1060 is YES, the flow goes to step S1070. At step S1070, the control circuit 30 supplies a control signal to each of the cartridge shaft drive circuit 24 and tape-feeding-roller drive circuit 29 to stop driving the motor 23 to drive cartridge shaft and tape-feeding-roller motor 28, thus stopping rotations of the ribbon take-up roller 106, tape feeding roller 107, and feeding roller 17. This results in stopping the transport of the base tape 101 fed out from the first roll 102 and the cover film 103 fed out from the second roll 104, so that the transport of the tag label tape 110 with print by the feeding roller 17 is also stopped.

Subsequently, at step S1080, the control circuit 30 supplies a control signal to the solenoid drive circuit 27 to drive the solenoid 26 which forces the cutter 15 to cut the tag label tape 110 with print. As described above, the RFID circuit element To under processing, for example, had been bonded to a printed area of the cover film 103 corresponding thereto to create the tag label tape 110 with print which has sufficiently passed beyond the cutter 15 at this time. The tag label tape 110 with print cut by the cutter 15 results in a RFID label T in which predetermined RFID tag information has been written into the RFID circuit element To and on which a predetermined print (a common word in this embodiment, as described above) has been printed in correspondence to the RFID tag information.

Subsequently, the flow goes to step S1090, where the control circuit 30 supplies a control signal to the tape-feeding-roller drive circuit 29 which resumes driving the tape-feeding-roller motor 28 to rotate the feeding roller 17 in response to the control signal. In this way, the feeding roller 17 resumes transporting the RFID label T created at step S1080 toward the carry-out exit 16 and further to the outside of the apparatus 2A from the carry-out exit 16.

Then, at step S1100, the control circuit 30 erases (initializes) all RFID tag information in the IC circuit part 151 included in the RFID circuit element To which remains in a communication range (the aforementioned region X) within the cartridge 100A. Specifically, the control circuit 30 outputs an "Erase" command to the signal processing circuit 22 for initializing information stored in the memory part 157 of the RFID circuit element To. In response, the signal processing circuit 22 generates an "Erase" signal which is transmitted to all the target RFID circuit elements To within the communication range (the aforementioned region X) through the transmitting portion 32 of the radio frequency circuit 21 and the antenna 14 to initialize the memory part 157 of the RFID circuit element To.

Subsequently, the flow goes to step S1110, where the control circuit 30 determines whether or not the flag F is "0" (F=0). When the writing procedure has been normally completed, the flag F remains to be "0" (see step S1038 in a flow chart illustrated in FIG. 15, later described). Accordingly, the determination at step S1039 should be YES (corresponding to step SS1517 in FIG. 9 above). Also, in this event, since the determination at S1039 is YES, and the print R has been successfully printed on the cover film 103 at step S1050 (corresponding to step SS1518 in FIG. 9 above), causing the flow to go to step S1120, where the control circuit 30 registers the database 201 in the storage device 200 with a combination of the RFID tag information (tag ID and the like) written into the RFID circuit element To at step S1030 with the information to be printed previously printed by the print head 10 corresponding thereto, together with other related information (including the object information of the RFID label T as well in this example) (corresponding to step SS1519 in FIG. 9 above. When some information has been previously registered, such information is overwritten and updated by the foregoing information). The registered information is stored in the database 201 such that the data can be referenced by the operator on the terminal (or the general purpose computer 6) as required.

On the other hand, if the writing procedure has not been normally completed for some reason, the flag F is set to "1" (see at step S1038 in the flow chart illustrated in FIG. 15, later described). Accordingly, the determination at step S1110 is NO, causing the flow to go to step S1130, where the control circuit 30 supplies an error display signal to the terminal 5 (or the general purpose computer 6) through the input/output interface 31 and communication network 3 (corresponding to steps SS1520, SS1521 in FIG. 9 above), causing the terminal 5 to display a corresponding failed write (error) on the display device 5a (corresponding to step SS1522), followed by the termination of the flow.

FIG. 15 is a flowchart illustrating in detail a procedure included in the aforementioned step S1030.

Referring to FIG. 15, after the aforementioned step S1020 in FIG. 14, the flow first goes to step S1031, where the control circuit 30 supplies a "Program" command to the signal processing circuit 22 for writing desired data into the memory part 157. In response, the signal processing circuit 22 generates a "Program" signal which constitutes RFID tag information including a tag ID that the operator essentially wishes to write. The "Program" signal is transmitted to all target RFID circuit elements To existing in a communicable area (in the aforementioned region X) through the transmitting portion 32 of the radio frequency circuit 21 and the antenna 14 to write the information into the memory parts 157 of the RFID circuit elements To.

Subsequently, at step S1032, the control circuit 30 outputs a "Verify" command to the signal processing circuit 22 to verify the contents of the memory part 157. In response, the signal processing circuit 22 generates a "Verify" signal which is transmitted to all the target RFID circuit elements To existing within the communicable area through the transmitting portion 32 of the radio frequency circuit 21 and the antenna 14 to prompt the RFID circuit elements To to return a reply.

Then, the flow goes to step S1033, where the apparatus 2A receives reply (response) signals transmitted from all the target RFID circuit elements To existing within the communicable area in response to the "Verify" signal through the antenna 14, and the control circuit 30 captures the reply signals through the receiving portion 33 of radio frequency circuit 21 and the signal processing circuit 22.

Next, at step S1034, the control circuit 30 determines based on the result of the reception at step S1033 whether or not the apparatus 2A has received any valid reply signal (signal indicating that the information has been normally stored in the memory part 157) from at least one of all the RFID circuit elements To within the communicable area.

When the determination at step S1034 is YES, the flow is terminated because the information has been correctly written into at least one RFID circuit element To within the region X with the avoidance of a failure in writing the information into any RFID circuit element To within the region X. When the determination at step S1034 is NO, the flow goes to step S1035, where N is incremented by one. Then, the control circuit 30 further determines at step S1036 whether or not N is equal to five. The determination is NO when N is equal to or less than four (N≦4), in which case the flow returns to step S1031, from which the control circuit 30 repeats a similar procedure. When N is equal to five (N=5), the flow goes to the aforementioned step S1038, where the control circuit 30 sets the flag F to "1," followed by the termination of the flow. In this way, even in the event of a failure in writing the RFID tag information, the apparatus 2A retries the writing procedure up to five times. Thus, even in the event of a failure in writing the RFID tag information into the RFID circuit element To within the region X through the antenna 14, the apparatus 2A retries the writing procedure up to a predetermined number N of times (N=5 in the foregoing example), thus maximally ensuring the reliability of the writing procedure. In addition, in the foregoing procedure, the write transmission power may be gradually increased during the N retries. Alternatively, instead of stopping printing at step S1045 in FIG. 14 after the control circuit 30 sets the flag F to "1" (F=1) at step S1038 in FIG. 15 when the retries have been failed N times, some warning may be printed in regard to the failures in writing (retries).

In the foregoing description, the control circuit 30, signal processing circuit 22, and radio frequency circuit transmitting portion 32 implement a tag-access device for accessing the IC circuit part of the RFID circuit element through the antenna device in response to the access instruction to information in a RFID tag in the respective aspects of the present invention.

Also, step S1120 in the flow of FIG. 14 executed by the control circuit 30 implements a data accessing means for accessing the database in response to an access instruction to a storage device; steps S1034, S1035, S1036 in FIG. 15 implement a determining device for access to a tag for determining whether or not the tag-access device successfully accesses the IC circuit part; and step S1110 in the flow of FIG. 14 (after step S1050 has been passed) implements a determining device for print for determining whether or not the printing device successfully prints a print.

Further, in the procedure in step SS1503 described in connection with FIG. 9, the transmission of the database reference instruction signal from the control circuit 30 to the storage device 200 implements a reference device for a correlation information for referencing whether or not correlation information corresponding to an access instruction to a storage device has previously stored in the database prior to an access to the database by the data-access device.

As described above, in the apparatus 2A of this embodiment, the operation signal generated by the operator operating on the terminal 5 includes three instructions related to one another: the access instruction to information in a RFID tag, access instruction to a storage device, and printing instruction. Among the three instructions, the access instruction is supplied to the signal processing circuit 22 and radio frequency circuit 21 through the control circuit 30, for reading or writing information such as a tag ID and the like from or into the IC circuit part 151 of the RFID circuit element To through the antenna 14. On the other hand, the access instruction to a storage device is supplied to the control circuit 30 which accesses the database 201 in the storage device 200 in response to the instruction to write (register) information on an object to which the RFID label T is to be attached, and a tag ID and the like corresponding thereto. Further, the printing instruction is supplied to the print head 10 through the control circuit 30 and print drive circuit 25, causing the print head 10 to print a predetermined print on the cover film 103 in response to the instruction.

As described above, in this embodiment, the storage device 200 is provided in the apparatus 2A, to collectively execute all the three functions required to issue the RFID label T which comprises the RFID circuit element To and a printed label, i.e., the tag access function, database access function, and print function using the three instructions (i.e., the access instruction to information in a RFID tag, access instruction to a storage device, and printing instruction) included in the single operation signal (from the terminal 5 in the foregoing example). In this way, it is possible to provide smooth access to the database 201 at all times irrespective of the network communication environment to accomplish reliable management of RFID tag information, unlike accesses to a database installed external to an apparatus for communicating with a RFID tag through network communications, where the apparatus only comprises a tag access function and a print function. As a result, the apparatus 2A of the embodiment can smoothly and rapidly issue the RFID labels T.

Also notably, in the foregoing embodiment, information stored in the database 201 of the storage device 200 can be overwritten or updated in accordance with the result of a tag access or printing, as described above (steps SS1517, SS1518, SS1519 in FIG. 9), and can also be intentionally enabled or disabled (see the enable/disable flag in FIGS. 11 and 12 and a description thereon). In this way, by reflecting the result of a tag access or printing to the information in the database 201 through a signal path within the apparatus 2A alone, the apparatus 2A is free from impediments to the association of the tag access result and printing result with data in the database depending on the network communication environment, as is the case with accesses to a database installed external to an apparatus for communicating with a RFID tag through network communications, where the apparatus only comprises a tag access function and a print function. As a result, the apparatus 2A of the embodiment can smoothly, rapidly, and reliably manage the RFID tag information.

Further notably, in the foregoing embodiment, the apparatus 2A can issue a RFID label T with the same ID using previously registered data in response to a failure of a tag and a requirement for a plurality of RFID labels. The apparatus 2A can also issue a RFID label with a different ID using previously registered data in response to a loss. Any of such features can improve the convenience for the operator. Particularly, when a RFID label is lost, the apparatus 2A can establish a new correlation (an information of indicating a relationship one to the other) of data to a tag ID different from that established when the lost RFID label was issued, issues a RFID label T using the correlation information, and invalidates the correlation associated with the previously issued RFID label T (step SS1511). As such, even if the lost RFID label T is still operative, it is possible to prevent a mixture of information between the previously issued RFID label and newly issued RFID label.

Further notably, in the foregoing embodiment, before issuing a RFID label T, the control circuit 30 generates an image of a RFID label T, when it is printed, which is displayed on the display device 5a of the terminal 5 for preview (image generate device implemented by steps SS1508, SS1509, SS1512 in FIG. 9). In addition, the image is stored in the database 201 of the storage device 200 in relation to associated data (see FIGS. 11, 12). Further, as described above, an image stored in the database 201 can be retrieved by the control circuit 30 in response to an appropriate operation on the terminal 5. The control circuit 30 generates a corresponding image-display signal (generate device for image-display signal) to display the image on the display device 5a of the terminal 5. With these features, the operator can readily recognize the appearance of the RFID label T before it is issued, and can therefore be provided with improved convenience.

Also notably, in the foregoing embodiment, as described with reference to FIG. 10, the storage device 200 comprises a plurality of databases 201A-201D which support different applications of the RFID circuit elements To. In this way, different databases can be provided and appropriately used for particular applications such as fixed asset management, office supply management, name plate production, and the like, thus improving the convenience.

Further notably, in the foregoing embodiment, as described in FIG. 13 in connection with the check box 202C, the apparatus 2A can also issue a printed label (without a tag) which does not include the RFID circuit element To but is only printed. As a result, the convenience can be improved for the operator. Particularly, in the foregoing embodiment, the apparatus 2A prints information to be printed which may be a tag ID itself of an associated RFID circuit element To, information related to the application of the RFID label T, or the like, permitting the operator to visually recognize unique identification information of each of the RFID circuit elements To, or information on the application of the RFID circuit element To on the tag label tape 110 with print and hence on the RFID label T.

It should be understood that the present invention can be modified in various manners without departing from the spirit and technical idea of the invention other than the foregoing embodiment. The following descriptions will be given of such exemplary modifications one by one.

(1-1) Sequential Retrieval by Using Plurality of Data from Database:

When the operator attempts to sequentially issue a plurality of RFID labels which satisfy predetermined conditions, particular data stored in the databases 201A-201D which satisfy the predetermined conditions are retrieved from the databases, and a plurality of RFID labels T are automatically issued in sequence using the retrieved data.

FIG. 16 is a table showing exemplary combinations of predetermined conditions which are applied when the operator retrieves data from the databases 201A-201D for sequentially issuing a plurality of RFID labels T with the databases 201A-201D from which the data may be retrieved.

Referring to FIG. 16, the table shows an example in which the operator sets the predetermined condition which is met by employees who are men and for whom RFID labels T have not been issued, and retrieves only data which satisfies the predetermined condition; and an example in which the operator retrieves only data on those employees who are women and for whom RFID labels T have not been issued, when data is retrieved from the employee management database 201A. In addition, the table shows an example in which the operator retrieves only data on those supplies which value less than 200,000 yens and for which RFID labels T have not been issued; and an example in which the operator retrieves only data on those supplies which value equal to or more than 200,000 yens and for which RFID labels T have not been issued, when data is retrieved from the supply management database 201B, an example in which the operator retrieves only data on those customers with whom trades have been made ten times or more and for whom RFID labels T have not been issued; and an example in which the operator retrieves only data on those customers with whom trades have been made less than ten times and for whom RFID labels T have not been issued, when data is retrieved from the customer management database 201D.

FIG. 17 is a conceptual timing chart illustrating basic operations executed by the apparatus 2A in this exemplary modification based on operation signals from the operation terminal 5, and corresponds to FIG. 9 in the foregoing embodiment. Steps similar to those in FIG. 9 are designated the same reference numerals, and descriptions thereon are omitted or simplified as appropriate.

Referring to FIG. 17, the generation of a status query signal (step SS1501), the retrieval of cartridge type information (identification information) by the control circuit 30 (step SS1502), the supply of a database reference instruction signal to the storage device 200 in accordance with a selected database (step SS1503), and the retrieval of a data record (records) from the storage device 200 and display of a list on the display device 5a of the terminal 5 (step SS1504) are similar to those in FIG. 9.

The operator views reference data displayed on the display device 5a, and enters predetermined conditions for retrieving data from the storage device 200 in order to sequentially issue a plurality of RFID labels T, as shown in FIG. 16, through the terminal 5 (step SS1540). In response, a database reference instruction (retrieval instruction) signal in accordance with the entered conditions is supplied to the storage device 200 through the control circuit 30 (step SS1541). In response to the database reference instruction signal, the control circuit 30 searches data previously registered in the databases 201A-201D for a data record (records) which matches the predetermined conditions defined in the instruction signal (step SS1542). Then, the control circuit 30 displays the retrieved data record on the display device 5a of the terminal 5, for example, in a list form as reference data which indicates the result of the search (step SS1543). In addition, the control circuit 30 supplies (transfers) information to be printed associated with the retrieved data to the print drive circuit 25 (step S1544), and supplies (transfers) information to be written associated with the retrieved data to the radio frequency circuit 21 and signal processing circuit 22 in a similar manner (step SS1545).

The operator views the reference data displayed on the display device 5a for confirmation, and performs an appropriate operation on the operation terminal 5 for sequentially issuing a plurality of RFID labels T using the displayed data, to supply the apparatus 2A with a single operation signal (sequential-production instruction signal) which comprises a tag access instruction (for writing data in this example), a printing instruction, and a storage device access (issue data registration) instruction.

Like the counterpart shown in FIG. 9, the printing instruction signal included in the operation signal (sequential-production instruction signal) is supplied to the print drive circuit 25 through the control circuit 30, causing the print drive circuit 25 to drive the print head 10 to print a corresponding print on the cover film 103 of each of the plurality of RFID labels T (step SS1514) based on the information to be printed transferred to the print drive circuit 25 at the aforementioned step SS1544. The data write instruction signal included in the operation signal (sequential-production instruction signal) is supplied to the signal processing circuit 22 and radio frequency circuit 21 through the control circuit 30, and corresponding information is written into the RFID circuit element To in each of the plurality of RFID labels T through the antenna 14 based on the information to be written entered at step SS1545 (step S1515). The issue data registration instruction signal included in the operation signal (sequential-production instruction signal) is supplied to the control circuit 30 which waits for a report signal (for one RFID label) indicating that the data was successfully written into the RFID circuit element To in one of the plurality of RFID labels T (step SS1517) and for a report signal (for one RFID label) indicating that the print was successfully printed on the each of the plurality of RFID labels T (step SS1518). When the control circuit 30 confirms the receipt of these report signals, the control circuit 30 registers the database 201 in the storage device 200 with the data (object information data and the like for one RFID label T) as issue data (step SS1519). Then, the control circuit 30 supplies the operation terminal 5 with a data write success report signal indicating that the issue data has been registered in the database 201 (step SS1520). Subsequently, the display device 5a of the operation terminal 5 displays the result corresponding to the report signal (success in this example) (step SS1522). Then, the control circuit 30 repeats again the same procedure (including steps SS1523 and SS1524 or steps SS1525 and SS1526) to information to be written into the RFID circuit element To of the next RFID label T and print a corresponding print on the cover film 103 of the RFID label T until all reference data retrieved from the databases 201A-201D have been registered.

On the other hand, when the control circuit 30 fails to print the print on the RFID label T or to write the data into the RFID circuit element To, the control circuit 30 supplies the operation terminal 5 with a data write failure report signal (step SS1521A) or a print failure report signal (step SS1521B). Then, the display device 5a of the operation terminal 5 displays a corresponding error result (step SS1522). Further, in a similar manner to the above, the control circuit 30 repeats again the same procedure (the aforementioned step SS1524 or SS1526) to retry writing the information into the RFID circuit element To of the same RFID label T and printing the print on the cover film 103 of the same RFID label T until the control circuit 30 is successful in both the write and print.

In the foregoing description, the control circuit 30 implements a cooperation controller for associatively controlling the printing device and tag-access device so as to collectively print a print on a corresponding print-receiving medium and access the IC circuit part in the RFID circuit element of each of a plurality of labels when the control circuit 30 receives an operation signal from the operation terminal which includes a continuous production instruction signal which instructs the control circuit 30 to sequentially issue a plurality of labels that meet predetermined conditions (see step SS1541) in the respective aspects of the present invention. The control circuit 30 also implements a search device (see step SS1542) for searching correlation information or identification information of an object on which a RFID label is to be attached, stored in the database, for those which meet predetermined conditions when the control circuit receives an operation signal from the operation terminal which includes a data search instruction signal with the predetermined conditions (see step SS1541). The control circuit 30 further implements a output device of a control signal (see steps SS1544, SS1545) for capturing information to be printed and information to be written associated with the searched information and supplying the printing device and data-access device with control signals corresponding to the captured information to be printed and information to be written, respectively.

The foregoing exemplary modification can also provide the essential advantage of the embodiment, i.e. the ability to smoothly access the database 201 at all times irrespective of the network communication environment and realize smooth, rapid and reliable management of RFID tag information.

Also, as described above, the apparatus 2A can retrieve particular data from the databases 201A-201D in response to a sequential production instruction simply entered from the operation terminal 5, rapidly and reliably ensure target information, and sequentially issue a plurality of RFID labels T which meet predetermined (search) conditions.

Further, even if the control circuit 30 once fails to information to be written into the RFID circuit element To of a RFID label T through the antenna 14 due to a communication error or the like, the control circuit 30 retries the writing procedure (step SS1524), thus making it possible to increase the probability of eventually successful write and realize reliable information management.

(1-2) When Using Local Network:

The foregoing description has been given of an example in which the apparatus 2A, terminals 5 and the like are interconnected through the communication network 3 and incorporated in a wide area network, as first illustrated in FIG. 1, the present invention is not so limited. Alternatively, the operation terminal 5 may be connected to the apparatus 2A through a local network (a closed system not connected to a wide area network), taking advantage of the fact that the apparatus 2A comprises the storage device 200 which stores the databases 201 as described above. FIG. 18 illustrates such an example, where the apparatus 2A and terminal 5 are interconnected through a local network (so called LAN or the like) (without connected to other external networks), and makeup a system 1 for managing information of a RFID tag'.

In this configuration, a variety of signals flow within the operation terminal 5 and the apparatus 2A basically in a similar manner to the embodiment described above, so that a description thereon is omitted.

This exemplary modification can also provide similar advantages to those of the embodiment.

(1-3) Self-Contained Apparatus:

The apparatus 2A may comprise all the functions of the terminal 5 in the aforementioned embodiment in an operation device (keyboard, mouse and the like) and a display device additionally provided in the apparatus 2A (for example, a touch panel can provide functions of the two devices). FIG. 19 is a conceptual diagram illustrating the configuration of a self-contained apparatus 2A' for communicating with a RFID tag in detail, and corresponds to FIG. 2 in the aforementioned embodiment. In the illustrated example, the input/display device (touch panel or the like) 250 is provided. The operation signal is generated by and supplied from the input/display device to the control circuit 30 which is also contained in an apparatus 2A'.

FIG. 20 is a conceptual timing chart illustrating operations executed by the single apparatus 2A', and corresponds to FIG. 9 above. Steps equivalent to those in FIG. 9 are designated the same reference numerals. While the illustrated example relates to the apparatus 2A' (so-called all-in-one type) which can serve functions similar to those provided by the terminal 5 and apparatus 2A as in the aforementioned embodiment, the present invention is not so limited. Alternatively, the CPU of the control circuit 30 may be partially simplified in function in order to simplify and reduce processing functions of the CPU and the storage capacities of a variety of memories. For example, the apparatus 2A' may not be capable of editing data or receiving new data on the premise that the apparatus 2A' uses only data previously registered in the databases 201 of the storage device 200.

This exemplary modification can also provide similar advantages to those of the aforementioned embodiment.

(1-4) When Read-Only RFID Circuit Element is Used:

While the foregoing embodiment has been described in connection with an illustrative scenario in which the RFID tag information (tag ID and the like) is transmitted to the RFID circuit element To write the information into the IC circuit part 151, the present invention is not limited to such a scenario. Alternatively, the present invention can also be applied to a RFID label T which is issued by reading RFID tag information from a read-only RFID circuit element To which previously stores predetermined RFID tag information (tag ID and the like) in a non-erasable manner, and printing a print corresponding to the read RFID tag information.

In this application, an appropriate shielding device may be provided such that the roll 102 does not fall within the region X (such that no communication is made with RFID circuit elements To within the roll 102) in the cartridge structure illustrated in the aforementioned FIG. 3. Then, the control circuit 30 may simply read information to be printed at step S1010 in FIG. 14, and perform the RFID tag information reading procedure at step S1030 (see FIG. 21, later described, for further details). At subsequent step S1120, the control circuit 30 saves a combination of the information to be printed with the read RFID tag information.

FIG. 21 is a flow chart illustrating in detail the RFID tag information reading procedure mentioned above.

Referring to FIG. 21, when a RFID circuit element To from which information is to be read is transported to the vicinity of the antenna 14, the control circuit 30 supplies a "Scroll All ID" command to the signal processing circuit 22 for reading information stored in the RFID circuit element To at step S1101. Based on the "Scroll All ID" command, the signal processing circuit 22 generates a "Scroll All ID" signal as wireless tag information, which is transmitted to the RFID circuit element To intended for reading (hereinafter also called the "target RFID circuit element To") through the radio frequency circuit 21, to prompt the RFID tag circuit element To return a reply signal.

Next, at step S1102, the apparatus 2A receives the reply signal (RFID tag information including tag ID information and the like) transmitted from the target RFID circuit element To in response to the "Scroll All ID" signal through the antenna 14. Then, the control circuit 30 captures the reply signal through the radio frequency circuit 21 and signal processing circuit 22.

Next, the control circuit 30 determines at step S1103 whether or not the reply signal received at step S1102 is erroneous using a known error detecting code (CRC (Cyclic Redundancy Check) code or the like).

When the determination is NO, the flow goes to step S1104, where N is incremented by one. Then, the control circuit 30 further determines at step S1105 whether or not N is equal to five. The determination is NO when N is equal to or less than four (N≦4), in which case the flow returns to step S1101, from which the control circuit 30 repeats a similar procedure. When N is equal to five (N=5), the flow goes to step S1107, where the control circuit 30 sets the flag F to "1," followed by the termination of the routine. In this way, even in the event of a failure in reading the RFID tag information, the apparatus 2A retries the reading procedure up to five times, thereby ensuring the reliability for reading.

When the determination at step S1103 is YES, this means that the RFID tag information has been successfully read from the target RFID circuit element To, followed by the termination of the routine.

Through the foregoing routine, the apparatus 2A can access and read the RFID tag information (tag ID information and the like) stored in the IC circuit part 151 of the target RFID circuit element To within the cartridge 100.

The exemplary modification above can also provide similar advantages to those in the foregoing embodiment.

(1-5) Prevention of Double Registration of Previously Registered Data:

Also, as described at step SS1505 in FIG. 9, in the aforementioned embodiment, even if data which the operator is going to register in the database 201 has previously been stored therein, the operator can proceed with the registration operation by so selecting on the terminal 5. The present invention, however, is not so limited, but alternatively, when data has previously been registered, the registration of the data may be prohibited from there on. Stated another way, data can be registered only when the data has not been registered. In this event, the apparatus for communicating with a RFID tag can advantageously prevent the operator from erroneously double registering data (correlation information and the like) which has been previously stored (registered) in the database.

In the following, a second embodiment of the present invention will be described with reference to FIGS. 22 to 33. A system 1 for managing information of a RFID tag of the second embodiment additionally employs production help information which comprises a cartridge correlation of cartridge identification information to a database for storing information of a RFID tag. Components identical to those in the first embodiment are designated the same reference numerals, and descriptions thereon are omitted or simplified as appropriate.

The system 1 for managing information of a RFID tag of the second embodiment is similar to the one illustrated in FIG. 1 in that the system 1 for managing information of a RFID tag comprises an apparatus 2B for communicating with a RFID tag of the second embodiment (the apparatus 2A in FIG. 1 is replaced by 2B).

FIG. 22 is a conceptual diagram illustrating in detail the configuration of the apparatus 2B, and corresponds to the aforementioned FIG. 2. Referring to FIG. 22, the apparatus 2B of the second embodiment differs from the apparatus 2A of the first embodiment in that the apparatus body 8 comprises a storage device 200 (tag information storage device) comprised, for example, of a non-volatile hard disk or the like which stores a plurality (four in this example) of various databases (database for storing information of a RFID tags) 201A-201D (an employee management database 201A, a supply management database 201B, library management database 201C, and customer management database 201D in this example).

The radio frequency circuit 21 is similar in configuration to the one illustrated in the aforementioned FIG. 5, while the RFID circuit element To is similar in functional configuration to the one illustrated in the aforementioned FIG. 6, so that descriptions on these components are omitted.

FIG. 23 is an explanatory diagram for describing in detail the structure of a cartridge 100B (equivalent to the cartridge 100A in the first embodiment) loaded in the apparatus 2B of the second embodiment. Referring to FIG. 23, the cartridge 100B differs from the cartridge 100A of the first embodiment in that a housing 100a is formed with an information encoded area 190 at a corner thereof. The information encoded area 190 has a plurality (six in this example) of sensor holes 190A-190F which are arranged substantially in L-shape as a whole, and extend through the information encoded area 190. The information encoded area 190 represents predetermined information (cartridge identification information) on the cartridge 100B loaded in the cartridge holder with the presence or absence of the sensor holes 190A-190F.

Specifically, the information encoded area 190 represents parameter information including tag attribute parameters of the RFID circuit elements To loaded in the cartridge 100B (the width of the base tape 101 which bears the RFID circuit elements To, the color of the base tape 101, a preferred color for printing, intervals at which the RFID circuit elements To are arranged on the base tape 101, the sensitivity of the antenna 152, the memory capacity of the IC circuit part 151, and the like), optimal communication parameters of the RFID circuit elements To (bit information of the length of tag identification information "tag ID", a communication protocol used for wireless communications, the frequency of radiowaves, and the like), and the like.

Generally, all the RFID circuit elements To included in one cartridge 100B share the same tag attribute parameters and communication parameters. Accordingly, the parameter information represented by the information encoded area 190 also represents the type of the cartridge 100B (cartridge identification information) which is detected by the sensor 20.

FIG. 24 is an explanatory diagram for describing an approach for detecting the cartridge type information in cooperation of the information encoded area 190 with the sensors 20. It should be noted that in the illustrated example described below, four sensor holes 190A-190D are formed in the information encoded area 190 for simplifying the description.

Referring to FIG. 24, the sensor 20 is provided with four push-type mechanical switches 20A-20D corresponding to the four sensor holes 190A-190D, respectively.

Each of the mechanical switches 20A-20D is comprised of a known push-type mechanical switch made up of a plunger 20*a* urged by an associated spring member, and a micro-switch (contact) 20*b*. The plunger 20*a* of each mechanical switch 20A-20D is disposed such that its leading end (upper end in FIG. 24) protrudes toward the sensor hole 190A-190D. In accordance with the presence or absence of each sensor hole 190A-190D, the micro-switch 20*b* selectively generates an ON signal or an OFF signal. Specifically, each plunger 20*a* initially protrude upward, as viewed in FIG. 24, such that the associated micro-switch 20*b* is not in contact with the plunger 20*a*, and remains off. When the sensor holes 190A-190D of the loaded cartridge 100B oppose the respective mechanical switches 20A-20D, the associated plungers 20*a* is not pushed down to maintain the micro-switches 20*b* in OFF state which responsively generate the OFF signals "0." On the other hand, when the sensor hole 190A-190D does not oppose the associated mechanical switch 20A-20D, the associated plunger 20*a* is pushed down to turn on the micro-switch 20*b* which generates the ON signal "1."

In this way, the four mechanical switches 20A-20D are associated with the result of detection as to the presence or absence of the four sensor holes 190A-190D, and the presence and absence of each sensor hole are corresponded to "1" and "0," respectively. Thus, the type of the cartridge 100B loaded in the cartridge holder can be represented by a four-bit code (in other words, 16 types of cartridge can distinguished from one another) of a detection signal generated by the sensor 20. For example, when all the sensor holes 190A-190D exist in the cartridge 100B, the sensor 20 generates a detection signal "1,1,1,1"; when the sensor holes 190A-190C exist, the sensor 20 generates a detection signal "1,1,1,0"; when the sensor holes 190A, 190B, 190D exist, the sensor 20 generates a detection signal "1,1,0,1"; when the sensor hole 190B alone exists, the sensor 20 generates a detection signal "0,1,0,0"; and when the sensor holes 190C, 190D exist, the sensor 20 generates a detection signal "0,0,1,1."

In the foregoing manner, when the cartridge 100B is loaded into the cartridge holder, the mechanical switches 20A-20D of the sensor 20 can detect the presence or absence of the respective sensor holes 190A-190D to identify the type of the cartridge 100B (in other words, the type of the base tape 101 and RFID circuit element To).

It should be understood that the sensor 20 is not limited to the mechanical switches but may employ another scheme, for example, a bar code scanner which reads bar code information provided on the information encoded area 190, or any other sensor for optically or magnetically reading optical or magnetic information provided on the information encoded area 190.

In the system 1 for managing information of a RFID tag equipped with the apparatus 2B in the configuration described above, the apparatus 2B is activated in response to an appropriate operation on the terminal 5 (or the general purpose computer 6) to print the print R on the cover film 103, and write the tag ID into the IC circuit part 151 (or alternatively or additionally write object information such as article information corresponding thereto), or read a tag ID previously stored in the IC circuit part 151.

The database 201 in the storage device 200 stores a correspondence relationship (i.e., a tag correlation, an information of indicating a relationship one to the other) between the written (or read) tag ID (identification information) of the RFID circuit element To in the issued RFID label T and information and the like (object information such as article information or the like) on an object associated with the RFID label T (object, article, member, machine, facilities or the like to which the RFID label T is attached, adhered, or mounted or in which the RFID label T is included) written into the IC circuit part 151 of the RFID circuit element To (or information read from the IC circuit part 151) during a read (or a write) operation as described above, such that the correspondence relationship can be referenced as required. Additionally, the correspondence relationship may be stored in the route server 4. In addition to the correlation information, the object information may also be stored together in the database 201 (see FIGS. 28, 29, later described). When the correlation information (an information of indicating a relationship one to the other) alone is stored in the database 201 in the storage device 200, the object information and the like may be stored, for example, in the information server 7 (database external to the apparatus 2B) such that the object information can be referenced. Since the completed RFID label T is similar in configuration to those illustrated in the aforementioned FIGS. 7A, 7B, 8, a description thereon is omitted.

Essentially, in the second embodiment, the cartridge 100B loaded in the cartridge holder is related to a plurality of databases 201A, 201B, 201C, 201D stored in the storage device 200 (using cartridge identification information provided on the information encoded area 190 in this example). Upon loading the cartridge 100B into the cartridge holder, a database related to the cartridge 100B is identified using the relation to access data stored in the database. In the following, details on the functions will be described one by one.

FIG. 25 is a table (correspondence table) showing the relation of the cartridge identification information to the databases 201A-201D (correspondence relationship, cartridge correlation). This table may be stored, for example, in the control circuit 30 of the apparatus 2B (which serves as a storage device for storing correlation). Not so limited, the table may be stored in another component of the apparatus 2B, or in the information server 7, route server 4, terminal 5 or the like external to the apparatus 2B.

Referring to FIG. 25, in the shown example, the information encoded area 190 detected by the sensor 20 comprises 12 sensor holes 190A-190L, and sensor 20 comprises 12 mechanical switches 20A-20L, corresponding to the sensor holes 190A-190L, which generate 12-bit codes representative of the cartridge identification information. The 12-bit code is further converted into a hexadecimal cartridge identification code.

As shown, this example employs six cartridge identification codes. When the loaded cartridge 100B has an identification code "0x648" (in hexadecimal, ditto for the following like codes) "0x548," the cartridge 100B is associated with the employee management database 201A (because the employee management database 201A stores object information corresponding to the RFID circuit elements To in the cartridge). Likewise, when the identification code is "0x8C8" "0xB48," the cartridge 100B is associated with the supply management database 201B. When the identification code is "0x008" "0x088," the cartridge 100B is associated with the customer management database 201D.

FIG. 26 is a conceptual timing chart illustrating basic operations (access to the storage device 200, a function of accessing the RFID circuit element To, and a function of printing by the print head 10) executed by the apparatus 2B based on operation signals from the terminal 5, and substantially corresponds to FIG. 9 in the aforementioned first embodiment.

Referring to FIG. 26, prior to actual communications of data, the terminal 5 first outputs a status query signal for querying the type of the cartridge 100B (step SS2501). Specifically, there are several types of cartridges 100B which differ in tag attribute parameters (tape width and the like) or communication parameters (communication protocol or the like) associated with the RFID circuit elements To contained in the base tape 101. As described above, each cartridge 100B is provided with an information encoded area 190 which includes information indicative of the type of the cartridge 100B. The cartridge type information is detected by the sensor 20. The result of the detection is supplied to the control circuit 30. The control circuit 30 captures the cartridge type information (identification information) based on the result of the detection (step SS2502). Alternatively, the cartridge type information may be supplied to the terminal 5 and displayed on the display device 5a.

The control circuit 30, which has captured the cartridge type information in the foregoing manner, determines whether or not the captured cartridge type information is stored in the table which indicates the relation of the cartridge type information to the databases 201A-201D (cartridge correlation), described in connection with FIG. 25 (in other words, whether or not a predetermined database has previously been related to the captured cartridge type information) (step SS2530). When the cartridge type information has previously been related, the control circuit 30 determines a database 201A-201D which should be referenced, based on the relation (step SS2531), notifies the terminal 5 of the determined database, and displays the determined database 201A-201D on the display device 5a of the terminal 5 (step SS2532).

On the other hand, when the cartridge type information captured by the control circuit 30 is not found in the table indicative of the cartridge correlation (correspondence table) (in other words, any database has not been related to the captured cartridge type information), the control circuit 30 notifies the terminal 5 of this fact, displays the databases 201A-201D in a list form on the display device 5a of the terminal 5 to prompt the operator to enter a database to which the captured cartridge type information is newly related (step SS2533, see FIG. 25).

When the operator views the list and selects one of the databases 201A-201D on the terminal 5, a database selection signal corresponding thereto is supplied to the control circuit 30 (step SS2534). The control circuit 30 registers a new relation (cartridge correlation) of the cartridge type information entered at step SS2502 above to the database selected by the operator and indicated by the database selection signal (step SS2535). For example, in the example of FIG. 25, the table is appended with a row which describes a cartridge identification code (in hexadecimal) corresponding to the cartridge type information and one of the databases 201A-201D side by side. The resulting table is stored for overwriting or updating the previous table. After the registration is completed in the foregoing manner, the flow goes to the aforementioned step SS351, where the control circuit 30 again determines a database 201A-201D which should be referenced based on the updated correspondence table, and displays the determined database 201A-201D on the display device 5a (step SS2532). Even when the cartridge type information has previously been registered in the table (when the determination at step SS2530 is YES) as described above, the table may be updated with modified contents if the operator wishes to modify the contents registered in the table.

When the operator views the display and notifies the apparatus 2B that the operator has confirmed the determined database through the terminal 5, a database reference instruction signal corresponding thereto is supplied to the storage device 200 through the control circuit 30 (step SS2503). In response to the database reference instruction signal, a data record (records) of data previously registered in the database (object information data of the RFID label T and the like in this example) is retrieved from the storage device 200, and displayed on the display device 5a of the terminal 5, for example, in a list form as reference data through the control circuit 30 (step SS2504).

The operator views the reference data displayed on the display device 5a and selects data which the operator is going to handle, if any, from the list of registered data, for example, in order to issue a RFID label T using the data or simply edit the data, or the like (step SS2505). When intended data has not been registered, the operator may additionally enter the data in the corresponding database for registration (step SS2506).

When the data selected or registered in this way is not used to issue a RFID label T (or a simple printed label which does not contain the RFID circuit element To may be issued as well), the procedure is terminated (step SS2507). On the other hand, when the RFID label T is issued, the operator performs appropriate operations involved in the issuance on the terminal 5, causing the control circuit 30 of the apparatus 2B to generate an image representative of the appearance (printed characters) of the RFID label T which is to be issued, and to display the image on the display device 5a of the terminal 5 (step SS2508). The previewed or displayed image of the appearance of the RFID label T is stored in a corresponding database in relation to the data (object information or the like) or the tag ID (step SS2513).

When the operator instructs the start of tag production (issuance) on the terminal 5 after the foregoing stages, the apparatus 2B is supplied with a single operation signal which comprises the access instruction to information in a RFID tag (for writing data in this example), printing instruction, and storage device access (issue data registration) instruction, as mentioned above. The printing instruction signal is supplied to the print drive circuit 25 through the control circuit 30 (step SS2514), causing the print drive circuit 25 to drive the print head 10 to print a corresponding print on the cover film 103. The data write instruction signal is supplied to the signal processing circuit 22 and radio frequency circuit 21 through the control circuit 30 (step SS2515), and information such as a tag ID is written into the RFID circuit element To through the antenna 14. The issue data registration instruction is supplied to the control circuit 30 which waits for a report signal indicating that the data was successfully written into the RFID circuit element To (step SS2517) and for a report signal indicating that the print was successfully printed on the RFID label T (step SS2518), confirms that the control circuit 30 has received these report signals, and registers the database 201 in the storage device 200 with issue data which includes correlation (a relationship one to the other) information of the tag ID written into the RFID circuit element To from the control circuit 30 with the object information and the like (or together with the object information as well) (step SS2519). Then, the control circuit 30 supplies the operation terminal 5 with a data write success report signal indicating that the issue data has been registered in the database 201 (step SS2520). When the control circuit 30 fails to print the print on the RFID label T or to write the data into the RFID circuit element To, the control circuit 30 supplies the operation terminal 5 with a data write failure report signal (step SS2521A) or a print failure report signal (step SS2521B). Then, the display device 5a of the operation terminal 5 displays the result corresponding to the report signals (success or failure) (step SS2522).

FIG. 27 is a database selection screen which is displayed on the display device 5a of the terminal 5 for listing the databases 201A-201D based on the database reference instruction signal which is supplied from the control circuit 30 at step SS2533 in FIG. 26 above. As illustrated, the screen displays four buttons, i.e., a button 210A for selecting the employee management database 201A, a button 210B for selecting the supply management database 201B, a button 210C for selecting the customer management database 201C, and a button 210D for selecting a patent management database 201D, from the databases 201 in the storage device 200 of the apparatus 2B. As described above, the database selection signal is supplied to the control circuit 30 at step SS2534 to register the selected database in the correspondence table. As described above, a database specifying signal is supplied to the control circuit 30 at step SS2534 for a database 201 selected from these four databases to register the selected database in the correspondence table.

FIG. 28 is a diagram showing an exemplary data record displayed on the display device 5a of the terminal 5 at step SS2504 in FIG. 26. This example shows a record which is displayed on the display device 5a of the terminal 5 as reference data when the operator has selected the employee management database 201A for reference at the aforementioned step SS2503, for example, in order to create a name plate for an employee which is associated with a RFID label T. As shown, in this example, the data record contains fields of the following record items: "employee code," "name," "reading," "sex code," "section code," "extension," "electronic mail address," "portrait file name," "cartridge identification code (in hexadecimal)," "label image file name," "tag ID (in hexadecimal notation)," "issued date," "reason for issuance code," and "enable/disable flag."

Among these fields, the "employee code," "name," "reading," "sex code," "section code," "extension," "electronic mail address," and "portrait file name" belong to the object information (information on an employee who carries the name plate). These object information items related to "tag ID" in the record, enumerated side by side in the shown table, substantially form correlation information (an information of indicating a relationship one to the other) of the object information items to the tag ID.

The "cartridge identification code," "label image file name," "issued date," "reason for issuance code," and "enable/disable flag" are information items which are associated with the particular RFID label T.

Among these information items, the "cartridge identification code" represents the type of the cartridge 100B, as mentioned above, and substantially includes tag attribute parameters (the width of the base tape 101, the color of the base tape 101, a color suitable for printing in this example), and communication parameters (bit information of the length of tag ID, a communication protocol used for wireless communications), as mentioned above.

The "reason for issuance code" is set to "0" when it indicates that a RFID label was issued for the first time (i.e., newly issued RFID label); to "1" when it indicates that a RFID label was re-issued due to a tag failure; and to "2" when it indicates that a RFID label was re-issued due to a loss.

The "enable/disable flag" set at "1" indicates that the RFID circuit element To is normally functioning, while the "enable/disable flag" set at "0" indicates that the RFID circuit element To is not normally functioning (including a scenario where the functions are disabled or set in a sleep mode in response to a command sent from the apparatus 2B, and a scenario where the apparatus 2B unsuccessfully read or wrote data from or into the RFID circuit element To, or unsuccessfully printed on the RFID label). When the apparatus 2B was unsuccessful in reading/writing data or printing, for example, the "enable/disable flag" is set to "0," and the "issued data" is reset to "000000" as well.

FIG. 29 is a diagram showing another exemplary data record. In this example, FIG. 29 shows a data record which is displayed on the display device 5a of the terminal 5 as reference data when the operator has selected the supply management database 201B for reference at the aforementioned step SS2503, for example, in order to issue a management label for an in-house managed part associated with the RFID label T. As shown, in this example, the record contains columns of the following record items: "article code," "article name," "model number," "purchased date," "management section code," "manager code," "picture file name," "(purchased) price," "cartridge identification code (in hexadecimal)," "label image file name," "tag ID (in hexadecimal notation)," "issued date," "reason for issuance code," and "enable/disable flag."

Among these record items, the "article code," "article name," "model number," "purchased date," "management section code," "manager code," "picture file name, and "price" belong to the object information (information on an article on which a label is adhered). Like the foregoing example, object information items related to "tag ID" in the record, enumerated side by side in the shown table, substantially form correlation information (an information of indicating a relationship one to the other) of the object information items to the tag ID.

Also, like the foregoing example, the "cartridge identification code," "issued date," "reason for issuance code," "enable/disable flag" are information items which are associated with the particular RFID label T.

Since the significance of the item "cartridge identification code" and how to treat the items "issued date," "reason for issuance code," and the like are similar to the foregoing example, descriptions thereon are omitted.

On the other hand, in response to a printing instruction signal generated at step SS2514, a data write instruction signal generated at step SS2515 and a data registration instruction signal generated at step SS2516 in FIG. 26, the apparatus 2B writes information (tag ID) into the IC circuit part 151 of the RFID circuit element To through the antenna 14, prints a print on the cover film 103 by the print head 10, and registers associated data (the data record including the tag ID as shown in FIG. 28 or 29) in the databases 201A-201D. A control procedure executed by the control circuit 30 in this event is similar to that represented by the flow chart of FIG. 14 in the first embodiment.

Specifically, in FIG. 14 described above, the flow is started when the control circuit 30 receives (identifies) the operation signal including the printing instruction signal, data write instruction signal, and data registration instruction signal through the communication network 3 and input/output interface 31, from the terminal 5 on which the operator performs a predetermined operation (see steps SS2514, SS2515, SS2516 in FIG. 26 above). Since steps S1010, S1015, S1020, S1030, S1035, S1039, S1045, S1050, S1060, S1070, S1080, S1090, S1100 and the like are similar to those described above (details of the procedure in step S1030 are similar to FIG. 15 above), detailed descriptions thereon are omitted.

After step S1100 is completed, the flow goes to the aforementioned step S1110, where the control circuit 30 determines whether or not the flag F is "0" (F=0). When the writing procedure has been normally completed, the flag F remains to be "0" (see step S1038 in a flow chart illustrated in FIG. 15, previously described). Accordingly, the determination at step S1039 should be YES (corresponding to step SS2517 in FIG. 26 above). Also, in this event, since the determination at S1039 is YES, and the print R has been successfully printed on the cover film 103 at step S1050 (corresponding to step SS2518 in FIG. 26 above), causing the flow to go to step S2120. Then, the control circuit 30 registers a corresponding database 201A-201D previously determined at step SS2531 in FIG. 26 with a combination of the RFID tag information (tag ID and the like) written into the RFID circuit element To at step S1030 with the information to be printed printed by the print head 10 corresponding thereto, together with other related information (including the object information of the RFID label T as well in this example) (corresponding to step SS2519 in FIG. 26 above. When some information has been previously registered, such information is overwritten and updated by the foregoing information). The stored data is stored in the database 201A-201D such that it can be referenced by the operator on the terminal 5 as required.

On the other hand, if the writing procedure has not been normally completed for some reason, the flag F is set to "1" (see at step S1038 in the flow chart illustrated in FIG. 15, previously described). Accordingly, the determination at step S1110 is NO, causing the flow to go to step S1130, where the control circuit 30 supplies an error display signal to the terminal 5 through the input/output interface 31 and communication network 3 (corresponding to steps SS2520, SS2521 in FIG. 26 above), causing the terminal 5 to display a corresponding failed write (error) on the display device 5a (corresponding to step SS2522), followed by the termination of the flow in FIG. 14.

In the foregoing description, the control circuit 30, signal processing circuit 22, and transmitting portion 32 of the radio frequency circuit 21 implements a tag-access device for accessing the IC circuit part of the RFID circuit element through the antenna device in the respective aspects of the present invention.

Also, step S1020 in the flow chart of FIG. 14 executed by the control circuit 30 implements a data-access device for accessing the database for storing information of a RFID tag based on an operation signal from the operation terminal, and steps S1034, S1035, S1036 in the flow chart of FIG. 15 described above, implement a determining device for access to a tag for determining whether or not the tag-access device successfully accesses the IC circuit part.

As described above, in the system 1 for managing information of a RFID tag of the second embodiment, when a RFID label is issued, the databases 200A-200D in the storage device 200 for storing information related to the RFID circuit element To are related to the cartridge 100B (in this example, they are related through the cartridge correlation shown in FIG. 25 based on the cartridge identification information carried on the information encoded area 190 of the cartridge 100B). In this way, when the cartridge 100B is loaded into the cartridge holder of the apparatus 2B, the relation (the cartridge correlation shown in FIG. 25 in this example) can facilitate the identification of a database 201A-201D which stores information associated with the RFID circuit element To which is to be accessed (see step SS2531 in FIG. 26). As a result, the control circuit 30 can readily and immediately access the database 201A-201D (see step SS2503 in FIG. 26) to retrieve the information associated with the target RFID circuit element To without fail (see step SS2504 in FIG. 26). Consequently, the apparatus 2B can smoothly and rapidly issue the RFID label T.

Also notably, in the second embodiment, since the cartridge correlation is stored in the control circuit 30 of the apparatus 2B, data communications can be smoothly made to retrieve the cartridge correlation at all times irrespective of the network communication environment, unlike the retrieval of the cartridge correlation stored in a storage device external to the apparatus 2B through a network communication. Also, in this event, additional cartridge correlations can be written into the control circuit 30, or previously stored cartridge correlations can be updated in response to instructions from the operator through the terminal 5.

Also notably, in the second embodiment, since the apparatus 2B comprises the storage device 200 which stores the databases 201A-201D, it is possible to provide smooth access to the databases 201 at all times irrespective of the network communication environment as described above, unlike accesses to a database for storing information of a RFID tag installed external to the apparatus 2B through network communications. However, the terminal 5 within the system 1 for managing information of a RFID tag, or another system 1 for managing information of a RFID tag, or an appropriate RFID tag information reader (not shown) or the like connected to the communication network 3 may be permitted to access the databases 201A-201D in the apparatus 2B through the communication network 3 for searches from the outside of the apparatus 2B. Further, in this event, all the databases 201A-201D in the storage device 200 may be made normally accessible without limitations (even from the RFID tag information reader and the like), and only when the cartridge is loaded (for example, when the sensor 20 detects that the cartridge for including at least a RFID tag 100B is loaded into the cartridge holder), part of the database 201A-201D (for example, at least one or more databases including a database identified by the cartridge identification information on the information encoded area 190) may be made accessible under the control of the control circuit 30 (limiting device).

Also notably, in the second embodiment, information stored in the databases 201A-201D of the storage device 200 can be overwritten or updated in accordance with the result of a tag access or printing, as described above (steps SS2517, SS2518, SS2519 in FIG. 26), to manage the latest information without fail. In this way, by reflecting the result of a tag access or printing to the information in the database 201 through a signal path within the apparatus 2B alone, the apparatus 2B is free from impediments to the association of the tag access result and printing result with data in the database depending on the network communication environment, as is the case with accesses to a database installed external to an apparatus for communicating with a RFID tag through network communications, where the apparatus only comprises a tag access function and a print function. As a result, the apparatus 2B of the second embodiment can smoothly, rapidly and reliably manage the RFID tag information without fail.

Further notably, in the second embodiment, before issuing a RFID label T, the control circuit 30 generates an image of a RFID label, when it is printed, which is displayed on the display device 5a of the terminal 5 for preview (step SS2513 in FIG. 26). In addition, the image is stored in the databases 201A-201D of the storage device 200 in relation to associated data (see step SS2513 above). Further, as described above, an image stored in the database 201 can be retrieved by the control circuit 30 in response to an appropriate operation on the terminal 5. The control circuit 30 generates a corresponding image-display signal to display the image on the display device 5a of the terminal 5. With these features, the operator can readily recognize the appearance of the RFID label T before it is issued, and can therefore be provided with improved convenience.

It should be understood that the present invention can be modified in various manners without departing from the spirit and technical idea of the invention other than the foregoing embodiment. The following descriptions will be given of such exemplary modifications one by one.

(2-1) Sequential Retrieval of Plurality of Data from Database:

The storage device for storing correlation (the control circuit 30 in the foregoing example) stores the cartridge correlation which includes not only the correlation of the cartridge identification information to one of the databases 201A-201D corresponding thereto, but also correlations to particular data included in the databases 201A-201D, thus allowing the apparatus 2B to automatically issue a plurality of RFID labels T associated with such data in sequence.

FIG. 30 is a table (correspondence table) showing the relation (i.e., correspondence relation, cartridge correlation) of cartridge identification information with particular data in the databases 201A-201D, and corresponds to FIG. 25 in the second embodiment. This table may be stored in the control circuit 30 (storage device for storing correlation) of the apparatus 2B, as is the case with the second embodiment, or may be stored in another location, information server 7, route server 4, terminal 5 or the like.

Referring to FIG. 30, in the shown example, 12 mechanical switches 20A-20L of the sensor 20 detect cartridge identification information to generate a 12-bit code indicative of the information which is converted into a cartridge identification code in hexadecimal, in a manner similar to the aforementioned example.

Like the table shown in FIG. 25, a "database" column indicates the name of a database which stores data corresponding to each cartridge identification code, and an "item condition" column indicates common nature to the particular data (in other words, search conditions for retrieving the particular data from the overall databases).

As shown, the table presents six cartridge identification codes in this example. When the loaded cartridge 100B has an identification code "0x648" (in hexadecimal, ditto for the following like codes), the cartridge 100B is related only to data which is stored in the employee management database 201A and pertinent to those employees who are men and for whom RFID labels T have not been issued. The cartridge 100B having an identification code "0x548" is related only to data which is stored in the employment management database 201A and pertinent to those employees who are women and for whom RFID labels T have not been issued Likewise, the cartridge 100B having an identification code "0x8C8" is related only to data which is stored in the supply management database 201B and pertinent to those supplies which value less than 200,000 yens and for which RFID labels T have not been issued. The cartridge 100B having an identification code "0xB48" is related only to data which is stored in the supply management database 201B and pertinent to those supplies which value equal to or more than 200,000 yens and for which RFID labels T have not been issued. The cartridge 100B having an identification code "0x008" is related only to data which is stored in the customer management database 201D and pertinent to those customers with whom trades have been made ten times or more and for whom RFID labels T have not been issued. The cartridge 100B having an identification code "0x088" is related only to data which is stored in the customer management database 201D and pertinent to those customers with whom trades have been made less than ten times and for whom RFID labels T have not been issued.

FIG. 31 is a conceptual timing chart illustrating basic operations executed by the apparatus 2B of an exemplary modification based on an operation signal from the terminal 5, and corresponds to FIG. 26 in the second embodiment. Steps similar to those in FIG. 26 are designated the same reference numerals, and descriptions thereon are omitted or simplified as appropriate.

Referring to FIG. 31, the terminal 5 first outputs a status query signal for querying the type of the cartridge 100A (step SS2501), and The control circuit 30 captures the cartridge type information (identification information) based on the result of the detection made by the sensor 20 (step SS2502) in a manner similar to those in FIG. 26.

The control circuit 30, which has thus captures the cartridge type information, determines a database 201A-201D which should be referenced, and data (record) which should be retrieved from the database, based on the table of FIG. 30 which represents the relation of the cartridge type information to particular data in the databases 201A-201D (cartridge correlation) (step SS2531'). Then, a data record(s) corresponding to the determined data from the previously registered database (object information data of the RFID labels T and the like in this example) is retrieved from the database 201A-201D of the storage device 200, and is displayed on the display device 5a of the terminal 5 through the control circuit 30, for example, in the form of a list which enumerates reference data (step SS2504).

After viewing the reference data displayed on the display device 5a, the operator enters a continuous production instruction from the terminal 5 when the operator wishes to collectively issue a plurality of RFID labels T related to the reference data. In response, the terminal 5 supplies the apparatus 2B with a single operation signal (i.e., continuous production instruction signal) which comprises an access instruction to information in a RFID tag (for writing the data in this example), a printing instruction, and a storage device access (issued data registration) instruction.

As described above in connection with FIG. 26, the printing instruction signal included in the operation signal (continuous production instruction signal) is supplied to the print drive circuit 25 through the control circuit 30 (step SS2514), causing the print drive circuit 25 to drive the print head 10 to print a corresponding print on the cover film 103 of each of the plurality of RFID labels T on a one-by-one basis. The data write instruction signal included in the operation signal (continuous production instruction signal) is supplied to the signal processing circuit 22 and radio frequency circuit 21 through the control circuit 30 (step SS2515), and information such as a tag ID is written into the RFID circuit element To of each of the plurality of RFID labels T through the antenna 14 on a one-by-one basis. The issue data registration instruction included in the operation signal (continuous production instruction signal) is supplied to the control circuit 30 which waits for a report signal indicating that the data was successfully written into the RFID circuit element To (of one RFID label T (step SS2517) and for a report signal indicating that the print was successfully printed on one of the RFID labels T (step SS2518), confirms that the control circuit 30 has received these report signals, and registers the database 201 in the storage device 200 with issue data which includes the data (object information data for the one RFID label T and the like) (step SS2519). Then, the control circuit 30 supplies the operation terminal 5 with a data write success report signal indicating that the issue data has been registered in the database

201 (step SS2520). Then, the display device 5*a* of the operation terminal 5 displays the result corresponding to the report signals (success in this example) (step SS2522). Subsequently, the control circuit 30 again returns to a similar procedure (steps SS2523 and SS2524, or steps SS2525 and SS2526) to information to be written into the RFID circuit element To of the next RFID label T and print a print on the cover film 103 of the RFID label until the control circuit 30 completes the registration of all reference data retrieved from the database 201A-201D in the manner described above.

On the other hand, when the control circuit 30 fails to print the print on the RFID label T or to write the data into the RFID circuit element To, the control circuit 30 supplies the operation terminal 5 with a data write failure report signal (step SS2521A) or a print failure report signal (step SS2521B). Then, the display device 5*a* of the operation terminal 5 displays the result corresponding to the report signals (success or failure) (step SS2522). In addition, the control circuit 30 repeats again the same procedure (the aforementioned step SS2524 or SS2526) to retry writing the information into the RFID circuit element To of the same RFID label T and printing the print on the cover film 103 of the same RFID label T until the control circuit 30 is successful in both the write and print.

In the foregoing description, the control circuit 30 implements a cooperation controller for associatively controlling the printing device and tag-access device so as to collectively print a print on a corresponding print-receiving medium and access the IC circuit part in the RFID circuit element of each of a plurality of labels when the control circuit 30 receives an operation signal from the operation terminal which includes a continuous production instruction signal which instructs the control circuit 30 to sequentially issue a plurality of labels that meet predetermined conditions in the respective aspects of the present invention (see steps SS2514, SS2515).

Likewise, in the foregoing exemplary modification, the foregoing exemplary modification can also provide the essential advantage of the embodiment, i.e. the ability to readily identify the database 201 which stores information corresponding to the RFID circuit element To within the cartridge 100B, which is to be accessed, and rapidly access the database 201 to retrieve the information corresponding to the target RFID circuit element To without fail, as is the case with the second embodiment.

Also, as described above, the apparatus 2B can not only identify the database 201A-201D corresponding to the RFID circuit element To which is to be accessed, based on the cartridge correlation illustrated in FIG. 30, but also retrieve particular data from the databases 201A-201D in response to a sequential production instruction simply entered from the operation terminal 5, rapidly and reliably ensure target information, and sequentially issue a plurality of RFID labels T which meet predetermined (search) conditions.

Further, even if the control circuit 30 once fails to information to be written into the RFID circuit element To of a RFID label T through the antenna 14 due to a communication error or the like, the control circuit 30 retries the writing procedure (step SS2524), thus making it possible to increase the probability of eventually successfully writing the information and realize reliable information management.

(2-2) Substitution of External Database for Internal Database:

In the foregoing embodiment, the database 201 in the storage device 200 contained in the apparatus 2B stores correlation information of tag ID written into (or read from, in an exemplary modification later described, ditto for the following description) the RFID labels T to object information associated with the RFID labels T and the like (or together with the object information). The present invention, however, is not so limited. The database 201 may be substituted for the information server 7 and route server 4 external to the apparatus 2B to store the correlation information therein in such a manner that the stored correlation information can be referenced as required.

Likewise, in the foregoing exemplary modification, the foregoing exemplary modification can also provide the essential advantage of the embodiment, i.e. the ability to readily identify the database 201 which stores information corresponding to the RFID circuit element To within the cartridge 100B, which is to be accessed, and rapidly access the database 201 to retrieve the information corresponding to the target RFID circuit element To without fail, as is the case with the second embodiment.

(2-3) When Using Local Network:

The foregoing description has been given of an example in which the apparatus 2B, terminals Sand the like are interconnected through the communication network 3 and incorporated in a wide area network, as first illustrated in FIG. 1, the present invention is not so limited. Alternatively, the operation terminal 5 may be connected to the apparatus 2A alone through a local network to form a system for managing information of a RFID tag (a closed system not connected to a wide area network), taking advantage of the fact that the apparatus 2B comprises the storage device 200 which stores the databases 201A-201D as described above. In this configuration, the system is similar to that illustrated in FIG. 18 (except that the apparatus 2B is substituted for the apparatus 2A). In this configuration, the apparatus 2B and terminal 5 are interconnected through a local network (so called LAN or the like) (without connected to other external networks), and make up a system 1' for managing information of a RFID tag.

In this configuration, a variety of signals flow within the operation terminal 5 and apparatus 2B basically in a similar manner to the embodiment described above, a description thereon is omitted.

This exemplary modification can also provide similar advantages to those of the second embodiment and exemplary modifications described above.

(2-4) Self-Contained Apparatus:

The apparatus 2B may comprise all the functions of the terminal 5 in the aforementioned embodiment in an operation device (keyboard, mouse and the like) and a display device additionally provided in the apparatus 2B (for example, a touch panel can provide functions of the two devices). FIG. 32 is a conceptual diagram illustrating the configuration of a self-contained apparatus 2B' for communicating with a RFID tag in detail, and corresponds to FIG. 22 in the aforementioned second embodiment. In the illustrated example, the input/display device (touch panel or the like) 250 is provided. The operation signal is generated by and supplied from the input/display device to the control circuit 30 which is also contained in apparatus 2B'.

FIG. 33 is a conceptual timing chart illustrating operations executed by the apparatus 2B', and corresponds to FIG. 26 above. Steps equivalent to those in FIG. 26 are designated the same reference numerals. While the illustrated example relates to the single apparatus 2B' (so-called all-in-one type) which can serve functions similar to those provided by the terminal 5 and apparatus 2B as in the aforementioned embodiment, the present invention is not so limited. Alternatively, the CPU of the control circuit 30 may be partially simplified in function in order to simplify and reduce processing functions of the CPU and the storage capacities of a variety of memories. For example, the apparatus 2B' may not be capable of editing data or receiving new data on the premise that the apparatus 2B' uses only data previously registered in the databases 201A-201D of the storage device 200.

This exemplary modification can also provide similar advantages to those of the second embodiment.

(2-5) When Read-Only RFID Circuit Element is Used:

While the foregoing embodiment has been described in connection with an illustrative scenario in which the RFID tag information (tag ID and the like) is transmitted to the RFID circuit element To write the information into the IC circuit part 151, the present invention is not limited to such a scenario. Alternatively, the second embodiment can also be applied to a RFID label T which is issued by reading RFID tag information from a read-only RFID circuit element To which previously stores predetermined RFID tag information (tag ID and the like) in a non-erasable manner, and printing a print corresponding to the read RFID tag information.

In this application, an appropriate shielding device may be provided such that the roll 102 does not fall within the region X (such that no communication is made with RFID circuit elements To within the roll 102) in the cartridge structure illustrated in the aforementioned FIG. 23. Then, the control circuit 30 may simply read information to be printed at step S1010 in FIG. 14, and performs the RFID tag information reading procedure at step S1030. At subsequent step S1120, the control circuit 30 saves a combination of the information to be printed with the read RFID tag information. Since details of the RFID tag reading procedure is similar to the flowchart illustrated in FIG. 21, descriptions thereon are omitted.

This exemplary modification can also provide similar advantages to those of the second embodiment.

A third embodiment of the present invention will be described with reference to FIGS. 34-42. A system for managing information of a RFID tag of the third embodiment additionally employs production help information which comprises a tag identification information which comprises an information-database-code part and an object-code part, and writes the tag identification information into an IC circuit part of a RFID circuit element. Components identical to those in the first and second embodiments are designated the same reference numerals, and descriptions thereon are omitted or simplified as appropriate.

FIG. 34 is a diagram illustrating the configuration of the system for managing information of a RFID tag of the third embodiment, and is equivalent to FIG. 1 in the first embodiment. The system 1 for managing information of a RFID tag illustrated in FIG. 34 additionally comprises a scanner 500 (RFID tag information reader) connected to an apparatus 2C for communicating with a RFID tag (RFID tag information management apparatus), in addition to a route server 4, a terminal 5 (operation terminal), a general-purpose computer 6, an information server 7 connected to the apparatus 2C through the communication network 3, in a manner similar to those illustrated in FIG. 1.

The apparatus 2C is similar in configuration to the apparatus 2B of the second embodiment illustrated in FIG. 22 above in that it comprises a variety of databases 201A-201D (first database, database for storing information of a RFID tag) stored in a storage device 200 (tag information storage device) which comprises, for example, a non-volatile hard disk drive or the like. A cartridge holder provided in the apparatus 2C is removably loaded with a cartridge 100C. The cartridge 100C is similar in structure to the cartridge 100B in the second embodiment illustrated in FIG. 22 above.

A radio frequency circuit 21 is also similar in configuration to that illustrated in FIG. 5 and therefore is omitted in the description. In addition, a RFID circuit element To, which is a medium for writing information therein, is also similar in functional configuration to the one illustrated in FIG. 6 above, and comprises the antenna 152 through which signals are transmitted to and received from an antenna 14 of the apparatus 2C, and the IC circuit part 151 connected to the antenna 152.

In the system 1 for managing information of a RFID tag equipped with the apparatus 2C in the configuration described above, the apparatus 2C is activated in response to an appropriate operation on the terminal 5 (or the general purpose computer 6) to print a print R on the cover film 103, and write the tag ID and object information corresponding thereto, such as article information and the like into the IC circuit part (or read a tag ID previously stored in the IC circuit part 151).

The database 201 in the storage device 200 stores a correspondence relationship (i.e., correlation information, an information of indicating a relationship one to the other) between the written (or read) tag ID (identification information) of the RFID circuit element To in the issued RFID label T and information (object information such as article information or the like) on an object associated with the RFID label T (object, article, member, machine, facilities or the like to which the RFID label T is attached, adhered, or mounted or in which the RFID label T is included) written into the IC circuit part 151 of the RFID circuit element To (or information read from the IC circuit part 151) during a read (or a write) operation as described above, such that the correspondence relationship can be referenced as required. Additionally, the correspondence relationship may be stored in the route server 4. In addition to the correlation information, the object information and the like may also be stored together in the database 201 (see FIGS. 11, 12 described in the first embodiment). When the correlation information (an information of indicating a relationship one to the other) alone is stored in the database 201 in the storage device 200, the object information and the like may be stored, for example, in the information server 7 (database external to the apparatus 2C) such that the object information can be referenced. The completed RFID label T is similar in configuration to those illustrated in the aforementioned FIGS. 7A, 7B, 8, and is therefore omitted in the following description.

Essentially, in the third embodiment, in the system 1 for managing information of a RFID tag which comprises the apparatus 2C in the configuration described above, when the apparatus 2C which comprises the storage device 200 that stores the databases 201 writes a tag ID (tag identification information) into the RFID circuit element To through the antenna 14, the tag identification information comprises a database-code part related to the database 201 which stores information associated with the RFID circuit element To, and an object-code part related to an object associated with the RFID circuit element To. In the following, details on the functions will be described one by one.

FIG. 35 is a conceptual timing chart representing the operation of the apparatus 2C when it is instructed to execute the three functions (storage device access function, tag information access function, and printing function) based on an operation signal from the terminal (operation terminal) 5.

Referring to FIG. 35, prior to actual communications of data, the terminal 5 first outputs a status query signal for querying the type of the cartridge 100C (step SS3501). Specifically, there are several types of cartridges 100C which differ in tag attribute parameters (tape width, tag arranged interval, tag sensitivity and the like) or communication parameters (frequency, communication protocol or the like)

associated with the RFID circuit elements To contained in the base tape 101. Each cartridge 100C is provided with an information encoded area 109 which includes information indicative of the type of the cartridge at an appropriate location (see FIG. 22 above). The cartridge holder of the apparatus 2C is provided with the sensor 20, i.e., a detecting device for reading the cartridge type information on the information encoded area (for example, a mechanical sensor such as a mechanical switch, an optical sensor such as a bar code scanner, or a magnetic sensor, or detection through a wireless communication and the like, see FIG. 202, previously described). The result of the detection associated with the cartridge type is supplied, for example, to the control circuit 30. In response to the status query signal, the control circuit 30 supplies the terminal 5 with a status response signal which includes the cartridge type information based on the result of the detection (step SS3502).

In this event, the database 201 in the storage device 200 of the apparatus 2C actually includes a plurality of databases 201A, 201B, . . . (see FIGS. 202 and 210, previously described). As the operator operates the terminal 5 to select one of these databases from which data is retrieved for use, a database reference instruction signal is supplied to the storage device 200 through the control circuit 30 in response to the selection (step SS3503). In response to the database reference instruction signal, a data record (records) of data previously stored in the database (object information data and the like associated with the RFID label T in this example) is retrieved from the storage device 200, and displayed on the display device 5a of the terminal 5 in a list form through the control circuit 30 for use as reference data (step SS3504).

After viewing the reference data displayed on the display device 5a, when the database 201 has already stored data which the operator is going to handle, for example, for issuing a RFID label T associated with the data or simply editing the data in the future, the operator selects the data from the list of registered data (step SS3505). When such intended data has not been registered in the database 201, the operator additionally enters the data in a corresponding database for registration (step SS3506).

When the data selected or registered in this way is not used to issue a RFID label T (or a simple printed label which does not contain the RFID circuit element To may be issued as well), the procedure is terminated (step SS3507).

On the other hand, when the RFID label T is issued, the operator performs appropriate operations involved in the issuance on the terminal 5, causing the control circuit 30 of the apparatus 2C to generate an image representative of the appearance (printed characters) of the RFID label T which is to be issued, and to display the image on the display device 5a of the terminal 5 (step SS3508). Subsequently, the image representative of the appearance of the RFID label T thus issued and displayed for preview is stored in a corresponding database in relation to the data (object information or the like) or tag ID (step SS3513).

When the operator instructs the start of tag production (issuance) on the terminal 5 after the foregoing stages, the apparatus 2C is supplied with a single operation signal which comprises the access instruction to information in a RFID tag (for writing data in this example), printing instruction, and storage device access (issue data registration) instruction, as mentioned above.

Among these instructions, the printing instruction signal is supplied to the print drive circuit 25 through the control circuit 30 (step SS3514), causing the print drive circuit 25 to drive the print head 10 to print a corresponding print on the cover film 103.

When data is written into the RFID circuit element To, a different procedure is followed depending on whether the RFID circuit element To is automatically or manually assigned a tag ID.

When the RFID circuit element To is assigned a number which is manually entered (SS3540), the operator himself sets and enter a desired tag ID on the terminal 5. The data write instruction signal included in the operation signal is supplied to the signal processing circuit 22 and radio frequency circuit 21 through the control circuit 30 (step S3515). Then, the set tag ID is generated and written into the RFID circuit element To through the antenna 14.

When the RFID circuit element To is automatically assigned a tag ID (step SS3541), prior to actual communications of data, the terminal 5 first outputs a status query signal for assigning the tag ID (step SS3542). Here, for example, upon powering on the apparatus 2C, the control circuit 30 has previously (or an appropriate timing such as timing at which the status query signal is entered) acquired apparatus identification information on the apparatus 2C (for example, a physical address such as so-called Ethernet®, a Mac address or the like, a logical address such as an IP address or the like, a unique apparatus number such as a manufacturing number, a serial number, an arbitrary management number which may be set by a manager on switches on the apparatus, or the like, and so forth) or part thereof. In response to the status query signal, the control circuit 30 supplies the terminal 5 with a status response (notification) signal which includes the previously acquired apparatus type information (step SS3543), which is displayed on the display device 5a as appropriate.

After confirming the displayed status, the operator appropriately operates the terminal 5 to instruct automatic numbering. In response, the control circuit 30 supplies an automatic numbering instruction signal to the storage device 200 (step SS3544). In response, the storage device 200 is searched for free numbers for tag IDs which have not related to data previously registered in the database (object information data and the like of the RFID label T in this example) (unused number or a plurality of unused numbers) (step SS3545). Retrieved free number data is displayed on the display device 5a of the terminal 5 through the control circuit 30, for example, in a list form (step SS3546). After confirming the display tag IDs (candidates), the operator appropriately operates the terminal 5 (for selecting one from a plurality of tag IDs, approving one tag ID, or the like), to determine a tag ID which is written into the RFID circuit element To of the RFID label T when it is issued (step SS3547). Subsequently, the data write instruction signal included in the operation signal is supplied to the signal processing circuit 22 and radio frequency circuit 21 through the control circuit 30 (step S3515) to generate the determined tag ID, and information such as the issued tag ID is written into the RFID circuit element To through the antenna 14.

The issue data registration instruction included in the operation signal in turn is supplied to the control circuit 30 which waits for a report signal indicating that the data was successfully written into the RFID circuit element To (step SS3517) and for a report signal indicating that the print was successfully printed on the RFID label T (step SS3518), confirms that the control circuit 30 has received these report signals, and registers the database 201 in the storage device 200 with issue data which includes correlation (a relationship one to the other) information of the tag ID written into the RFID circuit element To from the control circuit 30 with the object information and the like (also together with the object information) (step SS3519). Then the control circuit 30 supplies the operation terminal 5 with a data write success report signal indicating that the issue data has been registered in the database 201 (step SS3520). When the control circuit 30 fails to print the print on the RFID label T or to write the data into the RFID circuit element To, the control circuit 30 supplies the operation terminal 5 with a data write failure report signal (step SS3521A) or a print failure report signal (step SS3521B). Then, the display device 5a of the operation terminal 5 displays the result corresponding to the report signals (success or failure) (step SS3522).

Here, a similar database selection screen is displayed on the display device 5a of the terminal 5 to that illustrated in FIG. 10 described above in connection with the first embodiment, when the database reference instruction signal is supplied from the terminal 5 to the storage device 200 at step SS3503 in FIG. 35. Specifically, in the example illustrated in FIG. 10, the storage device 200 of the apparatus 2C stores four databases 201, i.e., the employee information database 201A, article information database 201B, customer information database 201C, and patent information database 201D. As described above, the reference instruction signal is supplied to the storage device 200 at step SS3503 to retrieve a data record(s) from a database 201 selected from the four databases 201A-201D. The retrieved data record(s) is displayed on the display device 5a of the terminal 5 for use as reference data.

Examples of the thus displayed data records may be the example of FIG. 11 described above (the employee information database 201A shown in FIG. 10 is selected for creating name plates for employees associated with RFID labels T), and the example of FIG. 12 (the article information database 201B shown in FIG. 10 is selected for issuing management labels for in-house managed parts associated with RFID labels T), as is the case with the first embodiment. Since these examples have been described, repeated descriptions are omitted.

FIG. 36 illustrates an operation selection screen which is displayed on the display device 5a of the terminal 5 for the operator to select whether the RFID circuit element To is automatically or manually assigned a tag ID (numbered) on the terminal 5 at step SS3508 in FIG. 35 above after confirming the image of the appearance of the RFID label T (how a print is printed thereon) (or at an appropriate timing before the confirmation).

Referring to FIG. 36, the screen provides five checkboxes 220A-220E in regard to possible ID assignment schemes.

The check box 220A is selected when the tag ID is manually entered. When the operator selects the check box 220A and clicks on an OK button 221, the operator can enter a desired tag ID which comprises an initial fixed field (four bits in this example) set to zero, and a following predetermined field (60 bits in this example) in which the operator can chose a desired number as described above to arbitrarily set the tag ID. Information including the thus set tag ID can be written into the RFID circuit element To (see Steps SS3540, SS3515 in FIG. 35).

The check boxes 220B, 220C, 220D are selected when the RFID circuit element To is automatically assigned a tag ID.

The check box 220B is selected when the tag ID is basically automatically assigned but includes a field for which numbers can be freely entered (automatic setting (1)). When the operator selects the check box 220B and clicks on the OK button 221, a resulting tag ID includes an initial fixed field (four bits in this example) set to "0000," a following predetermined field (32 bits in this example) in which the operator can chose a desired number as described above, and a following predetermined field (automatic numbering field) in which a free number for a tag ID retrieved from the database 201 of the storage device 200 and supplied from the control circuit 30 (see step SS3546 in FIG. 35) is automatically assigned in a predetermined manner (in a predetermined order, or at random). The tag ID having a manually entered field and an automatically assigned field is finally determined (see step SS3547 in FIG. 35), so that information including the tag ID can be written into the RFID circuit element To (see step SS3515 in FIG. 35).

The check box 220C is selected when the RFID circuit element To is automatically assigned a tag ID which includes a serial number of the apparatus 2C (automatic setting (2)). When the operator selects the check box 220C and clicks on the OK button 221, a resulting tag ID includes an initial fixed field (28 bits in this example) which contains an apparatus unique number (serial number in this example, see step SS3543 in FIG. 35), i.e., apparatus identification information of the apparatus 2C supplied through the control circuit 30 (comparable to a database-code part related to a database). A predetermined field (automatic numbering field) following the initial fixed field contains a free number for tag ID in the database 201 which is automatically assigned in a predetermined manner (comparable to an object-code part related to an object associated with the RFID circuit element). The tag ID automatically set in the foregoing manner is processed into final tag identification information in the signal processing circuit 22 and radio frequency circuit 21. Thus, information including the tag identification information can be written into the RFID circuit element.

The check box 220D is selected when the RFID circuit element is automatically assigned a tag ID which includes a physical address of the apparatus 2C (MAC address in this example) (automatic setting (3)). When the operator selects the check box 220D and clicks on the OK button 221, a resulting tag ID includes an initial fixed field (52 bits in this example) which contains the MAC address or apparatus identification information of the apparatus 2C supplied through the control circuit 30 (see Fig. step SS3543 in FIG. 35) (comparable to a database-code part related to a database). A predetermined field following the initial fixed field (automatic numbering field) contains a free number for tag ID in the database 201 which is automatically assigned in a predetermined manner (comparable to an object-code part related to an object associated with the RFID circuit element) in a manner similar to the foregoing. The tag ID automatically set in the foregoing manner is processed into final tag identification information in the signal processing circuit 22 and radio frequency circuit 21. Thus, information including the tag identification information can be written into the RFID circuit element.

The checkbox 220E is selected when the RFID circuit element is automatically assigned a tag ID which includes a logical address of the apparatus 2C (IP address in this example. In the following description, the logical address refers to the IP address) (automatic setting (4)). When the operator selects the checkbox 220E and clicks on the OK button 221, a resulting tag ID includes an initial fixed field (36 bits in this example) which contains the IP address, i.e., apparatus identification information, of the apparatus 2C supplied through the control circuit 30 (see step SS3543 in FIG. 35) (comparable to a database-code part related to a database). A predetermined field (automatic numbering field) following the initial fixed field contains a free number for tag ID in the database 201 which is automatically assigned in a predetermined manner (comparable to an object-code part related to an object associated with the RFID circuit element) in a manner similar to the foregoing. The tag ID automatically set in the foregoing manner is processed into final tag identification information in the signal processing circuit 22 and radio frequency circuit 21. Thus, information including the tag identification information can be written into the RFID circuit element.

In the foregoing example, the screen additionally displays a check box 220F which may be selected when information is read from the RFID circuit element To rather than writing information into the RFID circuit element To as described above (see an exemplary modification described later in connection with FIGS. 40 and 42). When the operator selects the check box 220F and clicks on the OK button 221, the control circuit 30 executes a flow illustrated in FIG. 42, later described, instead of the flow in FIG. 35 above.

Additionally, the screen may also provide a check box which permits the operator to select the production of a normal printed label without a tag and associated editing of data (only print data).

On the other hand, in response to the printing instruction signal at step SS3514, the data write instruction signal at step SS3515, and the data registration instruction signal at step SS3516 in FIG. 35, in the apparatus 2C, information (tag ID) is written into the IC circuit part 151 of the RFID circuit element To through the antenna 14, a print is printed on the cover film 103 of the RFID tag T by the print head 10, and data (data records illustrated in the aforementioned FIGS. 11 and 12 including the tag ID) is registered in the database 201. A control procedure executed by the control circuit 30 when it performs these operations is similar to the flow chart illustrated in FIG. 14 in the first embodiment.

Specifically, referring to FIG. 14 above, the flow is started when the control circuit 30 receives (identifies) the operation signal including the printing instruction signal, data write instruction signal, and data registration instruction signal through the communication network 3 and input/output interface 31, from the terminal 5 on which the operator performs a predetermined operation (see steps SS3514, SS3515, SS3516 in FIG. 35 above). Then, at step S1010, the control circuit 30 captures information (including tag ID which has been automatically set at step SS3547 or manually set at step SS3540 in FIG. 35) which should be written into the IC circuit part 151 of the RFID circuit element To through the antenna 14, based on the data write instruction signal from the terminal 5, and information to be printed (for example, the tag ID itself corresponding to the RFID circuit element To or information related to the application of the RFID label T, or the like) which should be printed on the RFID label T by the print head 10.

Subsequently, steps S1015, S1020, S1030, S1035, S1039, S1045, S1050, S1060, S1070, S1080, S1090, S1100 are similar to those described above.

After step S1100 is completed, the flow goes to step S1110, where the control circuit 30 determines whether or not the flag F is "0" (F=0). When the writing procedure has been normally completed, the flag F remains to be "0" (see step S1038 in a flow chart illustrated in FIG. 15, later described). Accordingly, the determination at step S1039 should be YES (corresponding to step S517 in FIG. 35 above). Also, in this event, since the determination at S1039 is YES, and the print R has been successfully printed on the cover film 103 at step S1050 (corresponding to step S518 in FIG. 35 above), causing the flow to go to step S1120. Then, at step S1120, the control circuit 30 registers the database 201 of the storage device 200 previously determined at step SS2531 in FIG. 26 with a combination of the RFID tag information (tag ID and the like) written into the RFID circuit element To at step S1030 with the information to be printed previously printed by the printhead 10 corresponding thereto, together with other related information (including the object information of the RFID label T as well in this example) (corresponding to step SS3519 in FIG. 35 above. When some information has been previously registered in the database 201, such information is overwritten and updated by the foregoing information). The stored data is stored in the database 201 such that it can be referenced by the operator on the terminal 5 as required.

On the other hand, if the writing procedure has not been normally completed for some reason, the flag F is set to "1" (see at step S1038 in the flow chart illustrated in FIG. 15, previously described). Accordingly, the determination at step S1110 is NO, causing the flow to go to step S1130, where the control circuit 30 supplies an error display signal to the terminal 5 (or the general purpose computer 6) through the input/output interface 31 and communication network 3 (corresponding to steps SS3520, SS3521 in FIG. 35 above), causing the terminal 5 to display a corresponding failed write (error) on the display device 5a (corresponding to step SS3522), followed by the termination of the flow.

FIG. 37 is a functional block diagram illustrating details of functional components of the scanner 500. Referring to FIG. 37, the scanner 500 comprises a control unit 520, and an antenna (reader-antenna-device) 530.

Control unit 520 comprises a CPU (central processing unit) 521, a network communication control unit 522 for controlling the transmission/reception of signals through the communication network 3, a memory 523 comprised, for example, of RAM, ROM or the like, and an RF communication control unit 540 for controlling communications with the RFID circuit element To through the antenna 530 and the antenna 152 of the RFID circuit element To.

FIG. 38 is a functional block diagram illustrating in detail the configuration of the RF communication control unit 540 and antenna 530.

Referring to FIG. 38, the antenna 530 comprises a transmission antenna (antenna element) 610 and a plurality (three in this example) of reception antennas (antenna elements) 611A, 611B, 611C.

The RF communication control unit 540 comprises a transmitting portion 612 and a receiving portion 613 (radio frequency circuit) for accessing (reading in this example) information (RFID tag information) in the IC circuit part 151 of the RFID circuit element To through the transmission antenna 610 and reception antennas 611A, 611B, 611C; phase control units 603A, 603B, 603C associated with the reception antennas 611A, 611B, 611C, respectively; and an adder 605 for adding outputs from the phase control units 603A-603C. The RF communication control unit 540 is connected to the CPU 521 which includes functions of processing a signal read from the IC circuit part 151 of the RFID circuit element To read information, and generating access information for accessing the IC circuit part 151 of the RFID circuit element To.

The phase control units 603A, 603B, 603C comprise phase shifters 606A, 606B, 606C for variably setting the phases of received radiowave signals through the reception antennas 611A, 611B, 611C in response to phase control signals received from the CPU 521; and variable gain amplifier (variable amplification factor amplifiers) 608A, 608B, 608C for variably amplifying signals supplied from the phase shifters 606A, 606B, 606C in response to a signal received from the CPU 521 to supplying the adder 605 with the amplified signals, respectively.

The transmitting portion 612 transmits a signal to the RFID circuit element To through the transmission antenna 610. The transmitting portion 612 comprises a crystal oscillator 615 for generating a carrier for accessing (reading in this example) RFID tag information in the IC circuit part 151 of the RFID circuit element To; a transmission multiplier circuit 616 (which may be implemented by a variable amplification factor amplifier or the like when a "TX_ASK" signal is used) for modulating the carrier generated by the crystal oscillator 615 based on a signal supplied from the CPU 521 (amplitude modulation of the carrier based on the "TX_ASK" signal from the CPU 521 in this example); and a transmission amplifier 617 for amplifying a modulated wave modulated by the transmission multiplier circuit 616 (determining an amplification factor based on the "TX_PWR" signal from the CPU 521 in this example). The carrier generated by the crystal oscillator is preferably falls at frequency of 300 MHz or higher, more preferably near 900 MHz or near 2.45 GHz. The output of the transmission amplifier 617 is sent to the antenna 610, and then supplied to the IC circuit part 151 of the RFID circuit element To.

The receiving portion 613 comprises a first receiver multiplier circuit 618 for multiplying reflected waves from the RFID circuit element To received by the reception antennas 611A, 611B, 611C and added by the adder 605 through the phase control units 603A, 603B, 603C by the carrier generated by the carrier generator; a first bandpass filter 619 for extracting signals only in a required band from the output of the first receiver multiplier circuit 618; a first receiving signal amplifier 621 for amplifying the output of the first bandpass filter 619; a first limiter 620 for further amplifying the output of the first receiving signal amplifier 621 and converting the amplified output to a digital signal; a second receiver multiplier circuit 622 for multiplying the reflected waves from the RFID circuit element To received by the reception antennas 611A-611C and added by the adder 605 through the phase control units 603A-603C by the carrier generated by the carrier generator, the phase of which has been delayed by 90° by a phase shifter 627; a second bandpass filter 623 for extracting signals only in a required band from the output of the second receiver multiplier circuit 622; a second receiving signal amplifier 625 for amplifying the output of the second bandpass filter 623; and a second limiter 624 for further amplifying the output of the second receiving signal amplifier 625 and converting the amplified output to a digital signal. A signal "RXS-I" output from the first limiter 620, and a signal "RXS-Q" output from the second limiter 624 are applied to the CPU 521 for further processing.

The outputs of the first receiving signal amplifier 621 and second receiving signal amplifier 625 are also applied to an RSSI (Received Signal Strength Indicator) circuit 626 which in turn applies the CPU 521 with a signal "RSSI" indicative of the strength of these signals. In this way, the RF communication control unit 540 of the scanner 500 in the third embodiment demodulates reflected waves from the RFID circuit element To through I-Q orthogonal demodulation.

The CPU 521, which is based on a so-called microcomputer, comprises a central processing unit, a ROM, a RAM and the like, though detailed illustration is omitted. The CPU 521 performs signal processing in accordance with a program previously stored in the ROM using a temporary storage function of the RAM. The CPU 521 receives a received signal and the like from the radio frequency receiving portion 613, performs predetermined operational processing thereon, and supplies an amplification control signal and a modulation control signal to the radio frequency circuit transmitting portion 612, phase control signals to the phase control units 603A-603H, and the like. The CPU 521 is connected to the communication network 3 (or a separate input/output interface), so that the CPU 521 can communicate information with the route server 4, information server 7, terminal 5, general purpose computer 6 and the like.

FIG. 39 is a conceptual timing chart representing operations of the scanner 500.

Referring to FIG. 39, the scanner 500 first detects a RFID circuit element To intended for scanning (reads RFID tag information in the IC circuit part 151, see FIG. 40, later described), and retrieve tag identification information (tag ID) from the RFID circuit element To (step SS3550).

Subsequently, the scanner 500 accesses the database 201 which stores information (i.e., an information of indicating a relationship one to the other, alternatively or additionally object information as well) corresponding to the tag ID (or corresponding to the database-code part extracted from the tag ID as required) to retrieve the information. The operation involved in retrieving the information differs depending on how the retrieved tag ID was set (assigned).

When the tag ID was manually set (see the check box 220A in FIG. 36 above), when the tag ID was automatically assigned with a part thereof being manually entered (automatic setting (1), see the check box 220B in FIG. 36), and when information is read (see the check box 220F in FIG. 36), the scanner 500 searches the database 201 of the apparatus 2C in a round-robin fashion through the communication network 3 until the tag ID matches (step SS3551). Specifically, the scanner 500 supplies a database search instruction signal to the control circuit 30 of the apparatus 2C (step SS3552), causing the control circuit 30 to search the database 201 in the storage device 200 of the apparatus 2C using the retrieved tag ID as a search key (step SS3553). This search result data is transmitted to the scanner 500 through the control circuit 30 from the storage device 200 (step SS3554). When certain data (an information of indicating a relationship one to the other or object information) matches (or includes) the tag ID of the search key (step SS35555), the scanner 500 retrieves the information of indicating a relationship one to the other or object information, and displays the information, for example, on an appropriate display device provided on the scanner 500 as a search result (step SS3556). When no data matches the tag ID of the search key, the scanner 500 queries another apparatus 2C (step SS3557), supplies the similar database search instruction signal to the above to the control circuit 30 of the apparatus 2C (step SS3552), causes the control circuit 30 to search the database 201 in the storage device 200 using the same tag ID as a search key (SS3553), retrieves the result of the search (step SS3554), and repeats the foregoing steps until any data matches the tag ID of the search key.

When the tag ID was automatically assigned using an apparatus unique number of the apparatus 2C (see check box 220C in FIG. 36 above), the scanner 500 causes the control circuits 30 of all apparatus 2C accessible to the scanner 500 through the communication network 3 to make a search in a round-robin fashion until the tag ID matches the apparatus unique number (apparatus serial number in this example) (step SS3558). Specifically, the scanner 500 supplies an apparatus serial number query signal to the control circuit 30 of a certain apparatus 2C (step SS3559). A reply (notification) to the query is transmitted from the control circuit 30 to the scanner 500 (step SS3560). When the serial number matches (or is included in) the tag ID, the scanner 500 supplies the database search instruction signal to the control circuit 30 of the apparatus 2C, the serial number of which matches the tag ID, in a manner similar to step SS3552 above (step SS3562), and causes the control circuit 30 to search the database 201 in the storage device 200 of the apparatus 2C using the retrieved tag ID as a search key (step SS3563). In this way, the scanner 500 retrieves an information of indicating a relationship one to the other (or object information) corresponding to the tag ID, and displays the information on the appropriate display device provided on the scanner 500 as a search result, in a manner similar to the foregoing (step SS3556).

On the other hand, when the serial number does not match the tag ID in the reply (notification) to the apparatus serial number query signal, the scanner 500 queries another apparatus 2C (step SS3564), supplies the similar apparatus serial number query signal to the above to the control circuit 30 of the apparatus 2C (step SS3559), receives a reply (notification) (step SS3560), and repeats the foregoing steps until the scanner 500 finds an apparatus 2C, the serial number of which matches the tag ID.

When the tag ID was automatically assigned using a physical address (MAC address or Ethernet® or the like) or a logical address (IP address or the like) of the apparatus 2C (see the check boxes 220D, 220E in FIG. 36 above), the scanner 500 uniquely determines the apparatus 2C to be accessed with the address. Accordingly, the scanner 500 directly supplies the database search instruction signal to the control circuit 30 of the identified apparatus 2C (step SS3562), causing the control circuit 30 to search the database 201 in the storage device 200 of the apparatus 2C using the retrieved tag ID as a search key (step SS3563). In this way, the scanner 500 retrieves an information of indicating a relationship one to the other (or object information) corresponding to the tag ID, and displays the information on the display device of the scanner 500 as a search result (step SS3556).

FIG. 40 is a flow chart illustrating a procedure executed by the CPU 521 when the scanner 500 operates to detect a tag (see step SS3550 in FIG. 39).

Referring to FIG. 40, at step S3601, the control circuit 30 generates a "Scroll All ID" signal, i.e., wireless tag information for reading information stored in the RFID circuit element To, and transmits the "Scroll All ID" signal to the target RFID circuit element To through the transmitting portion 612 of the RF communication control unit 540 and the transmission antenna 610, to prompt the RFID tag circuit element To return a response signal.

Next, at step S3602, the CPU 521 receives the reply signal (RFID tag information including tag ID information and the like) transmitted from the target RFID circuit element To in response to the "Scroll All ID" signal through the reception antennas 611A-611C, and captures the reply signal through the receiving portion 613 of the RF communication control unit 540.

Next, the CPU 521 determines at step S3603 whether or not the reply signal received at step S3602 is erroneous using a known error detecting code (CRC (Cyclic Redundancy Check) code or the like).

When the determination is NO, the flow goes to step S3604, where N is incremented by one. Then, the CPU 521 further determines at step S3605 whether or not N is equal to five. The determination is NO when N is equal to or less than four (N≦4), in which case the flow returns to step S3601, from which the CPU 521 repeats a similar procedure. When N is equal to five (N=5), the flow goes to step S3607, where the CPU 521 sets the flag F to "1," followed by the termination of the flow. In this way, even in the event of a failure in reading the RFID tag information, the scanner 500 retries the reading procedure up to five times, thereby ensuring the reliability for reading.

When the determination at step S3603 is YES, this means that the RFID tag information has been successfully read from the target RFID circuit element To, followed by the termination of the flow.

Through the foregoing routine, the scanner 500 can access and read the RFID tag information (tag identification information and the like) stored in the IC circuit part 151 of the target RFID circuit element To within the cartridge 100.

In the foregoing description, the signal processing circuit 22 and the transmitting portion 32 of the radio frequency circuit 21 implement a generate device for identification information of a RFID tag for generating tag identification information which is written into the RFID circuit element, and the transmitting portion 32 of the radio frequency circuit 21 also implements a writing controller for writing the tag identification information generated by the generate device for identification information of a RFID tag into the IC circuit part through the antenna device in the respective aspects of the present invention.

Also, the aforementioned step S1120 in the flow of FIG. 14 executed by the control circuit 30 implements a first data-access device for accessing a first database.

Further, the control circuit 30 for generating the automatic numbering instruction signal at step SS3544 in the flow chart of FIG. 35 is comparable to a generate device for query signal for generating a query signal for querying the first database as to a code which can be assigned to an object-code part.

Also, making a search of all accessible apparatus 2C in a round-robin fashion until the tag ID matches the apparatus serial number, associated with step SS3558 after the detection of the tag at step SS3550 in the flow chart of FIG. 39, and identifying the apparatus 2C which should be accessed using a physical address or a logical address at step SS3565 are comparable to a determining device for extracting a database-code part included in tag identification information of a RFID circuit element read through the antenna device, and determining a database corresponding to the extracted database-code part.

In the apparatus 2C according to the third embodiment described above, for writing information into the RFID circuit element To, the signal processing circuit 22 and radio frequency circuit transmitting portion 32 generate a tag ID which is transmitted to a target RFID circuit element To through the antenna 14, and written into the IC circuit part 151 of the target RFID circuit element To. In this event, the generated tag ID contains the database-code part (apparatus unique number, MAC address, IP address or the like in the foregoing example), and the object-code part (a free number in the database automatically assigned thereto in the foregoing example). In this way, after reading the information which has been written into the RFID circuit element To, the control circuit 30 can readily discriminate which database 201 stores information corresponding to the RFID circuit element To by extracting the database-code part contained in the read tag ID. As a result, the control circuit 30 can readily and rapidly access the database 201 to retrieve information (an information of indicating a relationship one to the other or object information) corresponding to the target RFID circuit element To without fail, thus permitting the apparatus 2C to smoothly and rapidly issue the RFID label T.

Also notably, the third embodiment provides the following advantages as well. Specifically, in an ordinary system configuration in which a database is not provided in an apparatus for communicating with a RFID circuit element to issue a RFID label, correlation information is stored in a single large-capacity database (external to the apparatus) interconnected, for example, to a plurality of the apparatuses through a network. Subsequently, when a reader reads information of a RFID label issued by the apparatus, each reader access the database (external to the apparatus) to retrieve the correlation information. Here, when the database 201 is built in the storage device 200 in each of the apparatus 2C, without a common large-capacity database external to the apparatuses, as in the third embodiment, the reader cannot identify an apparatus 2C which comprises the database 201 which should be accessed, when the reader (scanner) reads information of the RFID circuit element To, unless some measures are taken.

Accordingly, when the signal processing circuit 22 and radio frequency circuit transmitting portion 31 of the apparatus 2C issues a tag ID, the tag ID includes at least part of the apparatus identification information (physical address, logical address, unique number or the like) of the apparatus 2C which comprises the database 201. In this way, upon reading information from the RFID label T, the scanner 500 readily retrieve information indicative of the apparatus 2C which comprises the database 201 which should be accessed, so that the scanner can acquire corresponding correlation information and object information from the database 201 without fail.

Also, in the scanner 500 of the third embodiment, the scanner 500 extracts the database-code part contained in a tag ID read through the antennas 611A-611C, and determines a corresponding database based on the database-code part (directly identifies the apparatus using the physical address, logical address, or apparatus unique number). In this way, the scanner 500 identifies the database 201 (of the apparatus 2C) which stores information corresponding to the RFID circuit element To. As a result, the scanner 500 can readily and rapidly access the database 201 to retrieve information (an information of indicating a relationship one to the other or object information) corresponding to the target RFID circuit element To without fail. As a result, the scanner 500 can smoothly and rapidly communicate with the RFID circuit element To of the RFID label T.

It should be understood that the third embodiment can be modified in various manners without departing from the spirit and technical idea of the invention other than the foregoing. The following descriptions will be given of such exemplary modifications one by one.

(3-1) Substitution of External Database for Internal Database:

In the third embodiment, the database 201 in the storage device 200 contained in the apparatus 2C stores correlation information of tag ID written into (or read from, in an exemplary modification later described) the RFID labels T to object information associated with the RFID labels T and the like (or together with the object information). The present invention, however, is not so limited. The database 201 may be substituted for the information server 7 and route server 4 external to the apparatus 2C to store the correlation information therein in such a manner that the stored correlation information can be referenced as required.

In this configuration, the information server 7 and route server 4 implement a database for storing information of a RFID tag as well as a second database in the respective aspects of the present invention. Also, the aforementioned step S1120 in the flow chart of FIG. 14 executed by the control circuit 30 implements a second data-access device for accessing the second database.

Likewise, in the foregoing exemplary modification, the foregoing exemplary modification can also provide the essential advantage of the embodiment, i.e. the ability to readily identify the database 201 which stores information corresponding to the RFID circuit element To within the cartridge 100C, which is to be accessed, and rapidly access the database 201 to retrieve the information corresponding to the target RFID circuit element To without fail, as is the case with the third embodiment.

(3-2) When Using Local Network:

The foregoing description has been given of an example in which the apparatus 2C, terminal 5 and the like are interconnected through the communication network 3 and incorporated in a wide area network, as first illustrated in FIG. 34, the present invention is not so limited. Alternatively, the operation terminal 5 may be connected to the apparatus 2C alone through a local network to form a system for managing information of a RFID tag (a closed system not connected to a wide area network), taking advantage of the fact that the apparatus 2C comprises the storage device 200 which stores the databases 201 as described above. In this configuration, the system is similar to that illustrated in FIG. 18 (except that the apparatus 2C is substituted for the apparatus 2A). In this configuration, the apparatus 2C and terminal 5 are interconnected through a local network (so called LAN or the like) (without connected to other external networks), and make up a system 1' for managing information of a RFID tag.

In this configuration, a variety of signals flow within the operation terminal 5 and apparatus 2C basically in a similar manner to the embodiment described above, a description thereon is omitted.

This exemplary modification can also provide similar advantages to those of the third embodiment.

(3-3) Self-Contained Tag-Label Apparatus:

The apparatus 2C may comprise all the functions of the terminal 5 in the aforementioned embodiment in an operation device (keyboard, mouse and the like) and a display device additionally provided in the apparatus 2C (for example, a touch panel can provide functions of the two devices). Details of the configuration of this apparatus 2C' is similar to those illustrated inn FIG. 19 described in the first embodiment, where the apparatus 2C' for communicating with a RFID tag is provided with an input/display device (touch panel or the like) 250. The operation signal is generated by and supplied from the input/display device 250 to the control circuit 30 which is also contained in an apparatus 2C'.

FIG. 41 is a conceptual timing chart illustrating operations executed by the apparatus 2C', and corresponds to FIG. 35 in the third embodiment described above. Steps equivalent to those in FIG. 35 are designated the same reference numerals. While the illustrated example relates to the apparatus 2C' (so-called all-in-one type) alone which can serve functions similar to those provided by the terminal 5 and apparatus 2C as in the third embodiment, the present invention is not so limited. Alternatively, the CPU of the control circuit 30 may be partially simplified in function in order to simplify and reduce processing functions of the CPU and the storage capacities of a variety of memories. For example, the apparatus 2C' may not be capable of editing data or receiving new data on the premise that the apparatus 2C' uses only data previously registered in the database 201 of the storage device 200.

This exemplary modification can also provide similar advantages to those of the third embodiment.

(3-4) When Read-Only RFID Circuit Element is Used:

While the foregoing embodiment has been described in connection with an illustrative scenario in which the RFID tag information (tag ID and the like) is transmitted to the RFID circuit element To write the information into the IC circuit part 151, the present invention is not limited to such a scenario. Alternatively, the third embodiment can also be applied to a RFID label T which is issued by reading RFID tag information including a tag ID from a read-only RFID circuit element To which previously stores predetermined RFID tag information (tag ID and the like) in a non-erasable manner, and printing a print corresponding to the read RFID tag information.

FIG. 42 is a conceptual timing chart representing operations of the apparatus 2C in this exemplary modification, and is substantially equivalent to FIG. 35 in the third embodiment. Steps equivalent to those in FIG. 35 are designated the same reference numerals, and descriptions thereon are omitted or simplified as appropriate.

Referring to FIG. 42, an image representative of the appearance of a RFID label T similar to that of FIG. 35 is stored in the database (step SS3513). When the operator instructs the start of tag production (issuance) on the terminal 5 after the foregoing stages, the apparatus 2C is supplied with a single operation signal which comprises the access instruction to information in a RFID tag (for reading data in this example), printing instruction, and storage device access (issue data registration) instruction. The printing instruction signal is supplied to the print drive circuit 25 through the control circuit 30 (step SS3514), causing the print drive circuit 25 to drive the print head 10 to print a corresponding print on the cover film 103, in a manner similar to FIG. 35. The data read instruction signal is supplied to the signal processing circuit 22 and radio frequency circuit 21 (step SS3515A corresponding to step S3515 above) through the control circuit 30 to read information through the antenna 14. The issue data registration instruction in turn is supplied to the control circuit 30 which waits for a report signal indicating that the data was successfully read from the RFID circuit element To (step SS3517A corresponding to step SS3517 above) and for a report signal indicating that the print was successfully printed on the RFID label T (step SS3518), confirms that the control circuit 30 has received these report signals, and registers the database 201 in the storage device 200 with issue data which includes correlation (a relationship one to the other) information of the read tag ID from the control circuit 30 with the object information (also together with the object information) (step SS3519). Subsequently, steps SS3520 and SS3521A, step SS3521B, step SS3522 are similar to those in FIG. 35.

In this exemplary modification, an appropriate shielding device may be provided such that the roll 102 does not fall within the region X (such that no communication is made with RFID circuit elements To within the roll 102) in the cartridge structure illustrated in the aforementioned FIG. 22. Then, the control circuit 30 may simply read information to be printed at step S1010 in the procedure of FIG. 14 (in this exemplary modification, the procedure executed by the apparatus 2C in response to the printing instruction signal at step SS3514, the data read instruction signal at step SS3515A, and the data registration instruction signal at step SS3516 in FIG. 42), and performs the RFID tag information reading procedure at step S1030. At subsequent step S1120, the control circuit 30 saves a combination of the information to be printed with the read RFID tag information.

This exemplary modification can also provide similar advantages to those of the third embodiment.

A fourth embodiment of the present invention will be described with reference to FIGS. 43-57. The fourth embodiment is adapted to write application-related information or information for assisting production of a RFID label into RFID circuit elements contained in a cartridge. Components identical to those in the first to third embodiments are designated the same reference numerals, and descriptions thereon are omitted or simplified as appropriate.

Like the first to third embodiments described above, an apparatus for communicating with a RFID tag of the fourth embodiment is applied to a system for managing information of a RFID tag (RFID tag issuing system) which is similar in configuration to that illustrated in FIG. 1 described above (except that an apparatus 2D for communicating with a RFID tag is substituted for the apparatus 2A).

Specifically, the apparatus 2D for communicating with a RFID tag provided in the system 1 for managing information of a RFID tag illustrated in FIG. 1 is interconnected to a route server 4, a terminal 5 (operation terminal), a general purpose computer 6, and an information server 7 (external storage device) through the communication network 3 to build a (for example, wide area) network.

The terminal 5 is a so-called personal computer (PC) terminal which comprises a display device 5a and a keyboard (or a mouse or the like) 5b which is an operation device, as well as a central processing unit or CPU (starting device), ROM, RAM (software database) and the like, not shown, like the one described above. In this event, the CPU starts an application, for example, previously stored in the ROM for operating the apparatus 2D based on an external signal supplied thereto through the communication network 3 (described later in greater detail).

FIG. 43 is a conceptual diagram illustrating in detail the configuration of the apparatus 2D. Unlike the apparatus 2A-2C for communicating with a RFID tag of the first to third embodiments, the apparatus 2D illustrated in FIG. 43 is adapted to transmit/receive signals to/from a RFID circuit element Tc (storage device, application-related information RFID circuit element, recording medium) through an antenna 19 (antenna device) by wireless communication. The RFID circuit element Tc is disposed in a cartridge 100D (cartridge for including at least a RFID tag) removably loaded in a cartridge holder (not shown) of the apparatus 2D.

On the other hand, the apparatus 2D transmits/receives signals to/from a RFID circuit element To (RFID circuit element for RFID label, described later in detail) borne on the printed tag-label tape 110 through an antenna 14A (antenna device) substantially equivalent to the antennas 14 in the first to third embodiments. The apparatus 2D also comprises a pair of transport guides 13 for holding a RFID tag circuit element To in a predetermined access area opposite to the antenna 14 upon transmission/reception of signals by wireless communication, and guiding the tape 110 (i.e., RFID label T) cut by the cutter 15. The antennas 19, 14A are connected to a radio frequency circuit 21A which is equivalent to the aforementioned radio frequency circuit 21.

FIG. 44 is an explanatory diagram for describing in detail the structure of the cartridge 100D. The cartridge 100D illustrated in FIG. 44 comprises the RFID circuit element Tc at a position substantially opposite to the antenna 19 of the apparatus body 8 in a housing 100a.

The RFID circuit element Tc stores application-related information of RFID circuit elements To contained in the cartridge 100D. Here, the application-related information refers to information indicative of an application in which the RFID circuit elements To are used. In the fourth embodiment, the RFID circuit element Tc stores ID information related to applications of the RFID circuit elements To on a one-to-one basis (hereinafter simply called the "ID information"). The ID information is read prior to an access made to RFID tag information in an IC circuit part 151 of each RFID circuit element To borne on a base tape 101 through the antenna 14A (described later in detail).

FIG. 45 is a functional block diagram illustrating in detail functions of the radio frequency circuit 21A, and is equivalent to the aforementioned FIG. 4. Referring to FIG. 45, the radio frequency circuit 21A comprises an antenna switch circuit 341 which is switched by a control circuit 30, in addition to similar components of the radio frequency circuit 21 described above.

The antenna switch circuit 341 is a switch circuit using a known radio frequency FET and diode for connecting one of the antennas 14A, 19 to a transmit-receive splitter 34 in response to a selection signal from the control circuit 30.

The transmitting portion 32 transmits signals to the RFID circuit elements To, Tc through the antenna switch circuit 341 and antennas 14A, 19, while the receiving portion 33 receives reflected waves from the RFID circuit elements To, Tc through the antennas 14A, 19. The radio frequency circuit 21A of the apparatus 2D of the fourth embodiment also demodulates reflected waves from the RFID circuit elements To, Tc through the I-Q orthogonal demodulation in a manner similar to the radio frequency circuits 21 in the apparatus 2A-2C described above.

The RFID circuit element To is similar in functional configuration to that illustrated in FIG. 6 above, and comprises the antenna 152 for transmitting/receiving a signal to/from the apparatus 2D through the antenna 14A, and the IC circuit part 151 connected to the antenna 152. Though detailed illustration is omitted, the RFID circuit element Tc disposed in the cartridge 100D is also similar in configuration to the RFID circuit element To, and comprises the IC circuit part 151, antenna 152 and the like.

FIG. 46 is a flow chart illustrating a control procedure executed by the control circuit 30 during the production of the RFID label T in the apparatus 2D of the fourth embodiment (where a predetermined print is printed by the print head 10 on the cover film 103 which is transported while the base tape 101 is bonded to the cover film 103 to form the tag label tape 110 with print which is then cut into individual RFID labels T, each of which contains one RFID circuit element To), in a manner similar to the apparatus 2A-2C of the first to third embodiments.

Referring to FIG. 46, the flow is started, for example, when the operator instructs the apparatus 2D to read or write RFID tag information through the terminal 5 (or the general purpose computer 6, ditto for the following description) (stated another way, issue a RFID label). First, at step S4010, the control circuit 30 selects an application for operating the apparatus 2D for use by the operator on the terminal 5 (operation software or a template for print format), associated with a corresponding application, based on the ID information previously stored in the memory part 157 (see FIG. 5 above) of the RFID circuit element Tc disposed in the cartridge 100D (see FIG. 47, later described).

At next step S4050, the control circuit 30 switches a tag access to the tape. Specifically, the control circuit 30 supplies a selection signal to the antenna switch circuit 341 to switch the antenna switch circuit 341 such that the antenna 14A is connected to the transmit-receive splitter 34.

Then, the flow goes to step S4100, where RFID tag information is written into the memory part 157 of the IC circuit part 151 of the RFID circuit element To, and a predetermined print is printed on the cover film 103 in accordance with the RFID tag information which should be written into the IC circuit part 151 of the RFID circuit element To, and information to be printed which should be printed on the RFID label T by the print head 10 from the antenna 14A, entered through the terminal 5 using the application selected at step S4010 above (when RFID tag information is read, a predetermined print is printed on the cover film 103 in accordance with information to be printed, entered through the terminal 5 using the application selected at step S4010 above, which should be printed on the RFID label T by the print head 10 from the antenna 14A), and the tag label tape 110 with print is then cut into individual RFID labels T, each of which contains one RFID circuit element To (see FIGS. 52 to 54, later described, for further details), followed by the termination of the flow. Alternatively, when the RFID label is issued using a so-called die-cut type label material which is previously formed with cut lines for peeling in a predetermined region including the RFID circuit element To, the cutting is not required. The RFID label T completed in the foregoing manner is similar in configuration to those illustrated in FIGS. 7A, 7B, 46, so that a description thereon is omitted.

FIG. 47 is a flowchart illustrating in detail a procedure in step S4010 above.

Referring to FIG. 47, the control circuit 30 first determines at step S4011 whether or not the cartridge 100D has been loaded into the cartridge holder provided in the apparatus body 8 of the apparatus 2D. Specifically, though not described with reference to a figure, the loaded cartridge 100D is detected by a mechanical switch for detecting the presence or absence of the cartridge 100D, for example, by urging and a spring member to bring the same into contact with the housing 100a of the cartridge 100D, or a sensor which comprises a light emitting diode for emitting light, for example, in response to a signal from the control circuit 30 and a phototransistor for receiving light emitted from the light emitting diode and reflected by the housing 100a to supply a corresponding detection signal to the control circuit 30, and the like, and the detection signal is supplied to the control circuit 30.

Subsequently, the control circuit 30 switches the tag access to the cartridge 100D at step S4012. Specifically, the control circuit 30 supplies a selection signal to the antenna switch circuit 341 to switch the antenna switch circuit 341 such that the antenna 19 is connected to the transmit-receive splitter 34.

At next step S4013, the control circuit 30 reads the ID information previously stored in the memory part 157 (see FIG. 5 shown before) of the RFID circuit element Tc disposed in the cartridge 100D (see FIG. 51, later described).

At next step S4014, the control circuit 30 determines whether or not the operator has performed an operation for registering a new application for operating the apparatus 2D. Specifically, the control circuit 30 supplies a control signal to the CPU of the terminal 5 through the input/output interface 31 and communication network 3, causing the terminal 5 to display a message screen for asking the operator whether or not a new application is registered on the display (display device) 5a. An example of a displayed screen in this event is illustrated in FIG. 48. The operator is prompted by the message, and enters whether or not a new application is registered using the key board (operation device) 5b (or a mouse, not shown, or the like). Thus, the input signal is supplied to the control circuit 30 through the communication network 3 and input/output interface 31, so that the control circuit 30 makes the determination based on the input signal. For example, when an intended application has been so far used and has already been related to ID information stored in the RFID circuit element Tc in the cartridge 100D, the operator indicates that a new application is not registered, causing the determination at step S4014 to be NO. Accordingly, the flow goes to next step S4015.

At step S4015, the control circuit 30 supplies a control signal, for example, to the information server 7 (correlation-reading-instruction signal output device) to read correlation information previously stored in a memory or the like of the information server 7, which relates ID information stored in the RFID circuit element Tc in the cartridge 100D to an application for operating the apparatus 2D on a one-to-one basis through the communication network 3 and input/output interface 31. Then, the control circuit 30 temporarily stores the read correlation information in its RAM or the like. Alternatively, the correlation information may relate a plurality of applications to one piece of ID information (see an exemplary modification, later described). In this event, the plurality of applications are related in a predetermined order based on a past RFID label production log (for example, a higher priority is given to a more frequently used application), and this order information is included together in the correlation information, and may be read at step S4015. Further, the order information may be stored in the RFID circuit element Tc together with the ID information, instead of the information server 7.

At next step S4016, the control circuit 30 selects an application related to the ID information read from the RFID circuit element Tc in the cartridge 100D at previous step S4013 based on the correlation information stored in the RAM at step S4015 above. Then, the control circuit 30 supplies a control signal to the CPU of the terminal 5 through the input/output interface 31 and communication network 3 (output device of a software-confirmation-display signal, output device of software-control signal), causing the terminal 5 to display the name or the like of the selected application (for example, a symbol, an icon or the like. Specifically, any display which permits the operator to discriminate the selected application) on the display 5a (in other words, equivalent to displaying an application of the RFID circuit element To, i.e., a output device of a display signal), and to display a message screen for asking the operator whether or not the operator approves the selected application. An example of a selection screen at this time is illustrated in FIG. 49. In the example of FIG. 49, fixed asset management is selected from among three applications, fixed asset management, name plate management, and document management.

At next step S4017, the control circuit 30 determines whether or not the operator approves the application selected at step S4016. Specifically, the operator enters whether or not the operator approves the selected operation through the keyboard 5b of the terminal 5, and the control circuit 30 determines whether or not the input signal is supplied to the control circuit 30 through the communication network 3 and input/output interface 31. The determination at step S4017 is YES when the operator approves the selected application, causing the flow to go to next step S4018.

At step S4018, the control circuit 30 supplies a control signal to the CPU of the terminal 5 through the input/output interface 31 and communication network 3 (software instruction signal output device, output device of software-control signal) to boot up the application.

On the other hand, at step S4014, for example, when an intended application has not been so far used and has not yet been related to the ID information stored in the RFID circuit element Tc, or when the operator wishes to modify a previously established relation of an intended application to the ID information, the operator indicates that a new registration is made. Thus, the determination at step S4014 is YES, causing the flow to go to next step S4019.

At step S4019, the control circuit 30 supplies a control signal to the CPU of the terminal 5 through the input/output interface 31 and communication network 3, causing the terminal 5 to display the ID information read from the RFID circuit element Tc at previous step S4103 on the display 5a. Then, the flow goes to next step S4020.

When the selected application is not approved at previous step S4017, the determination at step S4017 is NO, causing the flow to go to step S4020.

At step S4020, the control circuit 30 supplies a control signal to the CPU of the terminal 5 through the input/output interface 31 and communication network 3 (output device of a software-confirmation-display signal, output device of software-control signal), causing the terminal 5 to display the name or the like of an application(s) (for example, a symbol, an icon or the like. Specifically, any display which permits the operator to discriminate the selected application) previously stored in the ROM (or RAM) of the terminal 5 for operating the apparatus 2D on the display 5a in a list form (in other words, equivalent to displaying applications of the RFID circuit element To in a list form). In this event, the list of applications and the ID information displayed at step S4019 above are displayed side by side on the display 5a (alternatively, they may be displayed one by one).

At next step S4021, the control circuit 30 determines whether or not the operator selects one application from among the applications displayed on the display 5a in a list form at step S4020. Specifically, the operator selects an application using the keyboard 5b, and the control circuit 30 determines whether or not the selection input signal is supplied to the control circuit 30 through the communication network 3 and input/output interface 31. When selected, the flow goes to next step S4022.

At step S4022, the control circuit 30 corresponds the application selected at step S4021 above to the ID information read from the RFID circuit element Tc at previous step S4013 on a one-to-one basis to form correlation information which is supplied, for example, to the information server 7 through the input/output interface 31 and communication network 3. The correlation information is stored in the memory or the like contained in the information server 7.

At next step S4023, the control circuit 30 supplies a control signal (software instruction signal) to the CPU of the terminal 5 through the input/output interface 31 and communication network 3 to boot up the application selected at previous step S4021.

By now, the control circuit 30 completes the selection of the application for operating the apparatus 2D, followed by the termination of the application selection procedure.

When the ID information of the RFID circuit element Tc in the cartridge 100D is related to a plurality of applications as described above, the plurality of applications are selected at step S4016 above for display on the display 5a. In this event, the selected plurality of applications may be displayed side by side, or the most frequently used application or the most recently used application may be preferentially positioned at the top. Further, upon selection of an application described above, a database used in the application may be selected in combination.

In the foregoing description, the control circuit 30 reads the ID information from the RFID circuit element Tc (step S4013) when the cartridge 100D is loaded into the cartridge holder of the apparatus 2D (step S4011). The present invention, however, is not so limited. Alternatively, the control circuit 30 may read the ID information from the RFID circuit element Tc, for example, when the apparatus 2D is powered on.

FIG. 50 is a diagram illustrating an example of a screen displayed on the display 5a of the terminal 5 when an application has been selected for operating the apparatus 2D in a manner described above, and the application is started at step S18 or S23 above.

As illustrated in FIG. 50, the RFID circuit element To is used for fixed assets in this example, and the screen has an entry field for entering object information which includes a print printed on the cover film 103 corresponding to the RFID circuit element To, and RFID tag information stored in the IC circuit part 151 of the RFID circuit element To. When the operator enters a fixed asset number in a printed print field, the name of the fixed asset in an object information field, and the name of a manager in a manager field, and the like using the keyboard 5b of the terminal 5, the entered information is read into the control circuit 30 from the terminal 5 through the communication network 3 and input/output interface 31. In this way, the print R (here, the fixed asset number) is printed on the cover film 103 in a RFID label production procedure, as will be later described, and the object information is written into the IC circuit part 151 of the RFID circuit element To as RFID tag information (see FIG. 52, later described). In this connection, for example, when the memory part 157 comprises a read only memory, and a RFID label is issued by reading, the object information is displayed on the screen, and the operator enters only the fixed asset number in the printed print field.

For writing or reading RFID tag information into the RFID circuit element To as described above, object information entered by the operator may be written into the IC circuit part 151 as the RFID tag information as it is, or the object information may be corresponded to the ID information of the RFID circuit element To, and the ID information may be written into the IC circuit part 151. In this event, the correspondence relationship between the object information and the ID information of the RFID circuit element To is stored, for example, in the aforementioned information server 7 such that it can be referenced as required.

While the foregoing description has been given of an exemplary scenario in which the RFID circuit element To is used for fixed assets, the present invention is not so limited, but applications can be started in accordance with a wide variety of applications for name plate management, office document management, general purpose and the like.

FIG. 51 is a flow chart illustrating in detail a procedure in the aforementioned step S4013 in FIG. 47.

Referring to FIG. 51, at step S4031, the control circuit 30 initializes a variable K for counting the number of times a retry is made when no response is returned from the RFID circuit element Tc (number of times of access attempts).

Subsequently, at step S4032, the control circuit 30 supplies a "Scroll All ID" command to the signal processing circuit 22 for reading ID information stored in the RFID circuit element Tc using predetermined communication parameters (frequency band, communication protocol and the like) which has been previously fixedly determined. Based on the "Scroll All ID" command, the signal processing circuit 22 generates a "Scroll All ID" signal as access information, which is transmitted to the RFID circuit element Tc in the cartridge 100D through the radio frequency circuit 21A, to prompt the RFID tag circuit element Tc to return a reply signal.

Next, at step S4033, the control circuit 30 receives the reply signal (cartridge information) transmitted from the RFID circuit element Tc of the cartridge 100D in response to the "Scroll All ID" signal through the antenna 19. Then, the control circuit 30 captures the reply signal through the radio frequency circuit 21A and signal processing circuit 22 (may temporarily store the replay signal in an appropriate memory).

Next, the control circuit 30 determines at step S4034 whether or not the reply signal received at step S4034 is erroneous using a known error detecting code (CRC (Cyclic Redundancy Check) code or the like).

When the determination is NO, the flow goes to step S4035, where K is incremented by one. Then, the control circuit 30 further determines at step S4036 whether or not K reaches a predetermined number of times of retries which has been previously determined (three times in this example. The number of times of retries may be set to another number of times as appropriate). The determination is NO when N is equal to or less than two (K≦2), in which case the flow returns to step S4032, from which the control circuit 30 repeats a similar procedure. When K is equal to three (K=3), the flow goes to step S4037, where the control circuit 30 supplies an error display signal to the terminal 5 or general purpose computer 6 through the input/output interface 31 and communication network 3 to display a failed read (error), followed by the termination of the flow. In this way, even in the event of a failure in reading the RFID tag information, the control circuit 30 retries the reading procedure up to three times. When the determination at step S4034 is YES, this means that the cartridge information has been successfully read from the target RFID circuit element Tc, followed by the termination of the routine.

Through the foregoing routine, the control circuit 30 can access and read the cartridge information stored in the IC circuit part 151 of the target RFID circuit element Tc in the cartridge 100D.

FIG. 52 is a flow chart illustrating in detail the RFID label production procedure at the aforementioned step S4100 in FIG. 46.

First, at step S4110, the control circuit 30 reads RFID tag information which should be written into the IC circuit part 151 of the RFID circuit element To, and information to be printed which should be printed on the RFID label T by the print head 10 from the antenna 14A, entered through the terminal 5 through the communication network 3 and input/output interface 31, using the application selected in the application selection procedure described above in connection with FIG. 47.

Subsequently, the flow goes to step S4115, where the control circuit 30 initializes a variable N for counting the number of times a retry is made when no response is returned from the RFID circuit element To, and a flag F indicative of a normal or a failed communication.

Then, at step S4120, the control circuit 30 outputs a control signal to the cartridge shaft drive circuit 24 to drive the ribbon take-up roller 106 and tape feeding roller 107 with a driving force of the motor 23 to drive cartridge shaft. In this way, the base tape 101 is fed out from the first roller 102 and supplied to the tape feeding roller 107, while the cover film 103 is fed out from the second roller 104. Also, in this event, the control circuit 30 outputs a control signal to the print-head drive circuit 25 to power the print head 10 and drive the same to print the print R read at step S110, such as characters, symbols, bar code and the like in a predetermined area of the cover film 103 (for example, an area to be bonded to the back side of one of RFID circuit elements To arranged on the base tape 101 at a predetermined pitch and at regular intervals). The control circuit 30 further outputs a control signal to the tape-feeding-roller motor 28 through the tape-feeding-roller drive circuit 29 to rotate the feeding roller 17A. As a result of the foregoing operations, the base tape 101 is bonded to the cover film 103, on which the print R has been printed, by the tape feeding roller 107 and sub-roller 109 for integration into the tag label tape 110 with print which is then transported to the outside of the cartridge 100.

Subsequently, at step S4125, the control circuit 30 determines whether or not the tag label tape 110 with print has been transported by a predetermined distance C (for example, a transport distance long enough for a corresponding RFID circuit element To, to which the printed cover film 103 has been bonded, to reach the transport guides 13). The determination on the transport distance may be made, for example, by detecting an appropriate identification mark borne on the base tape 101 by a known tape sensor which may be additionally provided for this purpose. When the determination at step S4125 is YES, the flow goes to step S4130.

At step S4130, the control circuit 30 transmits the RFID tag information to the RFID circuit element To, and writes the RFID tag information into the memory part 157 of the RFID circuit element To (see FIG. 53, later described, for further details).

At next step S4140, the control circuit 30 determines whether or not the flag F is set to "0." When the write procedure has been normally completed, the flag F remains to be "0" (see step S4138 in a flow chart illustrated in FIG. 53, later described). Accordingly, the determination at step S4140 should be YES, causing the flow to go to step S4141. On the other hand, if the writing procedure has not been normally completed for some reason, the flag F is set to "1" (see at step S4138 in the flow chart illustrated in FIG. 53, later described). Accordingly, the determination at step S4140 is NO, causing the flow to go to step S4145, where the control circuit 30 supplies a control signal to the print-head drive circuit 25 to stop the power to the print head 10 which stops the printing in response to the control signal. After explicitly displaying that a pertinent RFID circuit element To is defective due to such interrupted printing, the flow goes to step S4160.

At step S4141, the control circuit 30 outputs a combination of the RFID tag information written into t the RFID circuit element To at step S4130 with the information to be printed previously printed by the print head 10 corresponding thereto for storage in the information server 7 and route server 4 through the terminal 5 or general purpose computer 6 by way of the input/output interface 31 and communication network 3. The stored data may be stored, for example, in a database which can be accessed by the terminal 5 or general purpose computer 6 as required.

Subsequently, the control circuit 30 confirms at step S4150 whether or not characters have been printed on areas of the cover film 103 corresponding to the RFID circuit elements To which should be processed at this time, followed by the flow going to step S4160.

At step S4160, the control circuit 30 determines whether or not the tag label tape 110 with print has been transported to a predetermined position at which the tag label tape 110 with print should be cut by the cutter 15. Specifically, for example, the control circuit 30 may determine whether or not the tag label tape 110 with print has been further transported by a predetermined distance long enough for a RFID circuit element To under processing and a print area on the cover film 103 corresponding thereto to go beyond the cutter 15 by a predetermined length (margin) by detecting an appropriate identification mark borne on the base tape 101 (more specifically, for example, the separation sheet 101d, or the cover film 103 or the like) corresponding to each RFID circuit element To by a known tape sensor disposed outside of the cartridge 100D (for example at a location downstream of the cutter 15 in the transport direction). Alternatively, instead of making such a detection, a determination may be made based on the information to be printed whether or not the total length of the print character length of the print R and a predetermined margin exceeds the overall length of the RFID circuit element To. This is because when the total length exceeds the overall length of the RFID circuit element To, the cutter 15 can be prevented from cutting the adhered RFID circuit element To by cutting a region beyond the margin of the tag label tape 110 with print at least at the time the print R has been printed on the cover film 103.

When the determination at step S4160 is YES, the flow goes to step S4170. At step S4170, the control circuit 30 supplies a control signal to each of the cartridge shaft drive circuit 24 and tape-feeding-roller drive circuit 29 to stop driving the motor 23 to drive cartridge shaft and tape-feeding-roller motor 28, thus stopping rotations of the ribbon take-up roller 106, tape feeding roller 107, and feeding roller 17. This results in stopping the transport of the base tape 101 fed out from the first roll 102 and the cover film 103 fed out from the second roll 104, so that the transport of the tag label tape 110 with print by the feeding roller 17 is also stopped.

Subsequently, at step S4180, the control circuit 30 supplies a control signal to the solenoid drive circuit 27 to drive the solenoid 26 which forces the cutter 15 to cut the tag label tape 110 with print. As described above, the RFID circuit element To under processing, for example, had been bonded to a printed area of the cover film 103 corresponding thereto to create the printed RFID label tape 101 which has sufficiently passed beyond the cutter 15 at this time. The tag label tape 110 with print cut by the cutter 15 results in a RFID label T from which the RFID tag information has been read from the RFID circuit element To and on which a predetermined print has been printed in correspondence to the RFID tag information.

Subsequently, the flow goes to step S4190, where the control circuit 30 supplies a control signal to the tape-feeding-roller drive circuit 29 which resumes driving the tape-feeding-roller motor 28 to rotate the feeding roller 17 in response to the control signal. In this way, the feeding roller 17 resumes transporting the RFID label T issued at step S4180 toward the carry-out exit 16 and further to the outside of the apparatus 2D from the carry-out exit 16.

FIG. 53 is a flow chart illustrating in detail a procedure included in the aforementioned step S4130.

Referring to FIG. 53, after the aforementioned step S4125 in FIG. 52, the flow first goes to step S4131, where the control circuit 30 supplies a "Program" command to the signal processing circuit 22 for writing desired data into the memory part 157. In response, the signal processing circuit 22 generates a "Program" signal which constitutes RFID tag information including ID information that the operator essentially wishes to write. The "Program" signal is transmitted to a target RFID circuit element To through the transmitting portion 32 of the radio frequency circuit 21A and the antenna 14A to write the information into the memory part 157 of the RFID circuit element To.

Subsequently, at step S4132, the control circuit 30 outputs a "Verify" command to the signal processing circuit 22 to verify the contents of the memory part 157. In response, the signal processing circuit 22 generates a "Verify" signal as RFID tag information which is transmitted to all the target RFID circuit element To through the transmitting portion 32 of the radio frequency circuit 21A and the antenna 14A to prompt the RFID circuit element To return a reply.

Then, the flow goes to step S4133, where the apparatus 2D receives a reply (response) signal transmitted from the target RFID circuit element To in response to the "Verify" signal through the antenna 14A, and the control circuit 30 captures the reply signal through the transmitting portion 32 of the radio frequency circuit 21A and signal processing circuit 22.

Next, at step S4134, the control circuit 30 confirms the information stored in the memory part 157 of the RFID circuit element To, and determines based on the result of the reception at step S4133 whether or not the aforementioned transmitted predetermined information has been normally stored in the memory part 157.

When the determination at step S4134 is NO, the flow goes to step S4135, where N is incremented by one. Then, the control circuit 30 further determines at step S4136 whether or not N is equal to five. The determination is NO when N is equal to or less than four (N≦4), in which case the flow returns to step S4131, from which the control circuit 30 repeats a similar procedure. When N is equal to five (N=5), the flow goes to the aforementioned step S4137. At step S4137, the control circuit 30 supplies an error display signal to the terminal 5 or general purpose computer 6 through the input/output interface 31 and communication network 3 to display a failed read (error). Next, at step S4138, the control circuit 30 sets the flag F to "1," followed by the termination of the flow. In this way, even in the event of a failure in writing the RFID tag information, the apparatus for communicating with a RFID tag 2 retries the writing procedure up to five times, thus maximally ensuring the reliability of the writing procedure.

On the other hand, when the determination at step S4134 is YES, the flow goes to step S4139, where the control circuit 30 outputs a "Lock" command to the signal processing circuit 22 for prohibiting information from being subsequently written into the RFID circuit element To. In response, the signal processing circuit 22 generates a "Lock" signal which is transmitted to the RFID circuit element To, into which the RFID tag information is to be written, through the radio frequency circuit 21A. Thus, additional information is prohibited from being written into the RFID circuit element To. Eventually, the RFID tag information has been completely written into the target RFID circuit element To which is then discharged. After step S4139 is completed, the flow is terminated.

While the foregoing embodiment has been described in connection with an illustrative scenario in which the RFID tag information is transmitted to the RFID circuit element To write the information into the IC circuit part 151 to issue the RFID label T, the present invention is not limited to such a scenario. Alternatively, the present invention can also be applied to a RFID label T which is issued by reading RFID tag information from a read-only RFID circuit element To which previously stores predetermined RFID tag information (tag ID and the like) in a non-erasable manner, and printing a print corresponding to the read RFID tag information.

In this event, the control circuit 30 may simply read information to be printed at step S4110 in FIG. 52, and performs the RFID tag information reading procedure at step S4130 (see FIG. 54, later described, for further details). At subsequent step S4141, the control circuit 30 saves a combination of the information to be printed with the read RFID tag information.

FIG. 54 is a flow chart illustrating in detail the RFID tag information reading procedure mentioned above.

Referring to FIG. 54, at step S4201, the control circuit 30 supplies a "Scroll All ID" command to the signal processing circuit 22 for reading information stored in the RFID circuit element To from which information should be read. Based on the "Scroll All ID" command, the signal processing circuit 22 generates a "Scroll All ID" signal as wireless tag information, which is transmitted to the target RFID circuit element To intended for reading through the radio frequency circuit 21, to prompt the RFID tag circuit element To return a reply signal.

Next, at step S4202, the apparatus 2D receives the reply signal (RFID tag information including tag ID information and the like) transmitted from the target RFID circuit element To in response to the "Scroll All ID" signal through the antenna 14A. Then, the control circuit 30 captures the reply signal through the radio frequency circuit 21 and signal processing circuit 22.

Next, the control circuit 30 determines at step S4203 whether or not the reply signal received at step S4202 is erroneous using a known error detecting code (CRC (Cyclic Redundancy Check) code or the like).

When the determination is NO, the flow returns to step S4204, where N is incremented by one. Then, the control circuit 30 further determines at step S4205 whether or not N is equal to five. The determination is NO when N is equal to or less than four (N≦4), in which case the flow returns to step S4201, from which the control circuit 30 repeats a similar procedure. When N is equal to five (N=5), the flow goes to step S4206, where the control circuit 30 supplies an error display signal to the terminal 5 or general purpose computer 6 through the input/output interface 31 and communication network 3, causing the same to display a corresponding failed read (error). Then, at step S4207, the control circuit 30 sets the flag F to "1," followed by the termination of the routine. In this way, even in the event of a failure in reading the RFID tag information, the apparatus 2D retries the reading procedure up to five times, thereby ensuring the reliability for reading.

On the other hand, when the determination at step S4203 is YES, this means that the RFID tag information has been successfully read from the target RFID circuit element To, followed by the termination of the routine.

In the foregoing description, the transmitting portion 32 of the radio frequency circuit 21A implements a writing controller for writing application-related information into a storage device, and the receiving portion 33 of the radio frequency circuit 21A implements a reading controller for reading the application-related information in the respective aspects of the present invention.

As described above, in the apparatus 2D of the fourth embodiment, the ID information stored in the RFID circuit element Tc disposed in the housing 100a of the cartridge 100D is related to an application on a one-to-one basis, and the correlation information is stored in the information server 7, thereby making it possible to relate the cartridge 100D and the RFID circuit elements To contained therein to an application corresponding thereto. For issuing the RFID label T using the relation and cartridge 100D, as the cartridge 100D is loaded into the cartridge holder, the ID information stored in the RFID circuit element Tc is read, and an application related to the ID information, i.e., an application in accordance with the application of the RFID circuit elements To is displayed for confirmation based on the correlation information, as previously described in connection with FIG. 47. The application is started after the approval of the operator. In this way, the apparatus 2D of the fourth embodiment enables automatic execution of control which helps the operator in the production of the RFID label such as control for starting an operation application in accordance with the application of the RFID circuit elements To in the cartridge 100D, displaying related information, and the like. As a result, the operator is free from complicated operations (particularly, operations for selecting a function of the apparatus for communicating with a RFID tag which the operator wishes to use) and can readily, smoothly and rapidly issue target RFID labels T even when the operator uses the RFID labels T in any of a wide variety of applications, thus making it possible to improve the convenience.

Also, in the apparatus 2D of the fourth embodiment, as described in connection with FIG. 47, even when an intended application has already been related to ID information, the operator can arbitrarily make a new registration when he wishes to change the relation. In other words, even after the RFID circuit element To is once related to an application corresponding thereto, the relation can be change as required. In this way, when a more highly functional application is developed than an application to which the RFID circuit element To is currently related, the relation can be changed to automatically execute the application, thus more improving the convenience and also improving the expendability of the apparatus 2D.

It should be understood that the fourth embodiment can be modified in various manners without departing from the spirit and technical idea of the invention other than the foregoing. The following descriptions will be given of such exemplary modifications one by one.

(4-1) Single RFID Circuit Element To Corresponded to Plurality of Applications:

In the foregoing embodiment, the ID information stored in the RFID circuit element Tc is related to an application for operating the apparatus 2D on a one-to-one basis based on the correlation information previously stored in a memory or the like of the information server 7. In other words, the RFID circuit element To is corresponded to an application corresponding thereto on a one-to-one basis, but the present invention is not so limited. Alternatively, a single RFID circuit element To may be corresponded to a plurality of applications.

FIG. 55 is a flow chart illustrating in detail the application selection procedure in this exemplary modification, and corresponds to the aforementioned FIG. 47

Referring to FIG. 55, steps S4011-S4013 are similar to those in FIG. 47 and are therefore omitted in the description. At step S4014, when the operator indicates that a new registration is not made through the terminal 5, the determination at step S4014 is NO, causing the flow to go to next step S4060.

At step S4060, the control circuit 30 searches for an application (see FIG. 56, later described).

At next step S4017, the control circuit 30 determines whether or not the operator approves an application searched for at step S4060. Specifically, the operator enters whether or not the operator approves the selected operation through the keyboard 5b of the terminal 5, and the control circuit 30 determines whether or not the input signal is supplied to the control circuit 30 through the communication network 3 and input/output interface 31. When the operator does not approve the application, the determination at step S4017 is NO, causing the flow to return to step S4060. The determination at step S4017 is YES when the operator approves the application, causing the flow to go to next step S4080.

At step S4080, the control circuit 30 reads an application counter (number of times the application has been used) of the application selected at step S60 from the RAM or the like of the terminal 5 through the communication network 3 and input/output interface 31, increments the application counter N by one, and stores the resulting application counter N in the RAM or the like of the terminal 5 through the input/output interface 31 and communication network 3. Then, the flow goes to next step S4018.

At step S4018, the control circuit 30 supplies a control signal to the CPU of the terminal 5 through the input/output interface 31 and communication network 3 (software instruction signal output device) to boot up the application.

Since steps S4019-S4023 are similar to those in FIG. 47, descriptions thereon are omitted.

FIG. 56 is a flow chart illustrating in detail a procedure at the aforementioned step S4060.

Referring to FIG. 56, first at step S4061, the control circuit 30 supplies a control signal (correlation-reading-instruction signal), for example, to the information server 7 to read correlation information previously stored in the memory or the like of the information server 7, which correlates the ID information stored in the RFID circuit element Tc to applications for operating the apparatus 2D through the communication network 3 and input/output interface 31. Then, the control circuit 30 temporarily stores the read correlation information in the RAM built in the control circuit 30. Here, in this exemplary modification, one piece of ID information is related to a plurality of applications by the correlation information.

At next step S4062, the control circuit 30 selects the plurality of applications related to the ID information read from the RFID circuit element Tc at previous step S4013 based on the correlation information stored in the RAM at step S4061 above. Then, the control circuit 30 reads information on the selected application (for example, the names of the applications. Any information may serve as long as it permits the operator to identify the selected applications) from the terminal 5 through the communication network 3 and input/output interface 31 (in other words, comparable to reading applications of the RFID circuit element To).

At step S4063, the control circuit 30 reads application count values N corresponding to the respective ones of the plurality of applications selected at step S4062 above through the communication network 3 and input/output interface 31. The application count value N is a value indicative of the number of times the application has been used (booted up), which is equivalent to production log information, and is incremented by one each time it is used (see step S4080 in FIG. 55) and stored in the RAM or the like of the terminal 5. The application count values N may be stored in the information server 7 together with the correlation information (or included in the correlation information). Alternatively, the application count values N may be stored in the RFID circuit element Tc together with the ID information, instead of the information server 7.

At next step S4064, the control circuit 30 searches the plurality of applications read at step S4063 above for the one having the largest application count value N for selection.

At next step S4065, the control circuit 30 supplies a control signal to the CPU of the terminal 5 through the input/output interface 31 and communication network 3 (output device of a software-confirmation-display signal, output device of software-control signal), causing the terminal 5 to display the name or the like of an application(s) (for example, a symbol, an icon or the like. Specifically, any display which permits the operator to discriminate the selected application) (in other words, equivalent to displaying applications), and also causing the terminal 5 to display a message for asking the operator whether or not he approves the selected application. Alternatively, instead of displaying the selected application alone, the selected application may be displayed together with other applications in such a manner that the selected application can be distinguished from the others (displayed at the top or highlighted). In this event, the applications may be displayed, for example, at upper rows as they have larger application count values N (as they are more frequently used). Then, the flow is terminated.

In the foregoing description, the most frequently used application is automatically selected from among a plurality of corresponded applications. The present invention, however, is not so limited, but the plurality of corresponded applications may be displayed, for example, in a list form such that the operator selects one from the list. FIGS. 57A and 57B illustrate exemplary displays in such a scenario. In the illustrated examples, the order (locations on the screen at) in which the applications are displayed is determined, for example, by an application point which corresponds to the past frequency of use, where FIG. 57A is an example in which fixed asset management has the largest application point and is displayed at the top, while FIG. 57B is an example in which name plate management has the largest application point and is displayed at the top. Alternatively, applications may be sequentially displayed in a fixedly determined predetermined order, such that the operator selects one from those applications.

This exemplary modification also provides similar advantages to those of the fourth embodiment, i.e., the operator can readily, smoothly and rapidly issue target RFID labels T even when the operator uses the RFID labels T in any of a wide variety of applications, thus making it possible to improve the convenience.

(4-2) When Using Local Network:

The foregoing description has been given of an example in which the apparatus 2D, terminal 5 and the like are interconnected through the communication network 3 and incorporated in a wide area network, the present invention is not so limited. Alternatively, the operation terminal 5 may be connected to the apparatus 2D through a local network (so-called LAN) to form a system 1' for managing information of a RFID tag (without connection to other external networks). In this configuration, the system is similar to that illustrated in FIG. 18 previously described in the first embodiment (except that the apparatus 2D is substituted for the apparatus 2A).

In this configuration, the correlation information which is related to the ID information stored in the RFID circuit element Tc and applications for operating the apparatus 2D is stored, for example, in a memory (software database) such as the ROM, RAM or the like of the terminal 5. As such, for selecting an application, the control circuit 30 of the apparatus 2D supplies a control signal (correlation-reading-instruction signal) to the terminal 5 (CPU) to read the correlation information stored in the memory of the terminal 5 through the local network. Then, the control circuit 30 selects an application related to the ID information read from the RFID circuit element Tc based on the correlation information. Subsequently, the selected application is displayed on the display 5a of the terminal 5 for confirmation, and is started after the operator approves it in a manner similar to the fourth embodiment. Thus, a description on this procedure is omitted. [0537]

This exemplary modification can also provide similar advantages to those of the fourth embodiment and exemplary modification (4-1).

(4-3) Self-Contained Tag-Label Apparatus:

The apparatus 2D may comprise all the functions of the terminal 5 in the aforementioned exemplary modification (4-2). In this configuration, the resulting apparatus 2D' (not shown) for communicating with a RFID tag comprises a storage device for storing a database, a display device for displaying applications and the like, and an operation device (keyboard, mouse, touch panel and the like) for use by the operator to perform input operations.

In this configuration, the correlation information which relates the ID information stored in the RFID circuit element Tc to applications for operating the apparatus 2D is stored, for example, in a storage device (software database) provided in the apparatus 2D'. As such, for selecting an application, the control circuit 30 of the apparatus 2D reads the correlation information stored in the storage device, and selects an application related to the ID information read from the RFID circuit element Tc based on the correlation information. Subsequently, the selected application is displayed on the display device for confirmation by the operator, and is started after the operator approves it.

This exemplary modification can also provide similar advantages to those of the fourth embodiment and exemplary modifications (4-1), (4-2).

In the fourth embodiment and exemplary modifications (4-1), (4-2) described above, the ID information is stored in the RFID circuit element Tc as application-related information, and the ID information is related to applications using the correlation information. The present invention, however, is not so limited. Alternatively, information on applications suitable for the RFID circuit elements To (for example, for fixed assets, name plates, offices, general purpose and the like) may be stored as it is in the RFID circuit element Tc, such that the application information is corresponded to applications using the correlation information. Further alternatively, the application information may be directly stored in the RFID circuit element Tc. Advantageously, this eliminates the need for the database for storing the correlation information.

Also, in the fourth embodiment and exemplary modifications described above, the name or the like of a selected application is displayed for the operator to approve it. The present invention, however, is not so limited, but applications (for example, for fixed assets, nameplates, office, general purpose and the like), for example, may be displayed instead. In this event, even an operator who does not know the name or the like of the application can approve it with its application.

(Other Exemplary Modifications Common to all Embodiments)

(a) Other Implementation of Storage Device:

While the foregoing embodiments have been described in connection with the storage device 200 which comprises a hard disk drive, the storage device 200 is not so limited but may comprise anon-volatile memory medium such as a so-called SD (Secure Digital) memory card and the like.

Also, the storage device 200 may be removably mounted to the apparatus body 8 of the apparatus 2A-2D, 2A'-2D'. In this implementation, since the storage device 200 can be mounted to and removed from the apparatus for communicating with a RFID tag as required, dedicated storage devices may be provided, for example, for respective operators or applications, such that each time one storage device is to be used, a currently mounted storage device is removed for exchange with the one storage device. Also, the storage devices can be readily backed up.

(b) Other Implementations of Tape and Print-Receiving Medium:

The foregoing description has been made for an example in which the printed cover film 103, i.e., print-receiving medium is bonded to the base tape 101 to form the tag label tape 110 with print which is cut into RFID labels T. The present invention, however, is not so limited. A printed print-receiving medium and a tape which bears RFID circuit elements To which should be adhered (or related) to the print-receiving medium may be separately create and discharged to the outside of the apparatus for communicating with a RFID tag. Then, the user may bond the separately created print-receiving medium and the tape which bears the RFID circuit element To. The foregoing embodiments and exemplary modifications may be applied to an apparatus for communicating with a RFID tag which is used in this scenario. Alternatively, the RFID circuit element To may be borne on the print-receiving tape itself, wherein a print may be printed on the print-receiving medium by the print head, and information may be read from or written into the RFID circuit element To borne thereon to issue a RFID label T.

Further, while the foregoing description has been made in connection with the print-receiving medium which is a tape-shaped cover film 103 fed out from the second roll 104, the print-receiving medium is not so limited, but so-called leaf (sheet) label materials may be supplied from a tray-shaped cartridge by an appropriate drive roller (driving device) and printed.

Other than those previously described, approaches according to the respective embodiments and exemplary modifications may be utilized in combination as appropriate.

It should be noted that the "Erase" signal, "Verify" signal, "Program" signal and the like used in the foregoing description conform to the specifications laid down by EPC global. EPC global is a non-profit legal person jointly founded by International EAN Association which is an international organization of distribution code, and Uniformed Code Council (UCC) which is a distribution code organization of the United State. Alternatively, such signals may conform to other standards as long as they provide similar functions.

Though not specifically illustrated, the present invention can be modified in various manners in practices without departing from the spirit and scope of the invention.

What is claimed is:

1. A system for managing information of a RFID tag comprising:
    an apparatus for communicating with a RFID tag including an antenna device configured to communicate with a RFID circuit element by wireless communication, said RFID circuit element including an IC circuit part and a tag antenna connected to said IC circuit part;
    an operation terminal configured to output an operation signal from said apparatus for communicating with a RFID tag in accordance with an input operation performed by an operator; and
    a storage portion configured to store information for assisting production of a RFID label for use during the production of the RFID label or a writing controller configured to write said information for assisting production of a RFID label to a recording medium.

2. A system for managing information of a RFID tag according to claim 1, wherein:
    said operation terminal generates and outputs an operation signal including an access instruction to information in a RFID tag, an access instruction to a storage device, and a printing instruction in accordance with an input operation performed by said operator associated with one another, and
    said apparatus for communicating with a RFID tag includes:
        a storage device for storing information of a RFID tag configured to store at least said information for assisting production of a RFID label in a database for storing information of a RFID tag, as said storage portion, said information for assisting production of a RFID label including correlation information of identification information of an object to be affixed by a RFID label including said RFID circuit element to identification information of said RFID circuit element corresponding thereto;
        a tag-access device configured to access said IC circuit part of said RFID circuit element through said antenna device based on said access instruction to information in a RFID tag of said operation signal;
        a data-access device configured to access said database for storing information of a RFID tag included in said storage device for storing information of a RFID tag based on said access instruction to a storage device of said operation signal;
        a driving device configured to feed out a print-receiving medium associated with said RFID circuit element; and
        a printing device configured to print a predetermined print on said print-receiving medium based on said printing instruction of said operation signal.

3. A system for managing information of a RFID tag according to claim 2, wherein:
    said apparatus for communicating with a RFID tag further includes:
        a cooperation controller configured to associatively control said printing device and said tag-access device, said cooperation controller being responsive to said operation signal supplied thereto from said operation terminal, said operation signal including a sequential-production instruction signal for instructing the production of a plurality of said RFID labels which meet a predetermined condition in sequence, to collectively print predetermined prints on said print-receiving media and to access said IC circuit parts of said RFID circuit elements as to said plurality of RFID labels.

4. A system for managing information of a RFID tag according to claim 3, wherein:
    said apparatus for communicating with a RFID tag further includes:
        a search device responsive to said operation signal from said operation terminal, said operation signal including an instruction signal for instructing a search for data which meets said predetermined condition, to retrieve said correlation information or said identification information of an object, which meets the predetermined condition, from said correlation information or said identification information stored in said database for storing information of a RFID tag; and
        an output device of a control signal configured to acquire information to be printed and information to be written corresponding to the retrieved information, and outputs control signals corresponding to the acquired information to be printed and information to be written to said printing device and said data-access device, respectively.

5. A system for managing information of a RFID tag according to claim 1, wherein:
    said apparatus for communicating with a RFID tag further includes:
        a cartridge holder configured to removably hold a cartridge for including at least a RFID tag which contains said RFID circuit element; and
        a tag-access device configured to access said IC circuit part of said RFID circuit element through said antenna device,
    said system for managing information of a RFID tag further comprises a storage device for storing information of a RFID tag including a database for storing information of a RFID tag configured to store information related to said RFID circuit elements, said database for storing information of a RFID tag being capable of being accessed in relation to said cartridge for including at least a RFID tag loaded in said cartridge holder, and
    said storage portion includes a storage portion for storing correlation configured to store said information for assisting production of a RFID label, said information for assisting production of a RFID label including a cartridge correlation of cartridge identification information borne in said cartridge for including at least a RFID tag to said database for storing information of a RFID tag corresponding thereto.

6. A system for managing information of a RFID tag according to claim 5, wherein:
    said storage portion for storing correlation is configured to be written to store said cartridge correlation in response to said operation signal from said operation terminal.

7. A system for managing information of a RFID tag according to claim 5, wherein:
said storage portion for storing correlation is provided at said apparatus for communicating with a RFID tag.

8. A system for managing information of a RFID tag according to claim 5, wherein:
said storage portion for storing correlation is configured to store said cartridge correlation, said cartridge correlation including a correlation of said cartridge identification information to particular data in said database for storing information of a RFID tag corresponding thereto.

9. A system for managing information of a RFID tag according to claim 5, wherein:
said storage device for storing information of a RFID tag is provided at said apparatus for communicating with a RFID tag.

10. A system for managing information of a RFID tag according to claim 9, wherein:
said storage device for storing information of a RFID tag is removably arranged with a main body of said apparatus for communicating with a RFID tag.

11. A system for managing information of a RFID tag according to claim 9, wherein:
said storage device for storing information of a RFID tag is configured to be capable of accessing said database for storing information of a RFID tag from the outside of a corresponding apparatus for communicating with a RFID tag through a wired or a wireless communication network.

12. A system for managing information of a RFID tag according to claim 11, wherein:
said storage device for storing information of a RFID tag includes a limiting device configured to limit an accessible database among a plurality of said database for storing information of a RFID tag upon detection of said cartridge for including at least a RFID tag loaded into said cartridge holder.

13. A system for managing information of a RFID tag according to claim 5, wherein:
said database for storing information of a RFID tag of said storage device for storing information of a RFID tag stores at least tag correlation of identification information of an object to be affixed by a RFID label including said RFID circuit element to identification information of said RFID circuit element corresponding thereto.

14. A system for managing information of a RFID tag according to claim 5, wherein:
said apparatus for communicating with a RFID tag further includes:
a data-access device configured to access said database for storing information of a RFID tag based on said operation signal of said operation terminal;
a driving device configured to feed a print-receiving medium related to said RFID circuit element; and
a printing device configured to print a predetermined print on said print-receiving medium.

15. A system for managing information of a RFID tag according to claim 14, wherein:
said apparatus for communicating with a RFID tag further includes:
a cooperation controller configured to associatively control said printing device and said tag-access device, said cooperation controller being responsive to said operation signal supplied thereto from said operation terminal, said operation signal including a sequential-production instruction signal for instructing the production of a plurality of said RFID labels which meet a predetermined condition in sequence, to collectively print predetermined prints on said print-receiving media and to access said IC circuit parts of said RFID circuit elements as to said plurality of RFID labels.

16. A system for managing information of a RFID tag according to claim 14, wherein:
said apparatus for communicating with a RFID tag further includes:
a determining device for access to a tag configured to determine whether or not said tag-access device successfully accesses said IC circuit part,
wherein said data-access device updates corresponding information stored in said database for storing information of a RFID tag when said determining device of access to a tag determines a successful access.

17. A system for managing information of a RFID tag according to claim 14, wherein:
said apparatus for communicating with a RFID tag further includes:
a determining device for access to a tag configured to determine whether or not said tag-access device successfully accesses said IC circuit part,
wherein said tag-access device retries an access when said determining device of access to a tag determines a failed access.

18. A system for managing information of a RFID tag according to claim 1, wherein:
said apparatus for communicating with a RFID tag further includes:
a generate device for identification information of a RFID tag configured to generate tag identification information to be written into said RFID circuit element, said tag identification information including an information-database-code part, as said information for assisting production of a RFID label, related to a database for storing information of a RFID tag configured to store information corresponding to said RFID circuit element, and an object-code part related to an object of said RFID circuit element,
wherein said recording medium includes said RFID circuit element, and said writing controller writes said tag identification information generated by said generate device for identification information of a RFID tag into said IC circuit part of said RFID circuit element through said antenna device.

19. A system for managing information of a RFID tag according to claim 1, wherein:
said apparatus for communicating with a RFID tag further includes:
a cartridge holder configured to removably hold a cartridge for including at least a RFID tag which includes said recording medium, and contains RFID circuit elements for RFID labels, said recording medium including a storage device for storing information, and
said writing controller writes said information for assisting production of a RFID label into said storage device, said information for assisting production of a RFID label including application-related information related to an application of said RFID circuit element for a RFID label.

20. A system for managing information of a RFID tag according to claim 19, wherein:
said apparatus for communicating with a RFID tag further includes:

a reading controller configured to read said application-related information stored in said storage device; and
an output device of a software-confirmation-display signal configured to output a software-confirmation-display signal for displaying a confirmation display of an operation software for use by the operator on said operation terminal in relation to a corresponding application based on said application-related information read by said reading controller, and
said operation terminal includes a display device for making said confirmation display in response to said software-confirmation-display signal.

21. A system for managing information of a RFID tag according to claim 19, wherein:
said apparatus for communicating with a RFID tag further includes:
a reading controller configured to read said application-related information stored in said storage device; and
an output device of a software-instruction signal configured to output a software-instruction signal for determining and instructing an operation software for use by the operator on said operation terminal in relation to a corresponding application based on said application-related information read by said reading controller, and
said operation terminal includes a boot device configured to boot up corresponding operation software in response to said software-instruction signal.

22. A system for managing information of a RFID tag according to claim 20, wherein:
said operation terminal includes a software database configured to store correlation information of said application-related information to said operation software.

23. A system for managing information of a RFID tag according to claim 20, further comprising:
a storage device configured to store correlation information of said application-related information to said operation software, disposed outside said apparatus for communicating with a RFID tag.

24. An apparatus for communicating with a RFID tag configured to manage information related to a RFID circuit element and to issue a RFID label containing said RFID circuit element based on an operation signal including an access instruction to information in a RFID tag, an access instruction to a storage device, and a printing instruction associated with one another, said apparatus for communicating with a RFID tag comprising:
an antenna device configured to communicate with said RFID circuit element by wireless communication;
a tag-access device configured to access an IC circuit part of said RFID circuit element through said antenna device based on said access instruction to information in a RFID tag;
a storage device for storing information of a RFID tag configured to store at least correlation information of identification information on an object to be affixed by a RFID label containing said RFID circuit element to identification information of said RFID circuit element corresponding thereto in a database for storing information of a RFID tag;
a data-access device configured to access said database for storing information of a RFID tag based on said access instruction to a storage device;
a driving device configured to feed out a print-receiving medium associated with said RFID circuit element; and
a printing device configured to print a predetermined print on said print-receiving medium based on said printing instruction.

25. An apparatus for communicating with a RFID tag according to claim 24, further comprising:
an operation device configured to output said operation signal in response to an input operation performed by an operator.

26. An apparatus for communicating with a RFID tag according to claim 25, further comprising:
a display device configured to make a predetermined display corresponding to the input operation performed by said operator through said operation device.

27. An apparatus for communicating with a RFID tag according to claim 24, further comprising:
an input device of an operation signal configured to receive said operation signal in accordance with an input operation performed by an operator from the outside of said apparatus.

28. An apparatus for communicating with a RFID tag according to claim 25, wherein:
said operation device or said input device of an operation signal outputs said operation signal or receives said operation signal from the outside of said apparatus for communicating with a RFID tag, for instructing said printing device to print a predetermine print without said tag-access device accessing said IC circuit part.

29. An apparatus for communicating with a RFID tag according to claim 24, further comprising:
a determining device for access to a tag configured to determine whether or not said tag-access device successfully accesses said IC circuit part,
wherein said data-access device makes information stored in said database for storing information of a RFID tag of said storage device for storing information of a RFID tag effectual or ineffectual in accordance with the result of the determination made by said determining device of access to a tag.

30. An apparatus for communicating with a RFID tag according to claim 24, further comprising:
a determining device for print configured to determine whether or not said printing device successfully prints a predetermined print,
wherein said data-access device makes information stored in said database for storing information of a RFID tag of said storage device for storing information of a RFID tag effectual or ineffectual in accordance with the result of the determination made by said determining device for print.

31. An apparatus for communicating with a RFID tag according to claim 24, wherein:
said database for storing information of a RFID tag of said storage device for storing information of a RFID tag stores said correlation information, and identification information of an object related to said object to be affixed by a RFID label.

32. An apparatus for communicating with a RFID tag according to claim 24, wherein:
said database for storing information of a RFID tag of said storage device for storing information of a RFID tag stores the correlation information of identification information of said object to be affixed by a RFID label, having object information stored in a database external to said apparatus, to identification information of said RFID circuit element corresponding thereto.

33. An apparatus for communicating with a RFID tag according to claim 24, wherein:

said storage device for storing information of a RFID tag includes a plurality of said databases for storing information of a RFID tag in accordance with applications of said RFID circuit element.

34. An apparatus for communicating with a RFID tag according to claim 33, wherein:

said printing device prints information based on identification information of said RFID circuit element corresponding to said printing instruction or an application of said RFID circuit element in accordance with said printing instruction on said print-receiving medium.

35. An apparatus for communicating with a RFID tag according to claim 24, wherein:

said storage device for storing information of a RFID tag is removably disposed at the body of said apparatus for communicating with a RFID tag.

36. An apparatus for communicating with a RFID tag according to claim 24, further comprising:

a reference device for a correlation information configured to reference whether or not said correlation information corresponding to said access instruction to a storage device has been previously stored in said database for storing information of a RFID tag prior to an access to said database for storing information of a RFID tag by said data-access device, wherein said data-access device stores said correlation information in said database for storing information of a RFID tag when said correlation information has not been stored in said database for storing information of a RFID tag, as determined by said reference device for a correlation information.

37. An apparatus for communicating with a RFID tag according to claim 36, wherein:

when said correlation information has been previously stored in said database for storing information of a RFID tag, as determined by said reference device for a correlation information, said printing device does not print the print corresponding to said previously stored correlation information, and said tag-access device does not access said IC circuit part corresponding to said previously stored correlation information.

38. An apparatus for communicating with a RFID tag according to claim 36, wherein:

when said correlation information has been previously stored in said database for storing information of a RFID tag, as determined by said reference device for a correlation information, said printing device prints the print corresponding to said previously stored correlation information on said print-receiving medium, and said tag-access device accesses said IC circuit part of said RFID circuit element in correspondence to said previously stored correlation information.

39. An apparatus for communicating with a RFID tag according to claim 36, wherein:

when said correlation information has been previously stored in said database for storing information of a RFID tag, as determined by said reference device for a correlation information, said data-access device generates new correlation information which corresponds identification information other than the identification information of said RFID circuit element corresponded in said correlation information to the identification information of said object to be affixed by a RFID label associated with said correlation information, and stores the new correlation information in said database for storing information of a RFID tag, said printing device prints a print corresponding to said stored new correlation information on said print-receiving medium, and said tag-access device accesses said IC circuit part of said RFID circuit element in correspondence to said stored new correlation information.

40. An apparatus for communicating with a RFID tag according to claim 39, wherein:

when said correlation information has been previously stored in said database for storing information of a RFID tag, as determined by said reference device for a correlation information, said data-access device makes said previously stored correlation information ineffectual.

41. An apparatus for communicating with a RFID tag according to claim 24, further comprising:

an image-creating device configured to create an image of said print-receiving medium when said printing device prints the print in response to at least said access instruction and said printing instruction, wherein said database for storing information of a RFID tag of said storage device for storing information of a RFID tag stores said image created by said image-creating device in relation to said correlation information corresponding thereto.

42. An apparatus for communicating with a RFID tag according to claim 41, further comprising:

a generate device for image-display signal configured to generate a signal for displaying said image stored in said database for storing information of a RFID tag on a display device.

43. An apparatus for communicating with a RFID tag configured to manage information related to a RFID circuit element and to issue a RFID label containing said RFID circuit element, comprising:

an antenna device configured to communicate with said RFID circuit element by wireless communication;

a generate device for identification information of a RFID tag configured to generate tag identification information to be written into said RFID circuit element, said tag identification information including a database-code part related to a database for storing information of a RFID tag configured to store information corresponding to said RFID circuit element and an object-code part related to an object of said RFID circuit element; and a writing controller configured to write said tag identification information generated by said generate device for identification information of a RFID tag into an IC circuit part of said RFID circuit element through said antenna device.

44. An apparatus for communicating with a RFID tag according to claim 43, wherein:

said database for storing information of a RFID tag includes a first database, and said apparatus for communicating with a RFID tag further comprises:

a storage device for storing information of a RFID tag including said first database configured to store at least correlation information of object identification information of said object to said tag identification information of said RFID circuit element corresponding thereto; and a first data-access device configured to access said first database.

45. An apparatus for communicating with a RFID tag according to claim 44, wherein:
said generate device for identification information of a RFID tag generates said tag identification information as said database-code part, including at least part of an apparatus identification information related to said apparatus for communicating with a RFID tag comprising said first database in said database-code part.

46. An apparatus for communicating with a RFID tag according to claim 44, wherein:
said generate device for identification information of a RFID tag generates said tag identification information as said database-code part, including at least part of at least one of a network physical address, a logical address, and a unique identification number of said apparatus for communicating with a RFID tag comprising said first database.

47. An apparatus for communicating with a RFID tag according to claim 43, wherein:
said database for storing information of a RFID tag includes a second database, and
said apparatus for communicating with a RFID tag further comprises a second data-access device configured to access said second database external to said apparatus for communicating with a RFID tag for storing at least correlation information of object identification information of said object to said tag identification information of said RFID circuit element corresponding thereto.

48. An apparatus for communicating with a RFID tag according to claim 44, further comprising:
a generate device for query signal configured to generate a query signal to said first or second database for querying a code which can be assigned to said object-code part;
wherein said generate device for identification information of a RFID tag generates said tag identification information in accordance with a reply to said query signal from said first or second database.

49. An apparatus for communicating with a RFID tag according to claim 43, further comprising:
a driving device configured to feed out a print-receiving medium associated with said RFID circuit element; and
a printing device configured to print a predetermined print on said print-receiving medium.

50. An apparatus for communicating with a RFID tag comprising:
a cartridge holder configured to removably hold a cartridge for including at least a RFID tag which includes a storage device for storing information and contains RFID circuit elements for RFID labels;
an antenna device configured to communicate with said RFID circuit element for a RFID label by wireless communication; and
a writing controller configured to write application-related information related to an application of said RFID circuit element for a RFID label into said storage device in response to an operation of an operator,
wherein said writing controller writes said application-related information related to a plurality of the applications into said storage device of one said cartridge for including at least a RFID tag.

51. An apparatus for communicating with a RFID tag according to claim 50, wherein:
said writing controller writes said application-related information related to a plurality of said applications arranged in an order determined based on production log information into said storage device of one said cartridge for including at least a RFID tag.

52. An apparatus for communicating with a RFID tag according to claim 50, further comprising:
an output device of a display signal configured to output a display signal for displaying said plurality of applications of said RFID circuit element for a RFID label, written in said storage device.

53. An apparatus for communicating with a RFID tag comprising:
a cartridge holder configured to removably hold a cartridge for including at least a RFID tag which includes a storage device for storing information and contains RFID circuit elements for RFID labels;
an antenna device configured to communicate with said RFID circuit element for a RFID label by wireless communication;
a writing controller configured to write application-related information related to an application of said RFID circuit element for a RFID label into said storage device in response to an operation of an operator;
a reading controller configured to read said application-related information stored in said storage device; and
an output device of software-control signal configured to output a control signal related to operation software used by the operator in relation to a corresponding application based on said application-related information read by said reading controller.

54. An apparatus for communicating with a RFID tag according to claim 53, wherein:
said output device of software-control signal outputs said control signal including a software-confirmation-display signal for displaying said operation software for confirmation.

55. An apparatus for communicating with a RFID tag according to claim 53, wherein:
said output device of software-control signal outputs a software-confirmation-display signal for displaying a plurality of options of said operation software for confirmation such that the operator can select one from said options of the operation software.

56. An apparatus for communicating with a RFID tag according to claim 53, wherein:
said output device of software-control signal outputs said control signal including a software-instruction signal for determining and instructing said operation software.

57. An apparatus for communicating with a RFID tag according to claim 53, wherein:
said output device of software-control signal outputs said control signal based on previously determined correlation information of said application-related information to said operation software.

58. An apparatus for communicating with a RFID tag according to claim 57, further comprising:
an output device of correlation-reading-instruction signal configured to output a correlation-reading-instruction signal for reading said correlation information from a software database.

59. An apparatus for communicating with a RFID tag according to claim 53, wherein:
said reading controller reads said application-related information when said cartridge for including at least a RFID tag is loaded into said cartridge holder or when said apparatus is powered on.

* * * * *